Dec. 27, 1966 C. F. AULT ETAL 3,295,111

INFORMATION STORAGE SYSTEM

Filed Sept. 25, 1963 30 Sheets-Sheet 1

INVENTORS C. F. AULT
L. E. GALLAHER
T. S. GREENWOOD

BY William H. Kamstra

ATTORNEY

INFORMATION STORAGE SYSTEM

INFORMATION STORAGE SYSTEM

Filed Sept. 25, 1963 30 Sheets-Sheet 5

Dec. 27, 1966 C. F. AULT ETAL 3,295,111

INFORMATION STORAGE SYSTEM

Filed Sept. 25, 1963 30 Sheets-Sheet 13

Dec. 27, 1966 C. F. AULT ETAL 3,295,111

INFORMATION STORAGE SYSTEM

Filed Sept. 25, 1963 30 Sheets-Sheet 16

Dec. 27, 1966 C. F. AULT ETAL 3,295,111

INFORMATION STORAGE SYSTEM

Filed Sept. 25, 1963 30 Sheets-Sheet 19

Dec. 27, 1966 C. F. AULT ETAL 3,295,111

INFORMATION STORAGE SYSTEM

Filed Sept. 25, 1963 30 Sheets-Sheet 23

Dec. 27, 1966 C. F. AULT ETAL 3,295,111

INFORMATION STORAGE SYSTEM

Filed Sept. 25, 1963 30 Sheets-Sheet 28

3,295,111
INFORMATION STORAGE SYSTEM
Cyrus F. Ault, Lincroft, Lee E. Gallaher, Middletown, and Tancred S. Greenwood, Colts Neck, N.J., assignors to Bell Telephone Laboratories, Incorporated, New York, N.Y., a corporation of New York
Filed Sept. 25, 1963, Ser. No. 311,424
38 Claims. (Cl. 340—172.5)

This invention relates to information storage circuits, and more particularly to such circuits adapted for use in large scale data processing systems. One system in which the circuit of this invention is advantageously adapted for use is an electronic telephone switching system such as is described, for example, in Patent No. 2,955,165 of W. A. Budlong et al., issued October 4, 1960.

In large scale data processing systems, the system rules of action, or system logic, may be determined by permanent wiring and circuit configurations or, as is the case in the aforementioned telephone switching system, the system rules of action may be stored in a semipermanent memory. In an electronic telephone switching system such as is described in the aforementioned patent, for example, it is necessary that the system be instructed as to the sequence of operation for every possible action situation. Typically, such instructions would include program information, which is employed by the central control of the telephone system to control the detailed operations of the system and their sequence priority, and translation information. The latter information is consulted by the system when a directory number is to be converted to an equipment number, for example, or a subscriber's class of service is to be determined. As mentioned above, information storage circuits may be provided in a data processing system which function solely as a permanent source of instructions in response to which the system may perform its required operations. Obviously, although such information would be permanent with respect to predetermined operating conditions, it should also be changeable to meet changing conditions encountered by the system as they arise.

Memory circuits capable of semipermanently storing instructional information for use in data processing systems are known in the prior art. One such circuit, known as the Flying Spot Store, for example, is described in Patent No. 2,830,285 of R. C. Davis et al. issued April 8, 1958, and employs a light beam produced by cathode ray tube to read information simultaneously from multiple storage plates. Conventionally, the information is stored in binary form, the plates having patterns of opaque and nonopaque spots thereon representing one or the other of the binary values. This arrangement advantageously provides for the nondestructive interrogation of the stored information since the information-bearing spots may be repeatedly sensed without affecting their translucent character. Other memory arrangements capable of permanently storing information which may be nondestructively interrogated and which may be infrequently changed, employ conventional toroidal magnetic cores as the binary storage addresses. However, in order to achieve nondestructive readout, considerable complexity is introduced into the core circuit with an attendant effect on reliability. In large scale data processing systems in which the semipermanent information store must be capable of storing in the order of five million binary bits, for example, it will further be appreciated that the cost per bit of the store will constitute an important consideration in the choice of the bit storage medium. Related to the aforementioned factor of reliability is the further demand imposed on a semipermanent information store that the permanency of the stored information bits be unaffected by power failures or transient currents and fields generated in the system during repeated interrogation of the stored information.

Another requirement of a semipermanent information store, particularly when such a store is adapted for use in a high-speed electronic telephone system, is that access circuitry be provided for the actual memory of the store which has an extremely short readout cycle. Particularly in large scale memories the access circuitry must also be capable of providing interrogation drive pulses which are timed and shaped to suit the inductive and capacitive loads presented by magnetic and electrical circuit elements comprising the very large number of bit storage addresses. Further, at the output side of the memory of the information store, readout circuitry must be provided which makes available information-representative discrete readout sigials of uniform waveshape which require a minimum reshaping for use by the system of which the semipermanent store is part. Finally, in order to insure positive discrimination among the various signals applied to and obtained from the store during its interrogation by the parent system, it is necessary that noise signals generated during interrogation be reduced to a minimum. Manifestly, all of the foregoing and other considerations impose an extremely critical burden on the organization of a semipermanent store and the design of its circuit components.

With the advent of magnetic wire memory elements such as are described, for example, in Patent No. 3,083,-353 of A. H. Bobeck, issued March 26, 1963, an advantageous memory element has been made available which is capable of having defined thereon a large number of binary bit storage addresses. The low power requirements of these elements and the facility with which they lend themselves to the fabrication of large scale memories makes them particularly advantageous in meeting the requirements of a store as generally noted in the foregoing. When these magnetic wire memory elements are employed in conjunction with card-affixed patterns of information-bearing permanent magnets in a manner such as is described in the copending application of S. M. Shackell, Serial No. 708,127, filed January 10, 1958, for example, a memory arrangement results which has been found highly useful for the permanent storage of binary information. In such a prior art memory the actual storage of the permanent binary information is accomplished by means of effective permanent magnets arranged in a predetermined pattern on a retaining card. The magnet locations correspond to the crosspoints of address locations defined on a coordinate array of magnetic wire memory elements and their coupled solenoids. The permanent magnets associated with particular bit addresses then control of the switching of discrete segments of the memory wires which in turn controls the generation of output signals indicative of the information permanently stored on the magnet cards.

This invention concerns itself with a semipermanent information store comprising the combination of a permanent magnet-magnetic wire memory and its access and readout circuitry. Accordingly, it is one object of this invention to provide a new and novel semipermanent information store.

It is another object of this invention to provide access circuitry for a large scale memory which is capable of extremely high speed operation and which offers improved reliability.

It is also an object of this invention to increase the access speed, reading speed, and storage capacity of a semipermanent information store.

A still further object of this invention is to provide a new and improved semipermanent information store adapted for use in an electronic telephone switching system.

Yet another object of this invention is to provide new and improved access and readout circuitry for a semipermanent information store.

It is also an object of this invention to provide a new and novel organization for a multiplane magnetic memory array.

The foregoing and other objects of this invention are realized in one illustrative embodiment thereof comprising in combination a random access, word organized, bulk memory having associated therewith interrogation access circuitry and readout circuitry. The memory itself has for its information storage elements a pattern of effective permanent magnets which are interrogated by an array of magnetic memory wires of the character briefly referred to in the foregoing. The general organization and features of the information store of this invention will now be briefly described.

*General description of the information store*

The memory is organized as a plurality of individual memory modules each of which in turn comprises a plurality of planes of information storage arrays. Each plane comprises a plurality of parallelly arranged magnetic wire memory elements which advantageously are of the character described in the aforementioned patent of A. H. Bobeck. More specifically, the wire memory elements each comprise in this embodiment of the invention, an electrical conductor having a magnetic tape helically wound therearound, the tape being of a material exhibiting substantially rectangular hysteresis characteristics. Each of the wire memory elements of a plane has associated therewith a return conductor which is connected at one end to an end of the tape-wound electrical conductor by a transformer primary winding. The parallelly arranged wire memory element-return conductor pairs have coupled thereto a plurality of transverse strip solenoids which are also arranged in parallel with each other to define, with the wire memory element-return conductor pairs, a coordinate array of crosspoints. At each crosspoint a discrete switching segment is defined on the helical magnetic tapes of the wire memory elements.

According to one feature of this invention, each of the strip solenoids is doubled back on itself to present two outer operative faces serving, respectively, two information planes. Two pluralities of parallelly arranged wire memory elements are thus advantageously coupled to the two faces of a single set of solenoids. The two pluralities of memory elements may for convenience be designated as falling in A and B planes of the plurality of information planes. As will be described in greater detail hereinafter, the energization of a single solenoid thus results in the simultaneous application of magnetic fields to two sets of wire memory elements. Selection to determine which of the wire memory elements of the A and B planes is operative is made in the readout circuitry.

Associated with each of the sets of wire memory elements of the A and B planes is a pattern of effective permanent magnets selectively affixed to a retaining card having a coordinate array of address locations assigned thereon. It is thus the pattern of permanent magnets in which the information of the semipermanent store of this invention is actually retained. The magnets are arranged at the coordinate address locations on the card to register with the crosspoints of a coordinate array of wire memory element and transverse solenoids. Each of the permanent magnets is so placed with respect to a discrete crosspoint segment of a wire memory element that its field effectively magnetically saturates the latter segment and maintains it in its saturated state. When the information stored in a pattern of permanent magnets is to be interrogated, a selected solenoid is energized to apply switching fields to the coupled segments of the wire memory elements. The segments held saturated by adjacent permanent magnets will be prevented from switching whereas the switching fields switch the flux of the remaining segments to the other remanent magnetic state. These operative conditions are manifested as the absence and presence, respectively, of output voltages generated across the ends of the tape-wound electrical conductors of the memory elements. These output conditions are then conventionally indicative of the storage in the pattern of permanent magnets of binary 0's and 1's, respectively. That is, the absence of an effective permanent magnet at a corresponding address location on a magnet card is representative of the storage of a binary 1 and the presence of such a magnet at a corresponding address location on the magnet card is representative of the storage of a binary 0. The magnet card is arranged with respect to the memory wire readout array in a manner such that it may be readily changed for another and different card having affixed thereon a different pattern of effective permanent magnets and hence, having stored therein different information. Thus, although the information is permanently stored in the memory thus organized with respect to given interrogation cycles, it is semipermanent in the sense that it may be changed as determined by varying system operating demands.

Advantageously, the removal and reinsertion of a magnet card makes possible a premagnetization of the buffer regions existing between the crosspoint segments of the wire memory elements. To insure that a complete switching of a crosspoint segment of a memory element takes place during interrogation, it is necessary that the segment be properly affected by the magnetic state of the buffer region between it and the next succeeding crosspoint segment on the same wire memory element. Accordingly, in the memory of the information store of this invention, each of the buffer regions is magnetized in a direction opposite to that of the interrogation drive. This is accomplished by a column of premagnetizing permanent magnets arranged immediately preceding the first column of information storage magnets on the magnet cards. The premagnetizing magnets are arranged in the column between the rows of information storage magnets. When the magnet card is inserted in its slot in the memory the premagnetizing magnets successively pass the buffer regions of each wire memory element of a plane and remanently set these regions to the desired magnetic state. This state is retained as a result of the remanent character of the wire memory element wound tape. This premagnetization is insured since it is repeated each time that a magnet card is withdrawn or inserted.

The memory of this invention, an A and B plane of which was briefly described in the foregoing, is organized in a rectangular array comprising pluralities of rows and columns of memory modules. Each module in turn comprises the same number of information planes. As will be apparent from the above brief description in which a single solenoid is stated as interrogating a plurality of permanent magnets on each of its outer faces, the memory modules are word organized. A single interrogating solenoid at a time is thus selected from the memory to sense the binary information word stored at the corresponding word address on a magnet card associated with either an A or a B information plane. The selection of a word solenoid is accomplished by a coordinate array of toroidal magnetic cores corresponding to the coordinate disposition of solenoids presented at one side of the rows and columns of the memory modules. Each of the solenoids is inductively coupled to its corresponding core so that, upon the switching of the core, the coupled solenoid is energized to apply, in turn, switching fields to the switching segments of the coupled magnetic wire memory elements.

The cores of the access core array have threaded therethrough in a manner well known in the prior art, X and Y coordinate access conductors, the selection of any single X and Y conductor pair positively defining a threaded core in the array. The cores are also threaded by a biasing conductor for maintaining them in one state of remanent magnetization. When a core is switched from this remanent state by the coincident energization of its defining X and Y conductors, which energization overrides the constantly applied bias, the bias serves to return the core to its previous remanent state after the termination of the X and Y conductor energization. It will be appreciated that the coupled solenoid will thus be energized in two directions—in one direction during the switching of the core from its biased remanent state and in the opposite direction during its restoration to the latter state by the applied bias. Advantageously, interrogation of the memory inherently returns the switching segments of the coupled wire memory elements to their original flux states in prepartion for a subsequent interrogation cycle.

According to one feature of this invention a tracking circuit means is provided which responds to any variation in the coincident currents applied to the X and Y conductors of the access core array. Signals are thus generated to control, in accordance with the variations, the current source which provides the bias for the cores. The bias is thus variably controlled to insure the proper flux excursion in the cores and thus compensate for variations in the amplitude of either or both of the coincident selection currents.

With the foregoing general organization of the memory of the semipermanent information store of this invention in mind, its access circuits may now be briefly considered. The ultimate function to be performed by the latter circuits is the coincident energization of a selected conductor of each of the X and Y conductor sets defining the access core array mentioned in the foregoing. Each set of X and Y coordinate conductors has its individual and identical access selection circuits for controlling the selective energization of its conductors, and a pulsing circuit for providing the energizing pulse. Accordingly, in the present general consideration and in the detailed description which follows only one of these selection control and pulsing circuits is specifically treated. It may be noted at this point that, not only must a selection control and pulsing circuit selectively energize a core array coordinate conductor, but it is required to do so with a current pulse having the requisite waveshape. The coordinate core array conductors each thread a large number of cores, and accordingly these conductors represent highly inductive electrical loads. The waveshape of the pulse which is employed to energize these conductors is thus of extreme importance. The rise and fall time of the energizing pulse must also be carefully controlled and both must be of short duration. Further, the amplitude of the plateau of the current pulse must be carefully controlled and the pulse must be free of overshoots and undershoots both at the base line and at the plateau. The access control circuitry according to this invention is advantageously adapted to achieve the desired current pulses in accordance with the foregoing and other governing considerations.

Associated with each set of coordinate conductors are two sets of address selection switches, each switch comprising essentially a gating means for steering a current pulse to and from a selected coordinate conductor of the access core array. One of the sets of address selection switches is associated with one end of a set of coordinate conductors and the other set of address selection switches is associated with the other end of the same set of conductors. At the one end, each of the address selection switches has connected in common therewith a different group of coordinate conductors. At the other end each of the associated sets of address selection switches also has similarly connected in parallel therewith a different group of coordinate conductors. However, the groupings of the coordinate conductors for each selection switch at either end of the conductors is such that no grouping at one end of a set of coordinate conductors includes more than one conductor of a grouping at the other end. In this manner the enabling of a selected address switch at one of a set of coordinate conductors simultaneously with the enabling of a selected address switch at the other end of the same set of coordinate conductors insures that only a single conductor of a set of coordinate conductors is selected as a current path for the core array drive current.

The selective enabling of the address selection switches is accomplished under the control of address signals provided from an address register which comprises a component of control circuitry also associated with an information store according to this invention. Upon the simultaneous enabling of an address selection switch at each end of the sets of coordinate conductors, a current path is established from the selected address switch at the input end of a coordinate conductor through the selected address switch at the output end of the same coordinate conductor. With the selection of drive current paths through a selected pair of X and Y conductors, the switching of the core of the access core array defined by the latter conductors may be accomplished in a conventional manner by the coincident application of two drive current pulses thereto.

According to one feature of this invention, the two coincident drive current pulses are supplied by identical pulse generating circuitry individual to the two sets of coordinate X and Y conductors. A constant current source is connected to the input end of the address selection switch at one end of a selected coordinate conductor and a circuit to ground for this source is completed via the output end of the address selection switch at the other end of the selected coordinate conductor. However, a normally closed current switch is shunted across the inductive load presented by the selected coordinate conductor. Accordingly, in order to energize the interrogating pulse circuit, the current shunt switch is opened under the control of the aforementioned control circuitry. Since the selected coordinate conductor being driven presents an inductive load, the drive current in the conductor cannot rise instantaneously to the constant current value of the source. Therefore, a voltage limiter is connected in parallel with the load which advantageously prevents the voltage thereacross from rising above a chosen value. As a result, the current supplied by the constant current source initially divides between the inductive load and the voltage limiter, the latter circuit providing a path for shunt path for the current from the source. An advantageous, rapid transfer of current from the direct path to ground via the current shunt switch to the selected coordinate conductor is thus effected without the generation or occurrence of undesirable oscillations at the plateau of the core array drive pulse.

When the selected core of the access core array has been switched, and thereby the coupled memory solenoid energized, the drive current pulse is terminated. However, it is impossible instantaneously to transfer the current of the constant current source from the inductive load back to the shunt path presented by the currrent shunt switch. Advantageously, and in accordance with another feature of this invention, the arrangement of the pulse generating circuits serves to effect this transfer in an extremely short time and without introducing undesirable noise in the trailing ramp of the drive pulse. At the ground side of the pulse generating circuit a current series switch is provided which, although normally closed, is opened to break the current to the inductive core load before the shunt switch is again closed to divert the drive current pulse to ground. A second voltage limiter circuit is connected in parallel with the series switch and thereby provides a path for rapidly reducing the energy in the inductive load.

As previously mentioned, address signals from the address register control the selection of the address selection switches which ultimately select the particular X and Y coordinate conductors of the access core array for coincident energization. Timing pulses required to insure that the switches so far described operate at the assigned times and for the necessary periods, are provided by an access timing chain. The timing signals are also employed to terminate the effective duration of the address signals which select and enable an address selection switch at each end of the X and Y coordinate conductors. Positive control of the switching of a core in the access core array is thus provided at a number of points within the pulse generating and access circuits, both with respect to the timing of the coincident drive pulses and their waveshapes.

When a selected core of the access core is switched in the manner briefly described in the foregoing, its coupled solenoid is energized. As a result, an interrogation field is applied along its entire length; that is, on both faces of its doubled section, fields are applied to the address segments of the A and B plane wire memory elements. At those locations on the A and B plane wire memory elements at which an effective permanent magnet appears, no flux switching occurs due to the overriding field of the magnets. However, the flux switchings at the remaining address segments generate voltages on the tape-wound conductors of the memory elements. The memory of this invention is further organized such that the individual wire memory elements of a module are connected in parallel with the individual wire memory elements of the other modules of a module grouping of the memory array. The parallel connections are then connected to common transformer primary windings, which windings serve as the output means for the corresponding bit addresses of each of the modules of the particular grouping. As a result, current signals generated by the interrogative switching of address segments of the A and B wire memory element by a word row solenoid are transmitted only through single modules of a grouping to the readout circuitry.

It will be recalled that the interrogation of the wire memory element address segments inherently reset the magnetic wire segments. After the segments not maintained in magnetic saturation by an associated information magnet are switched, they are returned to their original magnetic remanent state by the biased restoration of the driving core of the access core array defining the interrogated A and B word rows. This return of the address segments to the original magnetic state will again generate currents in the tape-wound memory elements which are opposite in polarity to those generated by the switching of the address segments. An A and a B set of bipolar output signals is thus generated responsive to each interrogation of the memory. The two sets of signal conditions, which are read out in parallel, conventionally represent the binary characters of the two binary words stored in the word rows interrogated. The sets of signal conditions will be made up of the presence of voltage signals generated at each bit location where an address segment of a wire memory element was switched and the absence of such signals at these locations where an information magnet prevented the switching of the address segment. Although an A and a B set of signals are simultaneously generated at each interrogation, only one set is significant in providing the information required by the parent system during a particular interrogation.

Selection between the A and B sets of output signals is made at readout selector circuits connected to the ends of the wire memory elements passing through the memory modules. The wire memory elements are arranged in pairs in accordance with their coupling to the A and B faces of the interrogation solenoids and each memory element pair has a dual selector circuit associated with it, to which circuits the wire memory element pairs are respectively connected. The dual output selector circuits are grouped in association with the groupings of the memory modules and perform their selection between the A and B sets of output signals generated during any single interrogation under the ultimate control of address signals also provided by the address register associated with this invention. Specifically, each readout selector circuit comprises a pair of amplifiers having inputs individual to the A and B sets of wire elements which terminate thereat. Corresponding amplifiers of all of the dual selector circuits associated with a memory grouping are then simultaneously enabled under the control of the address signals. The selector circuits thus advantageously serve to isolate, with respect to the readout circuitry, the particular module grouping within which the interrogation is being made and, within the grouping, the significant A or B word row of the two word rows interrogated by the drive solenoid.

Proceeding from the selector circuits, the bipolar output signals are applied to individual readout amplifiers. The latter circuits are each connected in parallel to each of the corresponding readout selector circuits of the memory module groupings, this economy being made possible in view of the fact that as previously mentioned, only one grouping of memory modules is interrogated at any one time. Each of the readout amplifiers has associated therewith a sampler circuit where the bipolar output signals are rectified and sampled under the control of strobe signals provided by strobe generators and amplifier circuits. The latter circuits provide precise strobe pulses which accurately time the output information signals from the memory for transmission to the parent system originally requesting it from the semipermanent store.

According to one feature of this invention, provision is made to remove a source of possible noise existing in the stray capacitance of the wiring of the memory. Any stray capacitance present in the memory is precharged to prevent dissipation of the interrogation drive pulse through unselected coordinate conductor current paths by means of a voltage source which normally holds one end of the coordinate X and Y conductors at a predetermined potential. The voltage source is controlled to remove this potential immediately preceding the time that the coincident drive current pulses are applied to the X and Y conductors and to restore it when the latter current pulses are terminated.

The foregoing general organization of the information store of this invention may be seen in recapitulation by reference to FIG. 1 where is depicted in block symbol form the relationship between the major components of this invention. The memory array 100 is interrogated by access circuits 110 and the information thus requested from the store is transmitted to readout circuits 120. The access circuits 110 are controlled to perform their selection and energization operations under the control of address signals originating in an address register 130 comprising part of the information store control circuits 140. The access circuits 110 are controlled by timing signals originating at timing circuits 132 also comprising part of the store control circuits 140. A reset circuit 130' is also included in the latter circuits to reset the address register 130 after an interrogation operation. The information read out of the memory 100 and amplified by the readout circuits 120 together with a store sync pulse are transmitted to the system of which this invention may advantageously comprise a part by transmission circuits 150 also comprising a part of the control circuits 140. Not heretofore mentioned and comprising a part of the present invention is circuitry for accomplishing a checking operation on the performance of the information store. This circuitry, termed the All Seems Well circuits, provides maintenance check signals for utilization by maintenance circuits 160 which may also comprise a part of the control circuits 140. The control circuits 140 are in turn controlled by, and provide the required response to, the parent system in which the request for information originates.

Specifically, the control circuits 140 may be directly associated with the central control of the previously mentioned typical electronic telephone switching system. This central control would then provide, for the control circuits 140, store address signals and control signals. In addition, the central control may comprise the source of sync pulses to control the timing of the various circuits of the information store and also may comprise the receiver of the information read out of the store memory 100. The control circuits 140 may comprise other components as may be determined by one skilled in the art for extending the flexibility of the information store of this invention and accordingly the control circuits 140 are not to be understood as limited to the circuits generally depicted in FIG. 1 as included therein. Further, the source of synchronizing pulses and the organization of the maintenance circuits 160 and transmission circuits 150 may be determined by the requirements of the system with which the information store of this invention is adapted for use. Since the details of these circuits are not necessary for a complete understanding of this invention, they are referred to herein only generally to provide a background of circuitry normally found in electronic telephone switching systems, for example.

Other circuits not included in the general outline of the semipermanent information store described in the foregoing also comprise a part of this invention. However, these will be considered in detail in connection with the detailed description of the entire information store together with other objects and features thereof which follow. The detailed description will be made with reference to the drawings in which.

Figure 30:
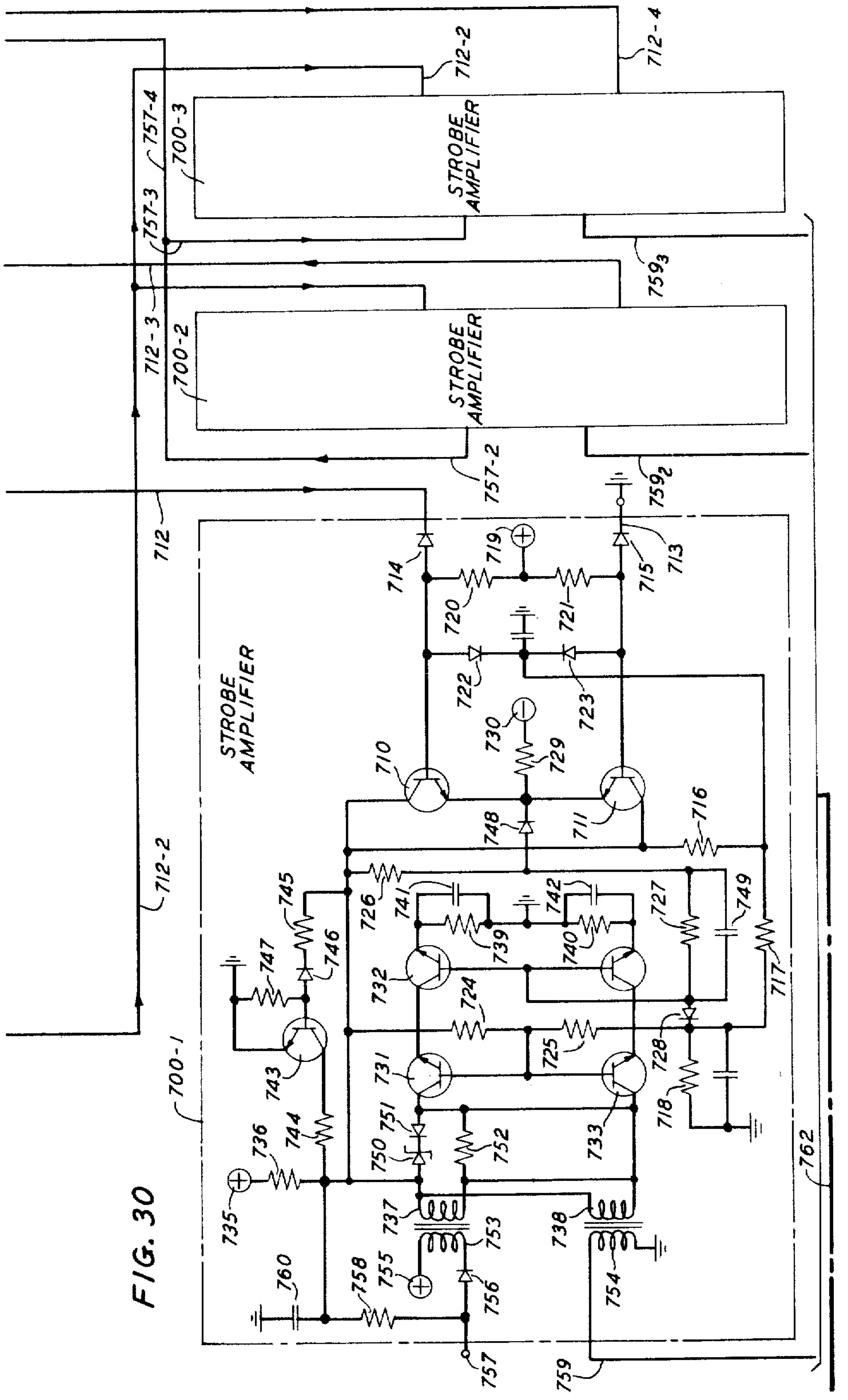
Figure 31:
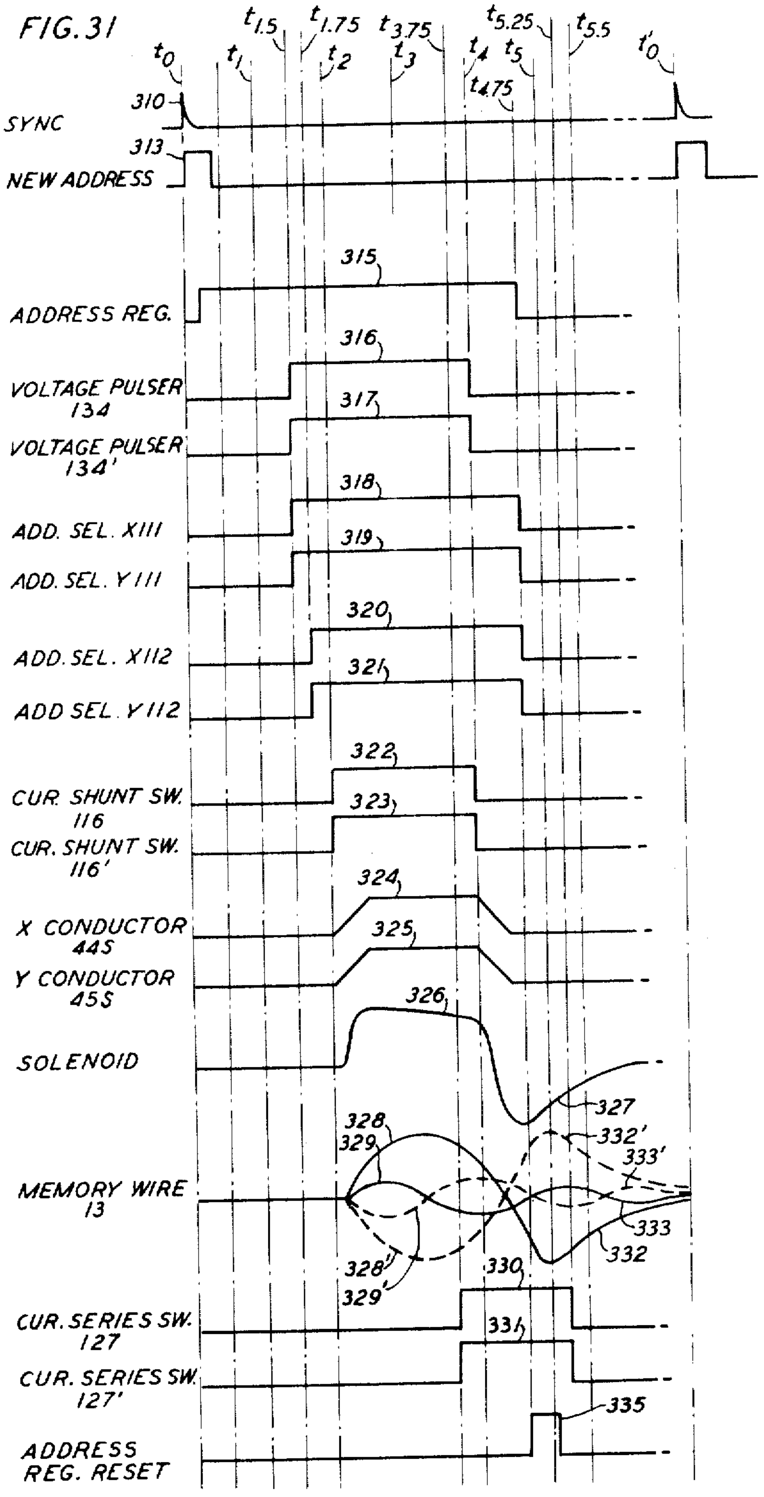
Figure 32:
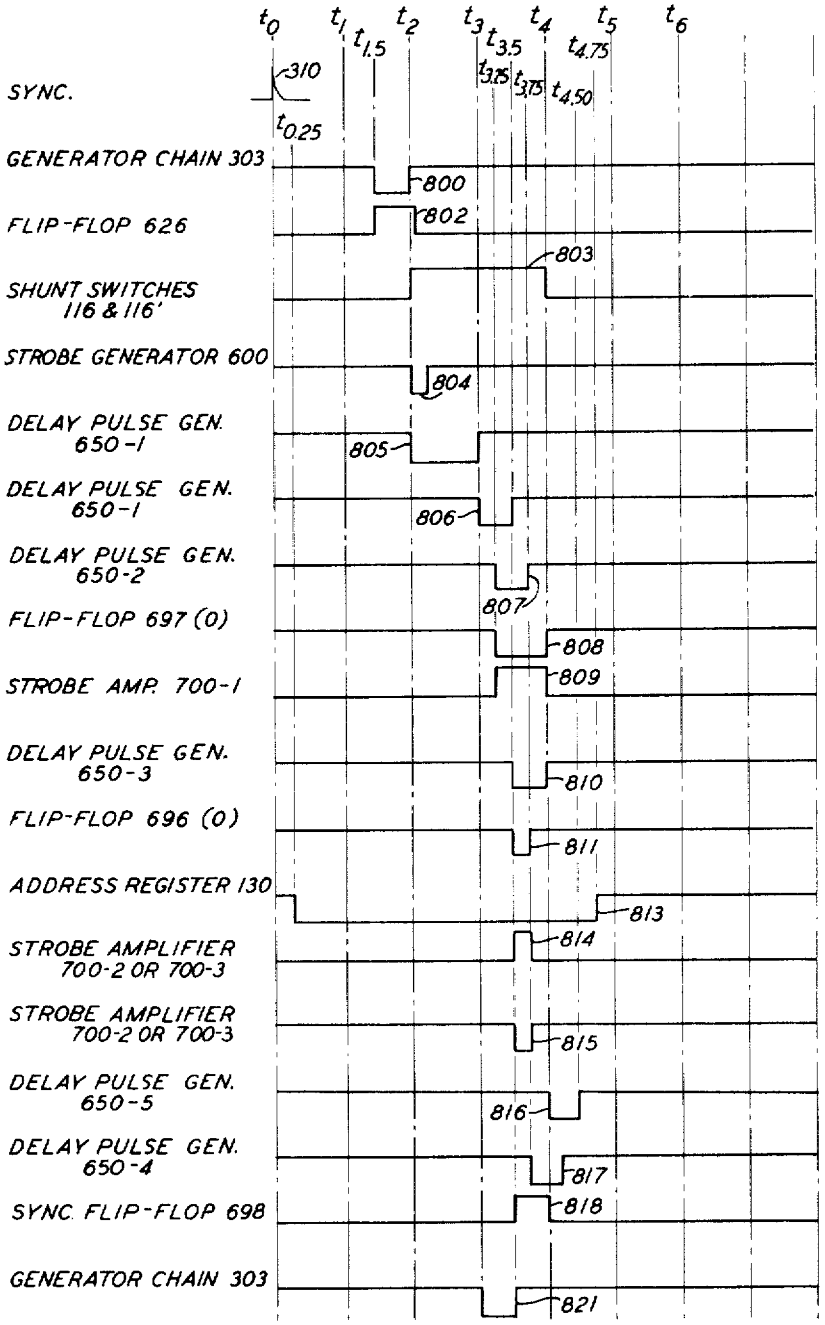
Figure 33:
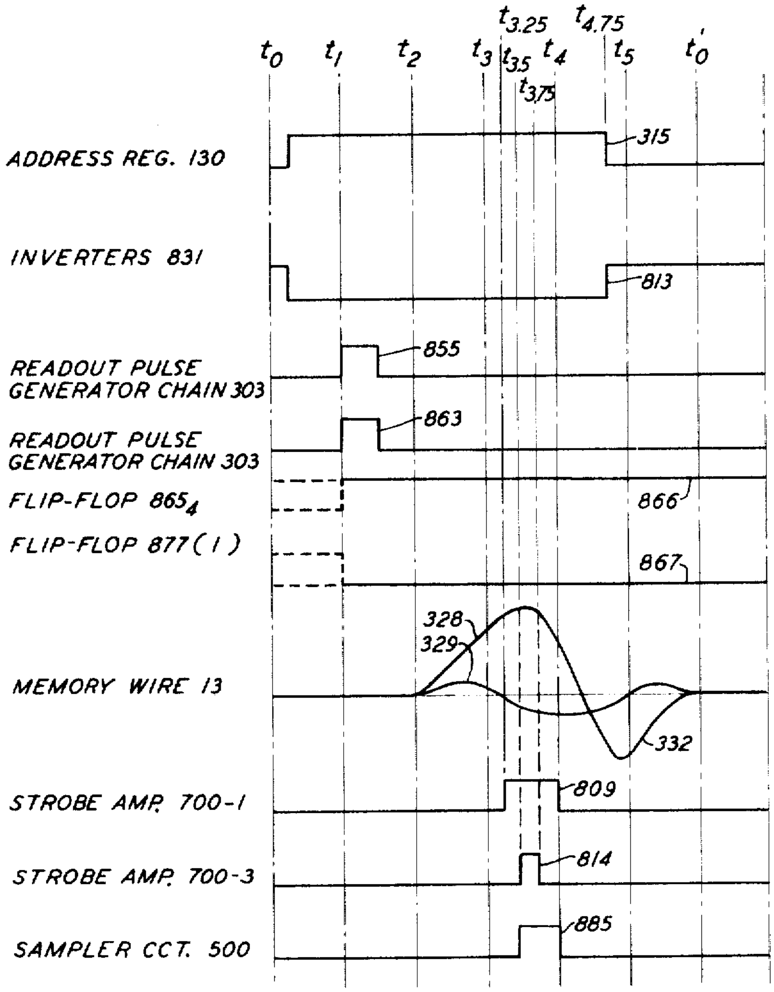
Figure 34:
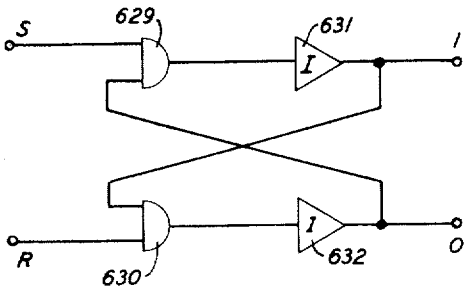
Figure 35:
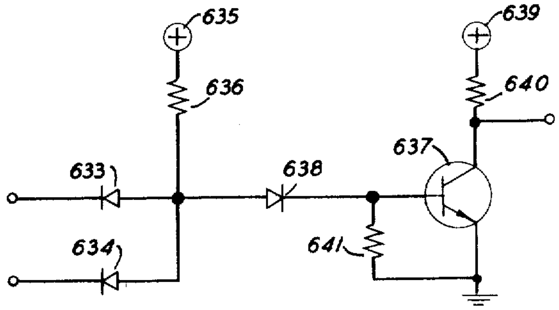
Figure 36:
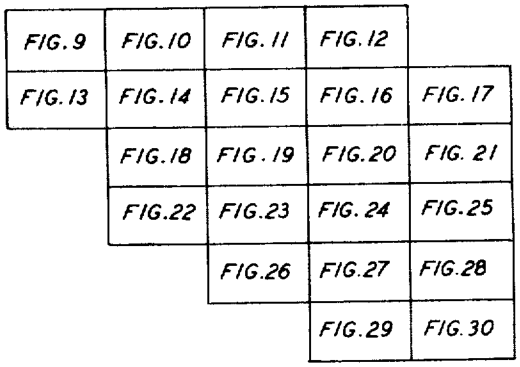

FIGS. 31, 32, and 33 are pulse comparison charts showing the relationship among the various operative control and output signals occurring during an illustrative interrogation operation of the information store of FIGS. 9 through 30;

FIG. 34 depicts the organization of an illustrative flip-flop circuit of the character employed variously in the information store of this invention;

FIG. 35 depicts the details and organization of an illustrative AND gate and inverter combination employed in the flip-flop circuit of FIG. 34 and elsewhere in the information store of this invention; and FIG. 36 shows the manner in which FIGS. 9 through 30 are organized to make up the detailed schematic diagram of the information store of this invention.

An understanding of the details of the arrangement and operation of an illustrative information store according to the principles of this invention may best be gained by the ensuing organization of the description thereof which will be followed hereinafter. A detailed description of the memory itself will first be provided followed by a specific consideration of the circuits for achieving access to the memory for interrogation purposes. Before proceeding, however, to a description of the readout circuits, an illustrative operation of the foregoing circuits and the manner in which the memory is caused to produce information representative output signals are described. Following this, the detailed organization of the readout circuits for discriminating among the output signals and providing for their amplification is considered. Next, a description of the operation and manner in which the readout circuits respond to the output signals generated by the memory during the foregoing illustrative interrogation operation is provided with particular reference to the control exercised by readout timing circuits. Finally, circuit features and their functions, such as the All Seems Well circuits previously mentioned together with other auxiliary circuits not specifically described in connection with the major circuits of the information store, will be explained in detail.

*Detailed description of the permanent magnet memory 100*

Figure 2:
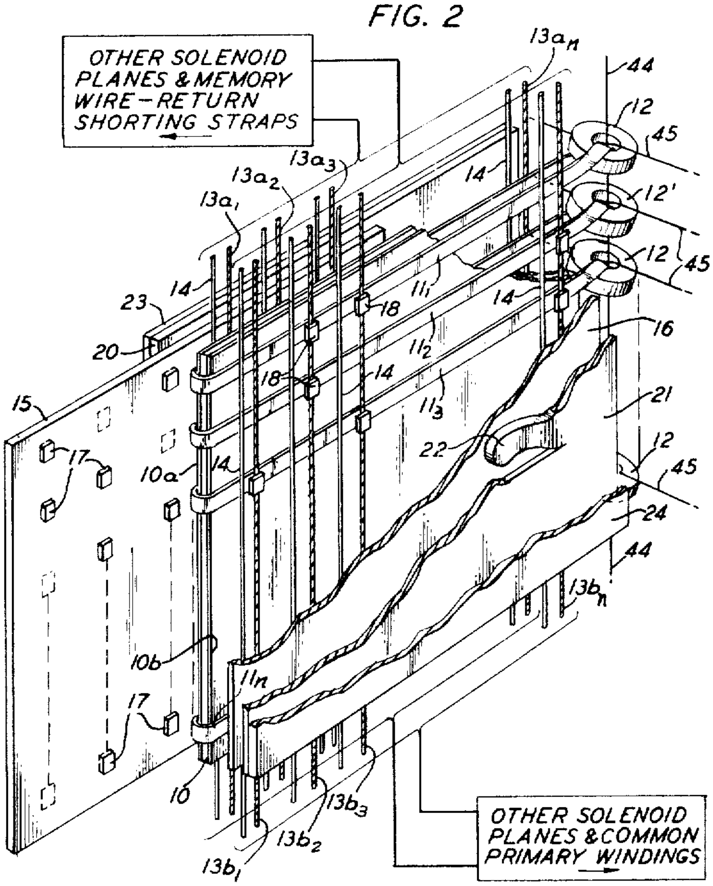
FIG. 2 is a perspective view of a basic planar construction which is repeated in each direction to make up a memory module of this invention, the view being partially broken to show its details.

The basic planar organization of the permanent magnet memory employed in the information store of this invention is depicted in FIG. 2 and comprises a symmetrical disposition of layered sections on each side of a central solenoid retaining plate 10. The plate 10 may advantageously be of a ceramic material such as that known commercially as Micalex and has wrapped therearound at spaced apart intervals a plurality of electrical strip solenoids $\mathbf{11}_1$, $\mathbf{11}_2$, $\mathbf{11}_3$, . . . $\mathbf{11}_n$. Each of the solenoids 11 is inductively coupled at one end to a conventional toroidal magnetic core 12 having substantially rectangular hysteresis characteristics. The retaining plate 10 thus divides each of the solenoids 11 into two sections, the section in the background of FIG. 2 being designated the A section and the section in the foreground being designated the B section. On each side of the retaining plate 10 and inside the two portions of the solenoids 11 is a Permalloy sheet **10*a* and 10*b* which acts as a return path to the magnetic field produced by the energization of a solenoid 11. The strip solenoids 11 are inductively coupled by each of their outer faces at the A and B sections to two pluralities of wire memory elements 13*a* and 13*b*, respectively, arranged transversely with respect to the solenoids 11. The wire memory elements 13*a* and 13*b* each comprise elements such as are described in the patent of A. H. Bobeck previously mentioned. Such elements comprise an electrical conductor which has helically wrapped therearound a magnetic tape of a magnetic material having substantially rectangular hysteresis characteristics. Associated and extending in parallel with each of the wire memory elements 13***a* and 13*b* is a return electrical conductor 14. Although not so shown in the drawing to avoid complexity, the wire memory elements 13*a* and the return conductors 14 are advantageously embedded in a flexible tape of nonconductive, nonmagnetic material such as that known commercially as Mylar, for example. The memory elements 13*b* and their return conductors are also in the practice of this invention so embedded. As is evident from the foregoing association of elements, two coordinate arrays of crosspoints are defined by the wire memory elements and the outer faces of the strip solenoids.

Proceeding in each direction from the planes presented by the wire memory elements 13*a* and 13*b*, the next of the layered sections comprise a first and a second card 15 and 16 each having a pattern of permanent magnets 17 and 18, respectively, affixed thereon. The cards 15 and 16 are each advantageously fabricated of an electrically conducting material such as aluminum, for example, card 16 being partially broken away in the drawing to show more explicitly the details of the memory construction. By virtue of their electrical conductivity cards 15 and 16 serve to concentrate the magnetic field produced upon energization of a solenoid 11 to the region immediately adjacent to the solenoid. The magnets 17 and 18 are arranged on the respective cards 15 and 16 at predetermined coordinate address locations corresponding to the coordinate arrays of crosspoints defined by the wire memory elements and strip solenoids mentioned above. The cards 15 and 16 are movably arranged with respect to the wire memory element planes such that they may be inserted or withdrawn from the memory and, when so inserted, each of the magnets affixed thereon is in registration with, and magnetically coupled to, a segment of the magnetic tape wound on a wire memory element. The card 15 is shown as being partially withdrawn to show more clearly the manner in which the magnet cards and wire memory element planes are associated. With both of the cards 15 and 16 in place, some of the crosspoint segments of the elements 13*a* and 13*b* will have permanent magnets adjacent thereto while the remaining such segments will not be so attended.

The magnets 17 and 18 are arranged on the cards 15 and 16, respectively, in accordance with the binary information to be stored in the memory. Thus, as will become more clear hereinafter in the description of the operation of this invention, the presence of a permanent magnet at a coordinate address location on its retaining card corresponds to a binary 0 and the absence of a permanent magnet at coordinate address location corresponds to a binary 1. A coordinate row of magnets and unoccupied address locations on its retaining card thus represents a stored information word. The illustrative stored word of the word row corresponding to the strip solenoid $11_2$ in the foreground of FIG. 2 thus, for example, contains the binary bits 1, 0, 1, . . . 0. Other binary words stored by the disposition of magnets on the cards 15 and 16 may be determined by inspection from FIG. 2, the absence of permanent magnets at address locations on the card 15 being indicated by dotted outlines. The strength of the magnets 17 and 18 is determined such that the fields are sufficient to maintain in magnetic saturation the coupled segments of the tapes of the adjacent wire memory elements, and the coercive force of the magnets is determined such that they will remain magnetized under the action of an energized solenoid.

In one alternate construction which effectively results in a magnet arrangement functionally identical to the one described, the cards 15 and 16 may have magnetizable elements affixed at each coordinate crosspoint location. At the predetermined crosspoints at which an effective magnet is to appear the elements are magnetized leaving the remaining elements unmagnetized. The magnet cards may have the information thus stored thereon changed simply by demagnetizing the previously magnetized metallic elements and magnetizing others. Such cards and a novel manner for magnetizing and demagnetizing the magnetizable elements thereon are disclosed in the copending application of Ault-Friedman-Granger-Madden, Serial No. 266,962, filed March 21, 1963.

Figure 3:
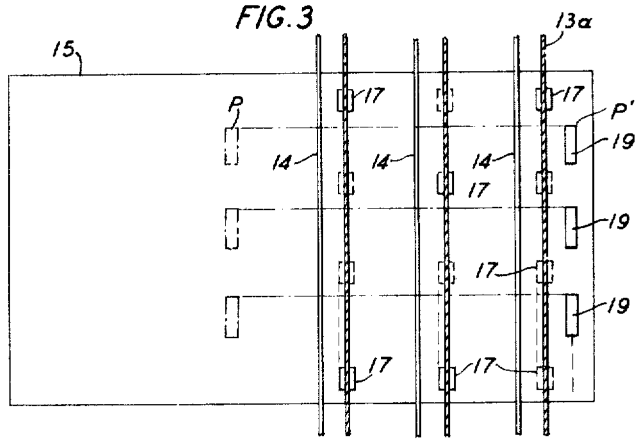
FIG. 3 shows the details and relationship of representative wire memory elements and a permanent magnet card employed in the memory of this invention with special reference to the premagnetizing magnets thereon.

In addition to the information magnets 17 and 18 described in the foregoing, each of the cards 15 and 16 also has affixed thereto preceding the first column of magnet locations other permanent magnets not directly concerned with the storage of information. The disposition of the latter magnets is more clearly shown in FIG. 3 where the hidden portion of the card 15 of FIG. 2 is depicted in association with a number of the wire memory elements 13*a*. Permanent magnets 19 are affixed to each of the cards 15 and 16 in a column and between the rows of permanent magnets 17 and 18 as shown with respect to the card 15. The magnets 19 serve to premagnetize the buffer regions between the crosspoint segments of the tapes of the wire memory elements as the cards 15 and 16 are inserted in the memory. Thus as the card 15 is moved into position adjacent the wire memory elements 13*a* in FIG. 3 and the magnets 19 are displaced from position P, for example, to the position P′, each of the buffer regions along which the magnets 19 are passed are driven to a remanent magnetic state. Because of the rectangular hysteresis characteristics of the magnetic tapes of the wire memory elements, this remanent magnetic state will be retained after the magnets 19 have passed by. The purpose of the premagnetization of the tape buffer regions will become clear as the detailed description of this invention develops. Alternative disposition of the magnets 19 to accomplish the premagnetization of the buffer regions will occur to those skilled in the art.

Adjacent each of the information planes comprising the aluminum magnet cards 15 and 16 and outwardly therefrom in each direction are disposed retaining plates 20 and 21. The plates 20 and 21 are of a nonmagnetic material and have stamped therein or otherwise affixed thereto by any convenient means a plurality of spring clips 22, one of which is shown in the broken portion of the plate 21 in FIG. 2. The spring clips 22 are formed to bear against the flexible magnet cards 15 and 16 and thus maintain the permanent magnets 17 and 18 in a positive relationship with the crosspoint segments of wire memory element tapes. The final layered sections of a basic construction of the memory of this invention are shield plates 23 placed adjacent and outwardly from the retaining plates 20 and 21, respectively. The plates 23 are formed of a magnetic material such as Permalloy, for example, and function to prevent interference between the fields of the permanent magnets on the adjacent magnet cards. The sections of the memory construction so far described and their interrelationship may be positively maintained by framework or other suitable supporting means not shown in the drawing. Such means are readily devised by one skilled in the art and do not comprise elements necessary to an understanding of this invention and accordingly are only referred to in passing.

As mentioned previously, the memory of the information store of this invention is made up of a coordinate array of memory modules, each module of which in turn comprises a plurality of the planar assemblies described in the foregoing. Thus, in a basic memory module, the construction depicted in FIG. 2 is repeated in each direction to achieve the particular capacity of the module required. However, although a plurality of solenoid planes and associated permanent magnet cards are thus required in each memory module, only two tapes containing the wire memory elements and their return conductors are employed in each module. The tape containing the A wire memory elements and their return conductors and the tape containing the B wire memory elements and their return conductors are individually extended and folded on either side of the successive solenoid planes of a memory module in the manner depicted in the side view diagram of FIG. 4. As a result of this interfolding of wire memory element tapes, although a single word interrogating solenoid simultaneously generates, during readout, output signals in two sets of wire memory elements, the output signals appear in different tapes and accordingly may be individually detected as will be described in detail hereinafter.

Figure 6:
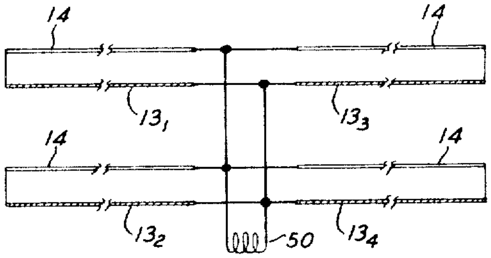
FIG. 6 depicts in simplified form the manner in which corresponding wire memory elements of a memory module group share an output transformer winding.

A description of the basic planar construction of the memory of this invention depicted in FIG. 2 is completed by the terminations of the A and B wire memory elements and their return conductors. At one end, as indicated in FIG. 6, after coupling to the solenoids of other solenoid planes in one direction, the electrical tape wound conductor of each wire memory element 13 is connected to its return electrical conductor 14 by a direct strapping means. At the other end, and also after coupling to the solenoids of the solenoid planes in the other direction, each of the electrical conductors of the wire memory elements 13 is connected via a primary transformer winding 50 to its associated return conductor 14. A complete loop circuit including therein a tape wound electrical conductor of a wire memory element 13, its return conductor 14, and a transformer winding is thus provided for each of the corresponding bit addresses of the pairs of binary words stored in a basic planar assembly as depicted in FIG. 2. Further, since as previously described, the loop circuit is folded among the planes of a memory module, it is also common to the corresponding bit addresses of each of the other planes making up the module.

To recapitulate, each of the memory modules of the memory of the information store of this invention terminates in an A set of transformer windings and a B set of such windings, one transformer winding being provided for each of the wire memory element return conductor loops interfolded among the solenoid planes of a module. As will become more apparent in a consideration of the association of memory modules to make up the memory as a whole, each of the memory modules making up a coordinate grouping of modules of the memory shares the two sets of transformer primary windings. As will be described in connection with an illustrative operation of this invention hereinafter, a substantial noise reduction is thus achieved since, in the particular module groupings employed, readout signals generated in the wire memory elements of any one memory module pass only through that module, the impedance seen by the readout signals presented by the other three memory modules causing the signals to be transmitted only to the single coupled output transformer primary windings. The organization and particular groupings of the memory modules within the memory array are described with particular reference to FIGS. 5 and 6.

Figure 5:
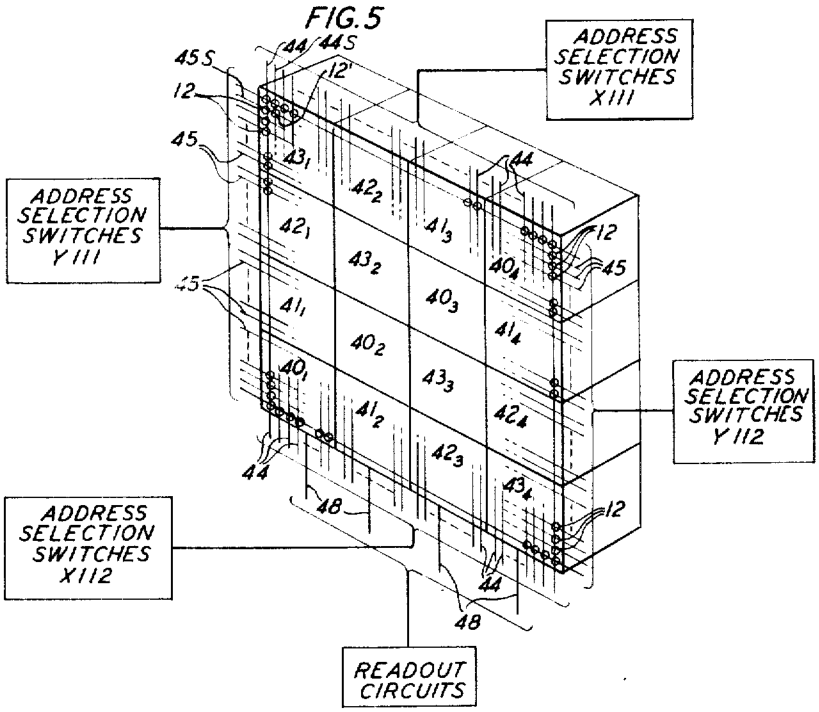
FIG. 5 shows in three dimensional block diagram form the organization of the memory modules to make up the coordinate array memory of the information store of this invention and which particularly shows representative cores of the access core array and representative coincident current drive conductors.

The memory of this invention as a whole comprises a 4 x 4 coordinate array of memory modules such as depicted in block symbol form in FIG. 5. The memory modules, rather than being functionally grouped by their rows and columns of four each, are associated by diagonals for noise reduction purposes which will become more apparent hereinafter. Memory modules $\mathbf{40}_1$ through $\mathbf{40}_4$ are grouped along a first major diagonal extending from the third to the first quadrant and the memory modules $\mathbf{43}_1$ through $\mathbf{43}_4$ are grouped along a second major diagonal extending from the second to the fourth quadrant. Memory modules $\mathbf{42}_1$ through $\mathbf{42}_4$ are arranged along minor diagonals within the second and fourth quadrants parallel to the former diagonal above and the memory modules $\mathbf{41}_1$ through $\mathbf{41}_4$ are arranged along minor diagonals within the third and first quadrants parallel to the diagonal of the memory modules 43. This organization assumes a view in FIG. 5 as being from the left foreground. With this organization in mind the common output transformer windings and their connections to the wire memory elements of the memory module groups will now become clear. In FIG. 6 is shown in simplified form the interconnection and sharing of a single wire memory element-return conductor loop circuit of each of four modules making up a module group of the memory array and the manner in which they share a common transformer winding individual to a module group. As is apparent from FIG. 6, each of the wire memory elements 13 is connected at one end with its associated return conductor 14 by a shorting strap. At the other end, corresponding wire memory element-return conductor pairs of the memory modules of a group of modules in the coordinate array memory are connected together in parallel and to a single common transformer winding 50. From any grouping of four memory modules of the coordinate memory array, two sets of transformer windings 50 thus serve as output means for the A and B wire memory elements, respectively, defining the corresponding bit addresses of the word rows of each plane of the modules.

The view of the memory array of this invention shown in FIG. 5 is that of the right hand background of the basic assembly of FIG. 2 and is also intended to depict generally the relationship of the core access switch, representative cores of which are also included in FIG. 2. As described in the foregoing, each of the solenoids 11 depicted in FIG. 2 is coupled to an individual toroidal magnetic core 12 having substantially rectangular hysteresis characteristics. The latter cores 12, as a result of the coordinate arrangement of solenoids within each of the memory modules and the coordinate organization of the modules themselves, will also present a coordinate array as depicted in FIG. 5. Each of the columns of cores 12 thus arranged has an X coordinate conductor 44 threaded therethrough and each of the rows of the cores has a Y coordinate conductor 45 threaded therethrough, representative ones of which X and Y conductors are shown in FIG. 5. Every core 12 in the access core switch array, and thus its coupled solenoid, is positively defined by a particular X and Y conductor threaded through the core. As will be described in greater detail hereinafter, the X and Y coordinate conductors are connected at each end to address selection switches which function to select one of each for the ultimate energization of a solenoid. The conductors 44 and 45 each thread the cores 12 of the access switch array in the same sense such that coincident currents applied thereto will tend to drive the coupled cores in the same direction. In addition to the conductors 44 and 45, each of the cores 12 of the access switch array has threaded therethrough a biasing conductor 46. The relationship of the cores 12 and the threaded conductors 44, 45, and 46 is more clearly seen from FIG. 7 where representative cores 12 of the array are shown in a simplified diagram. The biasing conductor 46, which threads each of the cores 12 in the same direction with a return provided between the columns of the array, is connected at one end to a bias current generator 47 and at the other end to ground. The biasing current appearing in the biasing conductor 46 is determined to be of a polarity and magnitude such as to maintain each of the cores 12 in remanent saturation in a direction opposite to that of the magnetomotive drive applied by the selected X and Y coordinate conductors.

Figures 4, 7:
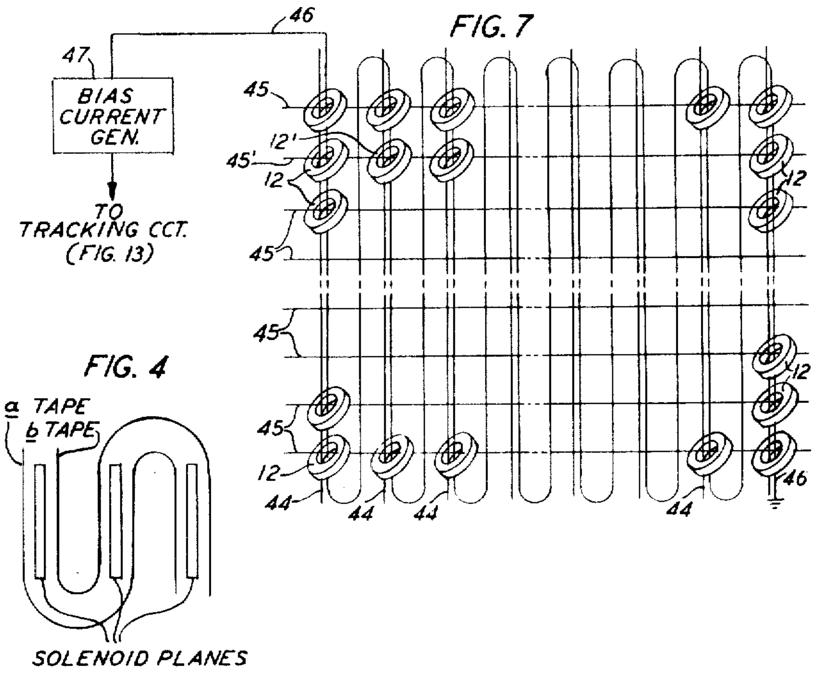
FIG. 4 is a simplified diagram depicting the manner in which the wire memory element pairs are interfolded among the information planes of a memory module of this invention.
FIG. 7 depicts the organization and wiring arrangement of the access core switch array of the memory of this invention showing only representative cores.

In the foregoing detailed description, the specific capacity of the various assemblies of the memory of this invention was left undetermined. In one illustrative construction of a memory so far described, which is especially adapted for use in an electronic telephone switching system, sixty-four of the solenoids depicted in FIG. 2 on each plate 10 define an equal number of binary words on each of the outer faces thereof such that the capacity of each subassembly of a memory module as shown in FIG. 2 is one hundred twenty-eight words. Each of the binary words contains forty-four binary bits; accordingly, each of the A and B wire memory element tapes contains forty-four such wire memory elements and an equal number of return conductors. Each of the memory modules contains sixty-four of the subassemblies shown in FIG. 2 thereby bringing the total capacity of each module to 8,192 binary words of forty-four binary bits each. One hundred twenty-eight permanent magnet cards are thus provided, each having a 64 x 44 coordinate array of permanent magnet address locations thereon. With the memory array as a whole comprising a 4 x 4 array of memory modules, the total capacity of the memory is 131,072 words or 5,767,168 binary bits. The access switch of the memory as depicted in FIGS. 5 and 7 thus comprises a 256 x 256 core array defined by two hundred fifty-six X coordinate conductors and two hundred fifty-six Y coordinate conductors. At the readout side of the memory, each of the output leads 48 shown in FIG. 5 represents eighty-eight transformer winding terminations (forty-four for each of the sets of A and B wire memory elements and their return conductors).

As is clear from the foregoing, the introduction and change of information in the memory so far described is accomplished by the insertion and replacement of information cards on which the information is contained in the form of a pattern of permanent magnets. The information is thus stored permanently until such time as the magnet cards are changed. Access to the memory for the interrogation of the stored information is had by means of the access core switch array depicted in FIGS. 5 and 7. More specifically, the memory so far described is interrogated by the selective energization of one of each of the X conductors 44 and Y conductors 45. The access circuits 110 shown in block symbol form in FIG. 1 for selecting one of each of the latter conductors and for applying coincident interrogation currents thereto may now be described in detail.

*Detailed description of the access circuits 110*

Figure 8:
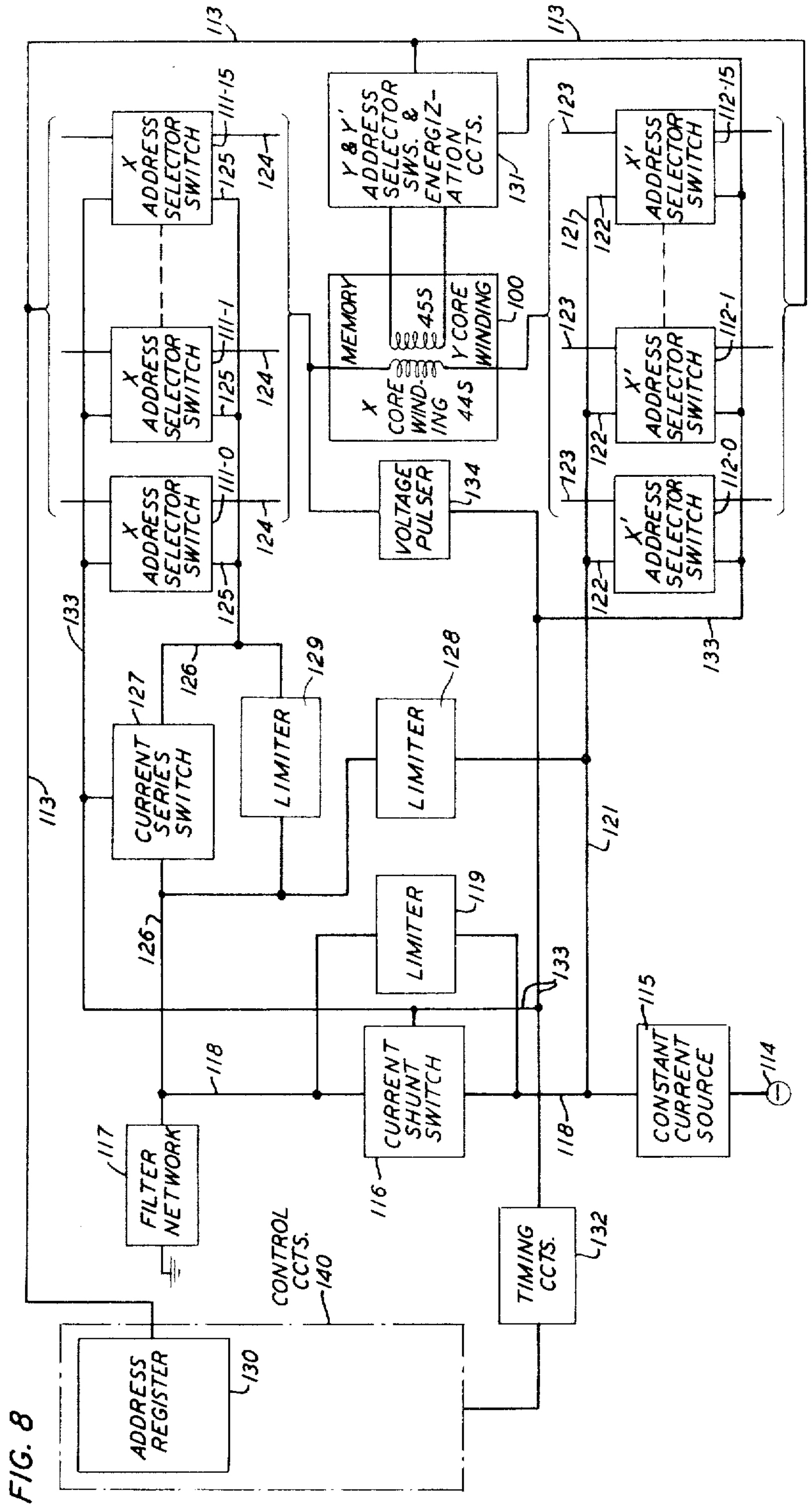
FIG. 8 is a block diagram of the access circuitry of the information store of this invention showing the organization of the major components thereof.

The access circuits 110 of the information store of this invention will best be understood by first considering their general organization with particular reference to FIG. 8 where these circuits are shown in block symbol form. The memory 100, depicted in FIG. 1 and more particularly in FIG. 5, is shown in detail only to the extent of including a single winding 44' as representing the individual couplings of the X conductors 44 and the associated cores 12 and a single winding 45' as representing the individual couplings of the Y conductors 45 and the associated cores 12. Each of the X conductors, as represented by the winding 44', is connected at one end to an address selection switch 111 and at the other end to an address selection switch 112. A total of sixteen switches 111 are provided and each is associated with a group of sixteen of the two hundred fifty-six X conductors. Similarly a total of sixteen switches 112 are also provided, each switch of which is associated with a different group of sixteen of the two hundred fifty-six X conductors. Selection, and accordingly the enabling of an address selection switch 111, is accomplished by address signals transmitted via an address cable 113 from an address register 130 which comprises part of the control circuits 140. The address selection switches 112 are also selectively enabled by address signals from the address register 130 also via the address cable 113.

When the address selection switches 111 and 112 are selectively enabled, a pulsing circuit for applying an interrogation drive current to the circuit path through the access core switch array is provided which originates at a negative potential source 114. The source 114 provides power for a constant current source 115 which is normally connected in a circuit to ground including a current shunt switch 116 and a filter network 117 via bypass conductors 118. Connected in parallel with the switch 116 is a voltage limiter circuit 119. Paralleling the circuit thus generally described is an X conductor energization circuit which may be traced from the constant current source 115 to ground at the other side of the filter network 117 via a conductor 121, an input 122 of an address selection switch 112, an output 123 of the same switch, a selected X conductor, an input 124 of an address selection switch 111, an output 125 of the same switch, a conductor 126, and a second current switch 127. A voltage limiter 128 is shunted across the energization circuit thus traced and a voltage limiter circuit 129 is connected in parallel with the second current switch 127.

Figure 1:
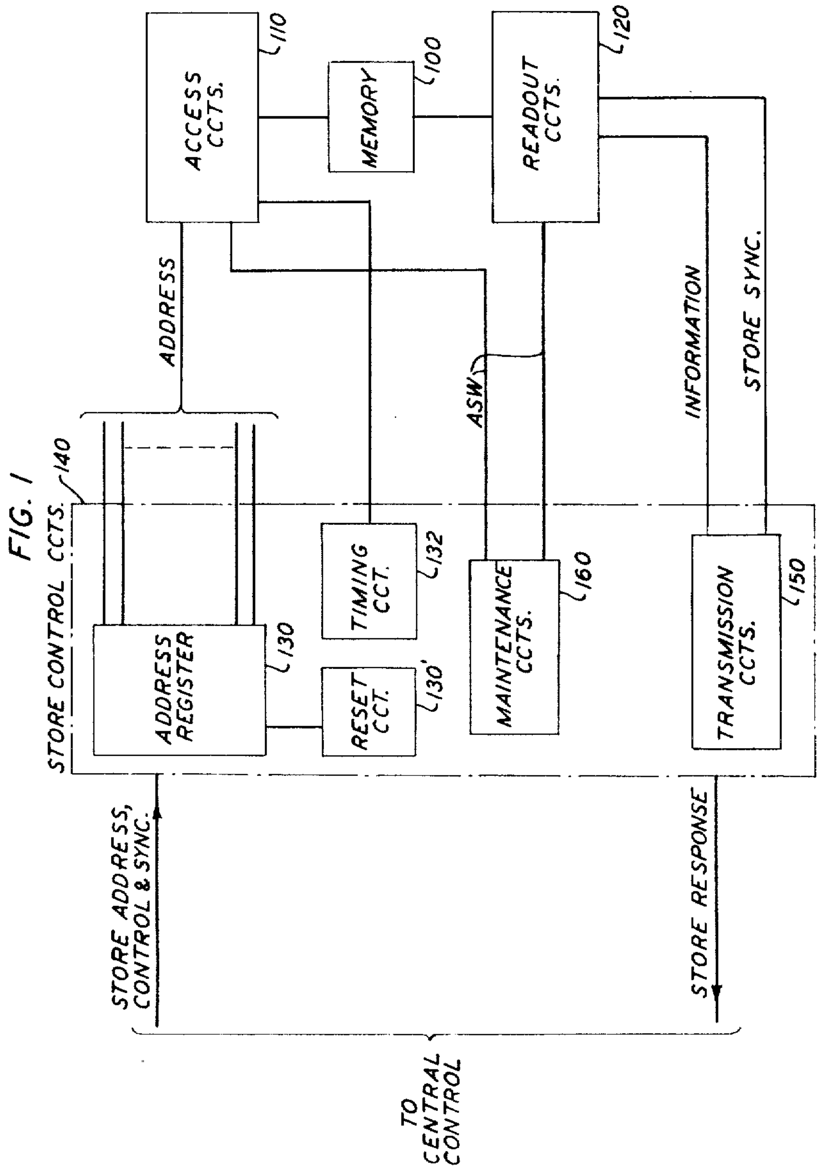
FIG. 1 is a block diagram of the information store of this invention showing the organization of the major components thereof.

The Y conductors, represented in the block diagram of FIG. 8 by the winding 45', are also provided with address selection switches identical to those generally described in the foregoing and are accordingly shown only by the single block 131. The X and Y conductor address selection switches are simultaneously activated during an interrogation of the memory of the information store under the control of timing signals supplied by timing circuits 132 via timing conductors 133. The timing signals are ultimately controlled by a synchronizing pulse originating through the control circuits 140 at a central control not shown in FIG. 8. A voltage pulser 134, also controlled by the timing circuits 132, provides a potential to one end of the X conductors, which potential is employed in the reduction of noise during interrogation. Such a voltage pulser is also included in the Y conductor access circuits as represented by the block 131. Since the maintenance circuits 160 and the transmission circuits 150 of FIG. 1 are not essential to an understanding of the general organization of the access circuits of FIG. 8, these circuits have been omitted from the latter figure. With the foregoing general organization of the access circuits of this invention in mind, these circuits may now be described in detail.

FIGS. 9 through 19 show the details of the access circuits of this invention, the circuits which are identical repetitions of those shown in schematic detail being repeated only in block symbol form. Before considering in detail the circuits which operate to apply the coincident interrogation drive currents to the X and Y conductors of the access core switch array of FIG. 7, the circuitry concerned with the selection of the particular X and Y conductors to which the interrogation current is applied will first be described. The X and Y conductors of the access core switch array are connected at opposite ends to individual pluralities of address selection switches 111 and 112. For convenience in associating the particular ends of the X and Y conductors, the address selection switches at one end of the X conductors are designated X111 and at the other end, X112. Similarly, the address selection switches at one end of the Y conductors are designated Y111 and at the other end, Y112. Since the address selection switches Y111 and Y112 and their selective energization are identical to the switches X111 and X112, only the switches X111 and X112 and their interconnection with the X conductors will be described in detail.

Figure 15:
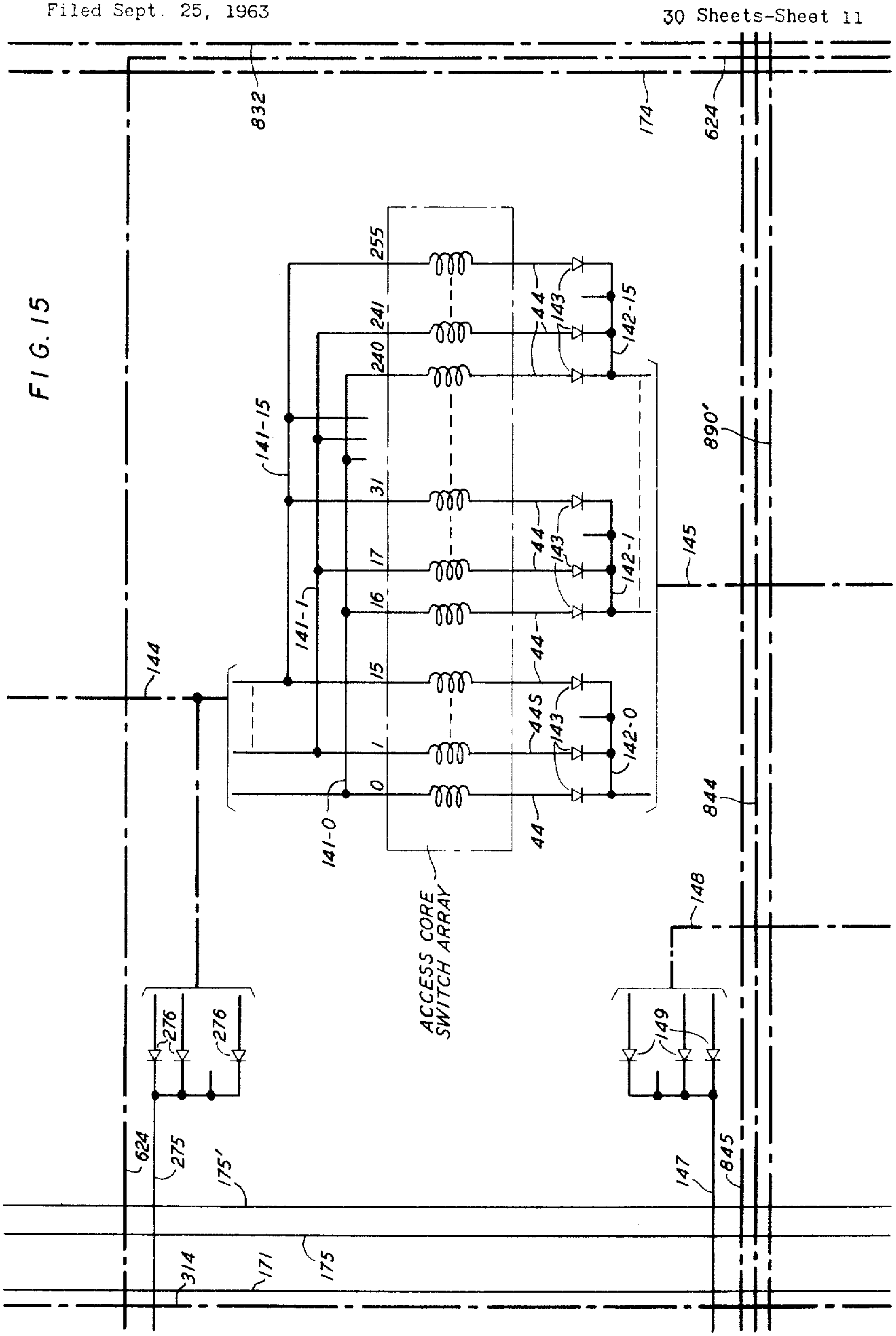

Representative ones of the X conductors 44 are shown in FIG. 15, each including a single winding representing each of the couplings of a conductor to a core 12 of the access core switch array. At one end, which for convenience may be designated the X end, the X conductors 44 are connected in parallel in groups by means of a plurality of paralleling conductors 141–0 through 141–15. For purposes of describing an illustrative embodiment of an information store according to this invention, it will be assumed that the capacity of the store is that described hereinbefore. Accordingly, the grouping of the X conductors 44 at the X end is such that each of the paralleling conductors 141 connects sixteen of the X conductors 44 in parallel. More specifically, the two hundred fifty-six X conductors are grouped at the X end by connecting the X conductors 0, 16, . . . 240 to the conductor 141–0, connecting the X conductors 1, 17, . . . 241 to the conductor 141–1, and continuing this process through the last group by connecting the latter group of X conductors 15, 31, . . . 255 to the conductor 141–15. The X conductors 44 are additionally labelled for this purpose in FIG. 15 in accordance with the position in the sequence of two hundred fifty-six conductors.

At the other end, which for convenience may be designated the X′ end, the X conductors 44 are also connected in parallel but in different groups by means of a plurality of conductors 142–0 through 142–15. More specifically, the two hundred fifty-six X conductors are grouped at the X′ end by connecting the X conductors 0, 1, . . . 15 to the conductor 142–1, and by continuing this process through the last group by connecting the X conductors 240, 241 . . . 255 to the paralleling conductor 142–15. Each of the X conductors 44 also includes therein at the X′ end a diode 143.

Figure 11:
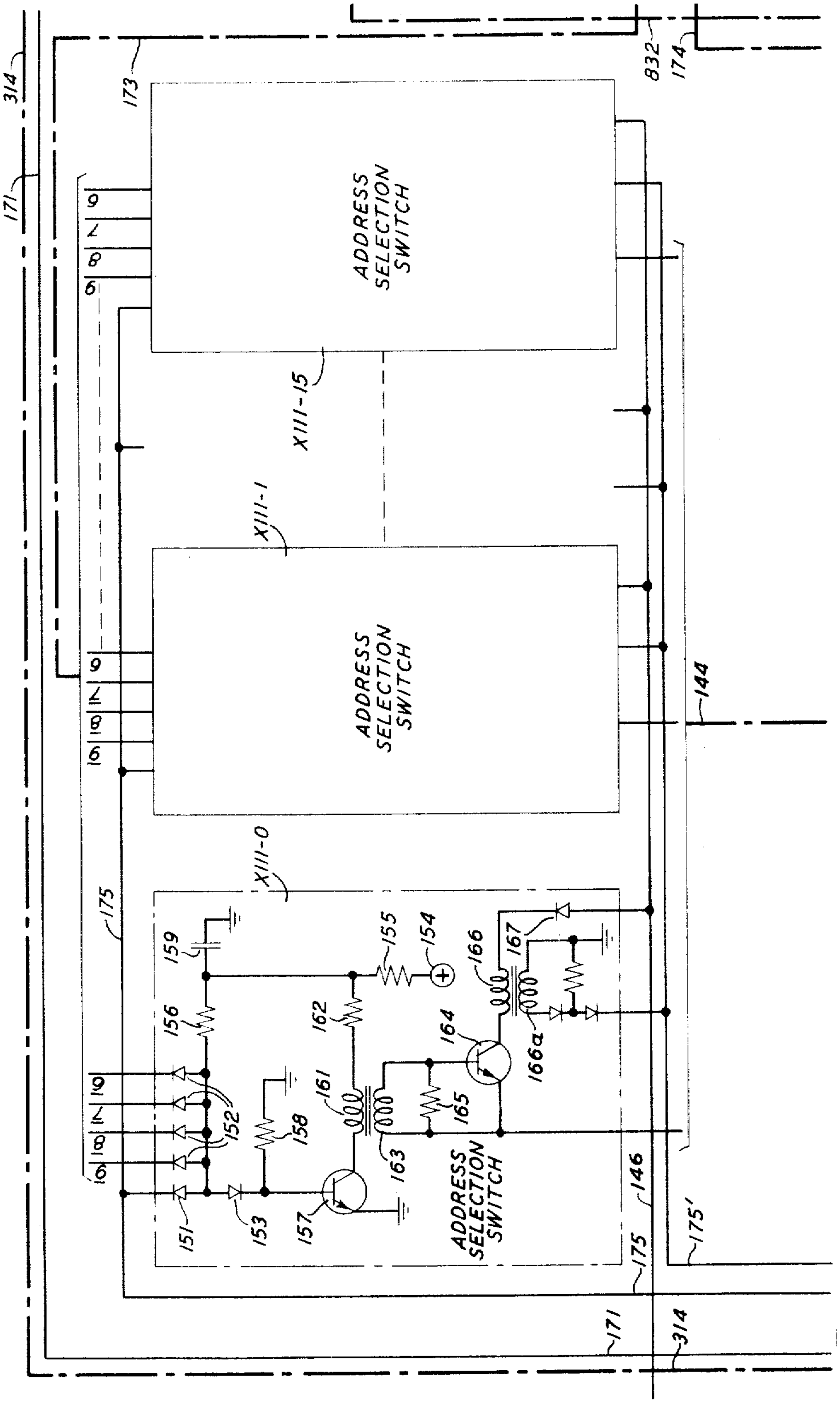

Returning to the X end of the X conductors 44, each of the groupings is connected by means of its paralleling conductor 141 to an address selection switch X111 in FIG. 11 individual to the group via a cable 144. The cable 144 connects the groupings of X conductors 44 to respective input terminals of the address selection switches X111 such that the paralleling conductors 141–0 through 141–15 are directly connected to the input terminals of the address selection switches X111–0 through X111–15, respectively. At the X′ end of the X conductors 44, each of the groupings is connected by means of its paralleling conductor 142 to an address selection switch X112 individual to the group via a cable 145 extended to FIG. 19. The cable 145 connects the groupings of X conductors 44 to respective output terminals of the address selection switches X112 such that the conductors 142–0 through 142–15 are connected directly to the output terminals of the address selection switches X112–0 through X112–15, respectively. From the foregoing manner of grouping the opposite ends of the X conductors 44 by the paralleling conductors 141 and 142 as depicted in FIG. 15, it will be apparent that the selection of any one conductor 141 and any one conductor 142 will select a single X conductor of the access core switch array. This follows since no X conductor 44 in a grouping at its X end occurs in more than one other grouping at its X′ end. The energization of a selected one of the address selection switches X111, to which the paralleling conductors 141 are respectively connected, and the simultaneous energization of a selected one of the address selection switches X112, to which the paralleling conductors 142 are respectively connected, thus results in the selection of a single X conductor 44 of the two hundred fifty-six such X conductors of the access core switch array.

As mentioned in the foregoing, each of the address selection switches X111 is connected by means of an input terminal to a respective paralleling conductor 141 via the cable 144. Similarly, each of the address selection switches X112 is connected by means of an output terminal to a respective paralleling conductor 142 via the cable 145. Each of the address selection switches X111 is also connected by means of an output terminal to a pulsing conductor 146, which latter conductor comprises one side of the energization circuit for supplying a coincident current to the access core switch array. An address selection switch X111, as will be seen hereinafter, thus acts as a switch for completing a circuit path between the input and output terminals referred to above. Similarly each of the address selection switches X112 is also connected by means of an input terminal to pulsing conductor 147 via a cable 148 extending between FIGS. 15 and 19 and which latter conductor comprises the other side of the aforementioned energization circuit. The latter connections are made through diodes 149, the purpose of which will become apparent hereinafter. An address selection switch X112 thus similarly acts as a switch for completing a circuit path between its input and output terminals.

Figure 19:
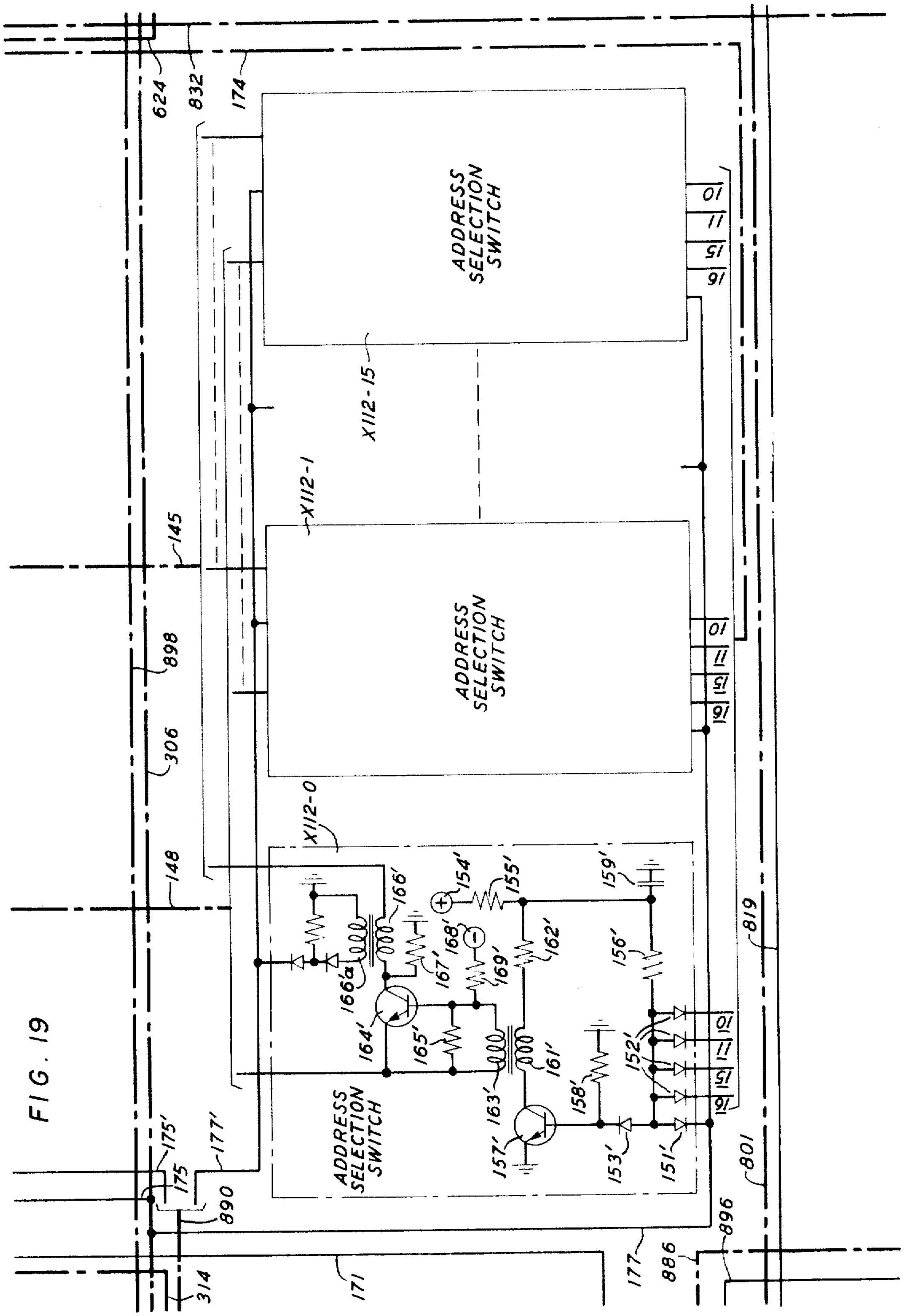

Each of the address selection switches X111 and X112 comprises identical circuit details as may be seen in connection with switch X111–0 of FIG. 11 and switch X112–0 of FIG. 19. The switch X111–0, for example, comprises a five-input low level logic AND gate followed by a transformer coupled high power switch. The AND gate comprises a timing input diode 151 parallelly associated with four address input diodes 152 connected back to back with a shifter diode 153. A biasing circuit for the diodes within the switch X111–0 is provided from a source of positive potential 154, through a pair of resistors 155 and 156, the diode 153, and the base of a control transistor 157. Connections to ground are provided at the base of the latter transistor through a resistor 158 and through a resistor 156 and a decoupling circuit comprising resistor 155 and a capacitor 159. The saturation of the transistor 157 completes a conducting path from ground via its emitter-collector circuit, a primary transformer winding 161, a resistor 162, and the resistor 155 to the potential source 154. Current in the transformer winding 161 is coupled by means of a transformer secondary winding 163 to enable at its base a switch transistor 164 across a resistor 165. The address selection switch X111 completes its function when the latter transistor completes a current path via its emitter-collector circuit, a transformer primary winding 166, and a diode 167 between the input and output terminals of the switch X111 mentioned previously. The diode 167 prevents negative voltage transients from appearing on the collectors of the transistors 164 of the address selection switches X111 other than the selected one during an interrogation operation. Additional circuit details and the specific operation of the circuit elements will become apparent from a consideration of an illustrative operation of the access circuits to be described hereinafter.

The address selection switches X112 are substantially similar to the switch X111, the organization of which was described in the foregoing. Accordingly, identical circuit elements of the switch X112–0 are indicated by the same reference characters primed. A switch X112 thus also completes its function when the transistor 164′ completes a current path via its emitter-collector circuit and a transformer primary winding 166′ between the input and output terminals of the switch X112 also mentioned previously. It may be noted that the switch X112–0 includes, in addition to the elements catalogued for the switch X111–0, a resistor 167′, connected between ground and the collector of transistor 164′, and a source of negative potential 168′ connected through a resistor 169′ to the base of the latter transistor. These elements comprise parts of a circuit which provides for the recharging of the access core array for noise reduction purposes to which this description will return hereinafter. Other elements of the switches X112 will also be considered in more appropriate sequence.

Figure 12:
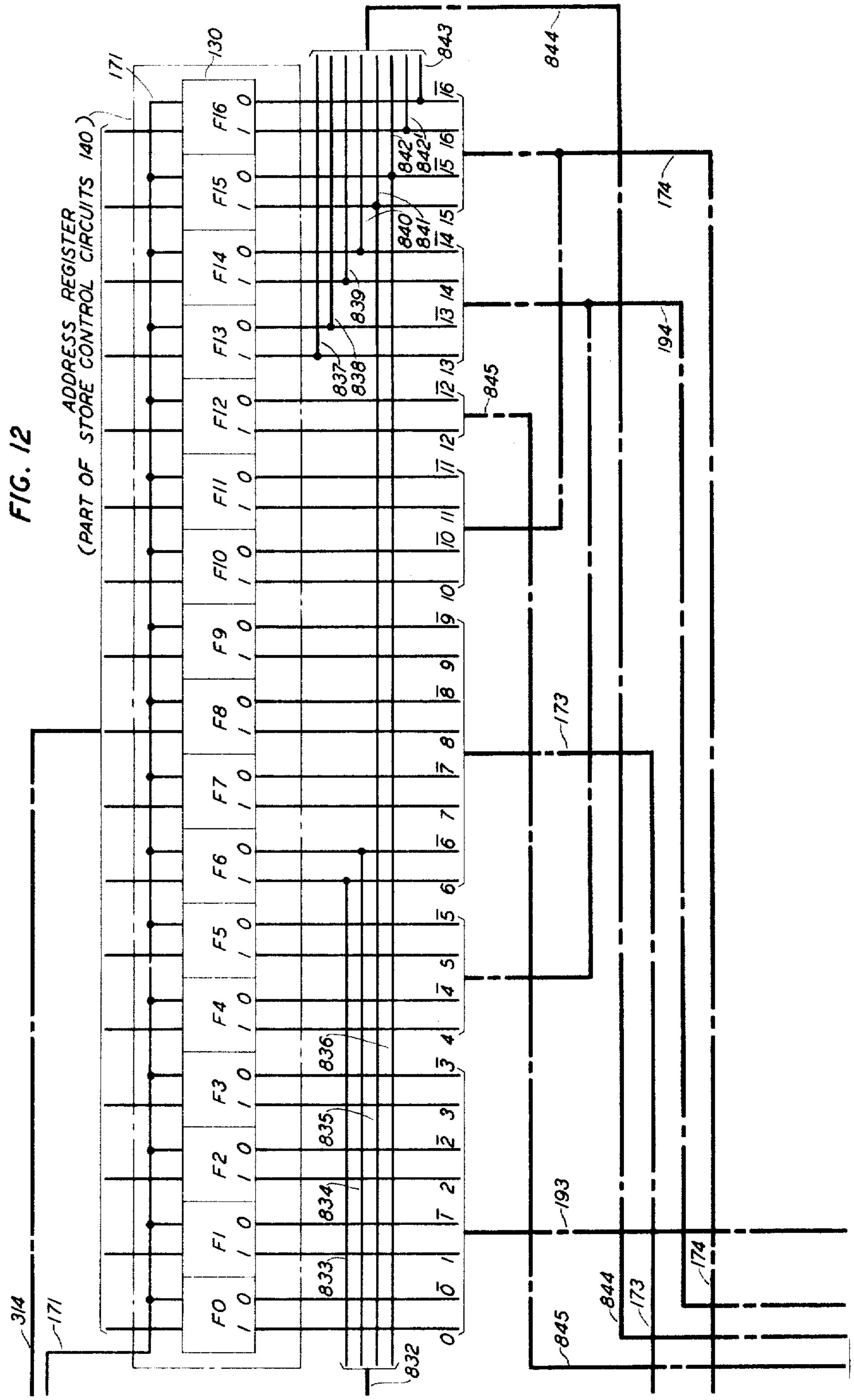

The organization of the circuitry for selectively enabling the address selection switches X111 and X112 may now be considered with particular reference to FIG. 12 which depicts an address register in which the addressing information may advantageously be stored. It will be recalled from the organization of the switches X111–0 and X112–0 that four logic inputs were provided for each switch across the diodes 152 and 152′, respectively. Address signals for the inputs of these and the remaining X111 and X112 selection switches are provided by an address register 130 depicted in FIG. 12. The address register 130 comprises seventeen bistable circuits, which may conventionally comprise flip-flop circuits of a character to be described in detail, designated by the F0 through F16 numbered binary bits produced thereby in accordance with the illustrative assumed capacity of the information store of this invention. Each of the flip-flops of the register 130 has double-rail logic output conductors on which the signals appear as determined by the binary output of a flip-flop. In accordance with the convention assumed in the present description, the output conductors of the flip-flops are designated by the numbered binary bits and their negations thus: 0, $\bar{\mathbf{0}}$; 1, $\bar{\mathbf{1}}$; 2, $\bar{\mathbf{2}}$; 3, $\bar{\mathbf{3}}$; etc. Each of the flip-flops of the register 130 has a reset input connected to a common reset conductor 171. The reset conductor 171 is extended through FIGS. 11, 15, and 19 to an address register reset circuit 130' of the program store control circuits 140 of FIG. 18. In addition, each of the flip-flops also has a set input carried via a cable 314 to the store control circuits 140 where the address control signals are ultimately received from a central control or other circuitry of the parent system of which the present information store may comprise a part.

The address binary bits provided by the register 130 are transmitted from the output conductors of the flip-flops to the logic inputs of the sets of address selection switches X111–X112 to accomplish the selection of one switch from each of these sets of switches in accordance with any convenient assignment of the bits 0 through 16. In accordance with the particular assignment chosen for the illustrative embodiment of this invention being described, binary bits 6 through 9 control the selection of the address selection switches X111–0 through X111–15, binary bits 10, 11, 15, and 16 control the selection of the address selection switches X112–0 through X112–15, binary bits 0 through 3 control the selection of the address selection switches Y111–0 through Y111–15, and the binary bits 4, 5, 13, and 14 control the selection of the address selection switches Y112–0 through Y112–15. The twelfth bit is employed to discriminate during interrogation between the binary words simultaneously read out on the A and B memory element tapes as will be considered in detail hereinafter.

More specifically, the interconnections between the flip-flops F6, F7, F8, and F9 of the register 130 are carried via a cable 173 extended to the address selection switches X111–0 through X111–15 of FIG. 11 in accordance with the binary translation of the numerical designations of the switches X111. In order to avoid complexity of detail in the drawings, these interconnections are not specifically shown but will be understood by one skilled in the art to be represented by the cable 173. Since the binary translation of the numerical designation of the switch X111–0 are the binary bits 0, 0, 0, 0, the interconnections with the flip-flops F6, F7, F8, and F9 include connections from the output conductors $\bar{\mathbf{6}}$, $\bar{\mathbf{7}}$, $\bar{\mathbf{8}}$, and $\bar{\mathbf{9}}$ of the latter circuits to the inputs similarly marked at the control side of the switch X111–0, with the sixth bit, which is the most significant binary bit, appearing on the right hand side of the latter sequence. In the same manner the interconnections with the flip-flops F6, F7, F8, and F9 include connections from the output conductors 6, $\bar{\mathbf{7}}$, $\bar{\mathbf{8}}$, and $\bar{\mathbf{9}}$ of the latter circuits to the inputs similarly marked at the control side of the switch X111–1 in accordance with the binary translation 0, 0, 0, 1 of that switch. These interconnections are continued through the sequence of sixteen switches, the last switch X111–15 having its control inputs 6, 7, 8, and 9 connected via the cable 173 to the similarly marked output conductors of the flip-flops F6, F7, F8, and F9 in accordance with its binary code translation, 1, 1, 1, 1, of its numerical designation.

In an identical manner to that described for the address selection switches X111, the control inputs of the switches X112 are interconnected with the output conductors of the flip-flops F10, F11, F15, and F16 in accordance with binary code translations of their numerical designations. The interconnections are represented, and the address signals are carried, by a cable 174 extending from FIG. 12, through FIGS. 11 and 15, to the control inputs of the address switches X112 of FIG. 19. Thus, to cite an example of the X112 sequence of switches, the switch X112–0 has the control inputs marked $\bar{\mathbf{10}}$, $\bar{\mathbf{11}}$, $\bar{\mathbf{15}}$, and $\bar{\mathbf{16}}$ connected to the similarly marked output conductors of the flip-flops F10, F11, F15, and F16 of the register 130. The remaining interconnections of the switches X112–1 through X112–15 may be determined from an inspection of FIGS. 12 and 19.

Returning now to the one remaining input of each of the switches X111 and X112, it will be recalled that the AND gates comprising the logic control input of each of these switches includes a timing diode 151 and 151', respectively. Each of the diodes 151 of the switches X111 is connected to a common timing conductor 175 which is extended through FIG. 15 to a timing cable 306 which is in turn connected to timing circuitry in FIG. 18 in a manner to be described hereinafter. A corresponding common conductor 177 connecting the diodes 151' of the switches X112 in parallel is also connected to the timing cable 306.

Figure 16:
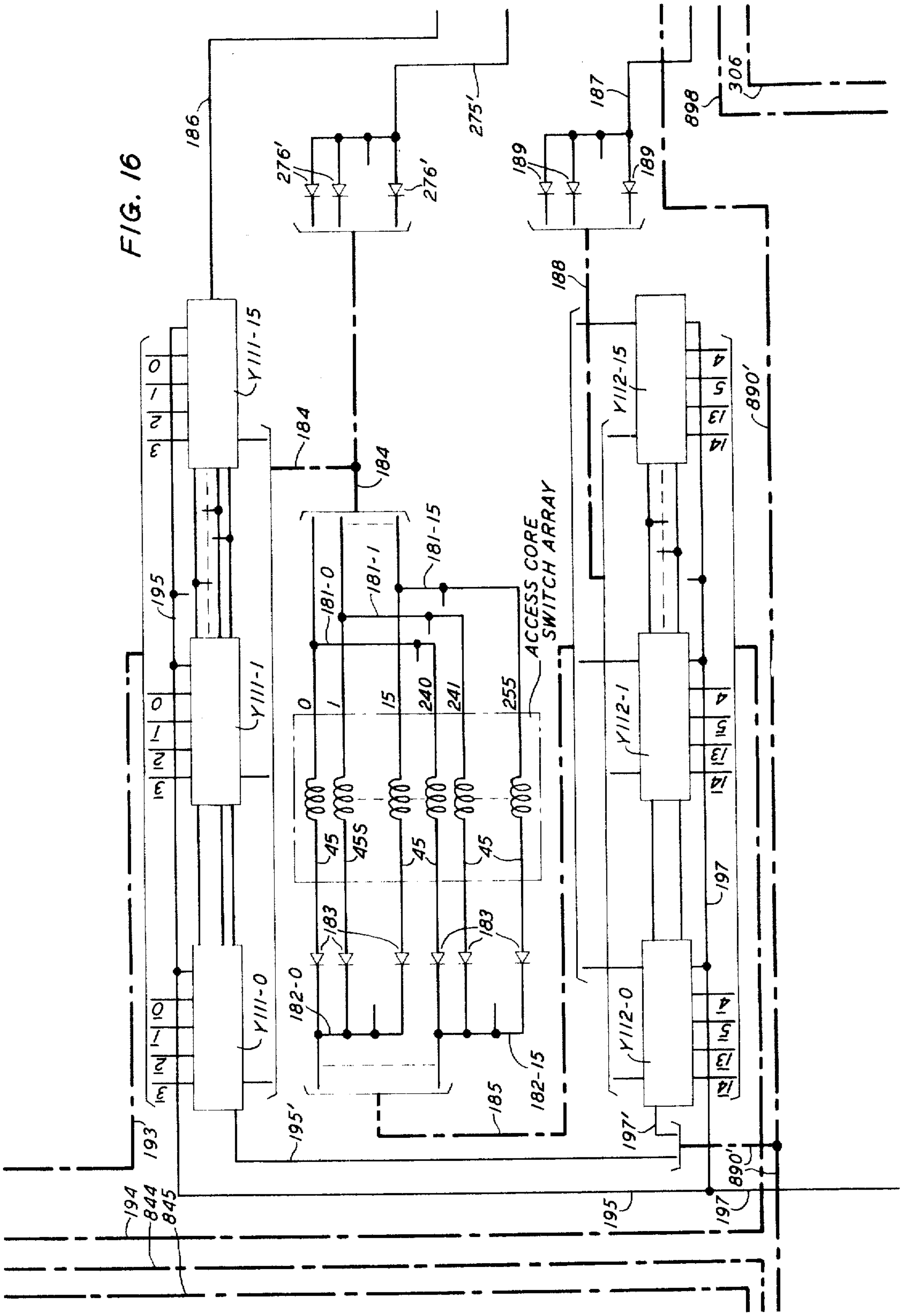
Figure 17:
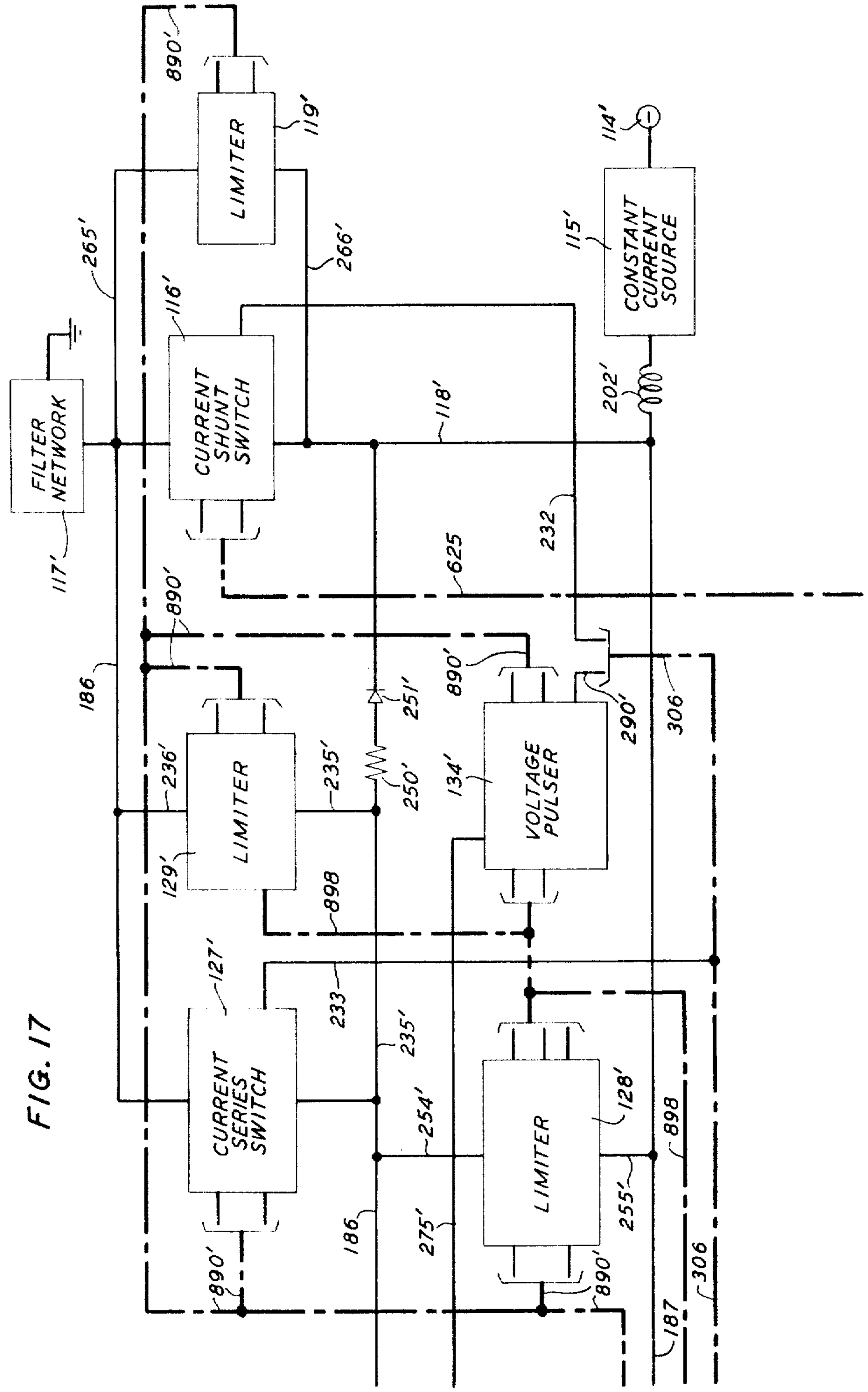

At this point, it is convenient to leave the access core switch array X conductor access circuitry and consider generally the duplicate of this circuitry provided for the Y conductors of the array and the manner in which address signals from the address register 130 are supplied thereto. The Y conductor access circuitry is shown in block symbol form in FIGS. 16 and 17, representative ones of the Y conductors 45 being shown in FIG. 16 each including a single winding representing each of the couplings of a conductor to a core 12 of the access core switch array. At one end, which for convenience may be designated the Y end, the Y conductors 45 are connected in parallel in groups by means of a plurality of paralleling conductors 181–0 through 181–15. The grouping of the Y conductors 45, just as the grouping of the X conductors 44 previously described, at the Y end is such that each of the paralleling conductors 181 connects sixteen of the Y conductors in parallel. More specifically, the two hundred fifty-six Y conductors 45 are grouped at the Y end by connecting the Y conductors 0, 16, . . . 240 to the conductor 181–0, connecting the Y conductors 1, 17, . . . 241 to the conductor 181–1, and continuing this process by connecting the last group of Y conductors 15, 31, . . . 255 to the last paralleling conductor 181–15. The Y conductors 45 are additionally labelled for this purpose in FIG. 16 in accordance with the positions in the sequence of two hundred fifty-six conductors.

At the other end, which for convenience may be designated the Y' end, the Y conductors 45 are also connected in parallel but in different groups by means of a plurality of conductors 182–0 through 182–15. More specifically, the two hundred fifty-six Y conductors are grouped at the Y' end by connecting the Y conductors 0, 1, . . . 15 to the conductor 182–0, the Y conductors 16, 17, . . . 31 to the paralleling conductor 182–1, and by continuing this process to the last group by connecting the Y conductors 240, 241, . . . 255 to the paralleling conductor 182–15. Each of the Y conductors 45 also includes therein at the Y' end a diode 183.

Returning to the Y end of the Y conductors 45, each of the groupings is connected by means of its paralleling conductor 181 to an address selection switch Y111 individual to the group via a cable 184. The cable 184 connects the groupings of Y conductors 45 to respective input terminals of the address selection switches Y111 such that the paralleling conductors 181–0 through 181–15 are directly connected to the input terminals of the address selection switches Y111–0 through Y111–15, respectively. At the Y' end of the Y conductors 45, each of the groupings is connected by means of its paralleling conductor 182 to an address selection switch Y112 individual to the group via a cable 185. The cable 185 connects the groupings of Y conductors 45 to respective output terminals of the address selection switches Y112 such that the conductors 182–0 through 182–15 are connected directly to the output terminals of the address selection switches Y112–0 through Y112–15, respectively.

Each of the address selection switches Y111, the detailed organization of which has already been seen from the description of the identical switch X111, is also connected by means of an output terminal to pulsing conductor 186, which latter conductor comprises one side of the energization circuit for supplying a coincident current to the access core switch array. An address selection switch Y111 thus also acts as a switch for completing a circuit path between the input and output terminals referred to above. Similarly, each of the address selection switches Y112, the details of which are identical to those of the switches X112, is also connected by means of an input terminal to a pulsing conductor 187 via a cable 188 which latter conductor comprises the other side of the aforementioned energization circuit. The latter connections are made through diodes 189, the purpose of which will become apparent hereinafter. An address selection switch Y112 thus similarly acts as a switch for completing a circuit path between its input and output terminals.

The address selection switches Y111 and Y112 are also selectively enabled by means of address signals from the address register 130 applied to their input logic gates as was the case for the address selection switches X111 and X112. It will be recalled that the address bits 0 through 3 control the selection of the switches Y111–0 through Y111–15 and the address bits 4, 5, 13, and 14 control the selection of the switches Y112–0 through Y112–15. Accordingly, the interconnections between flip-flops F0, F1, F2, and F3 of the register 130 of FIG. 12 are carried via a cable 193 extending from the latter register to the address selection switches Y111–0 through Y111–15 in accordance with the binary translation of the numerical designations of the latter switches. Here also, in order to avoid complexity of detail in the drawings, these interconnections are not specifically shown but will also be understood by one skilled in the art to be represented by the cable 193. Since the binary translation of the 0 numerical designation of the switch Y111–0 are the binary bits 0, 0, 0, 0, the interconnections with the with the flip-flops F0, F1, F2, and F3 include connections from the output conductors $\overline{0}$, $\overline{1}$, $\overline{2}$, and $\overline{3}$ of the latter circuits to the input similarly marked at the control side of the switch Y111–0, again with the most significant binary bit appearing on the right hand side of the latter sequence. In the same manner the interconnections with the flip-flops F0, F1, F2, and F3 include connections from the output conductors 0, $\overline{1}$, $\overline{2}$, and $\overline{3}$ of the latter circuits to the inputs similarly marked at the control side of the switch Y111–1 in accordance with the binary translation 0, 0, 0, 1 of that switch. These interconnections are continued through the sequence of sixteen switches, the last switch Y111–15 having its control inputs 0, 1, 2, and 3 connected via the cable 193 to the similarly marked output conductors of the flip-flops F0, F1, F2, and F3 in accordance with its binary code translation 1, 1, 1, 1 of its numerical designation.

In an identical manner to that described for the address selection switches Y111, the control inputs of the switches Y112 are interconnected with the output conductors of the flip-flops F4, F5, F13, and F14 in accordance with the binary code translations of their numerical designations. The latter interconnections are represented, and the address signals are carried, by a cable 194 extending to the control inputs of the address switches Y112 of FIG. 16. Thus, to cite one example of the Y112 sequence of switches, the switch Y112–1 has the control inputs thereof marked 4, $\overline{5}$, $\overline{13}$, and $\overline{14}$ connected to similarly marked output conductors of the flip-flops F4, F5, F13, and F14 of the register 130. The remaining interconnections of the switches Y112–0 and Y112–1 through Y112–15 may be determined from an inspection of FIG. 16.

Each of the timing inputs of the switches Y111 is connected to a common timing conductor 195 which is extended to the timing cable 306 and a corresponding common timing conductor 197 connected to the timing inputs of the logic gates of the switches Y112 in parallel is also extended to the timing cable 306. The latter cable is in turn connected to timing circuitry as previously mentioned and which will be considered in proper sequence hereinafter. This concludes a detailed consideration of the circuitry for selecting and providing an energization current path through one conductor in each coordinate of the access core switch array depicted in FIGS. 5 and 7. In recapitulation, a partial energization circuit may be traced for a selected X conductor from the pulsing conductor 147 of FIG. 15 to the return pulsing conductor 146 of FIG. 11 as follows: a diode 149, cable 148, the emitter of a transistor 164' of a selected address selection switch X112 of FIG. 19, the collector of the same transistor, primary winding 166', cable 145 extending to FIG. 15, a paralleling conductor 142, a diode 143, the selected X conductor threading two hundred fifty-six cores 12 of the core access switch, a paralleling conductor 141, cable 144 extending to FIG. 11, the emitter of a transistor 164 of a selected address selection switch X111, the collector of the same transistor, a primary winding 166, and the conductor 146. A similar current path may be traced which includes a selected Y conductor between the pulsing conductors 187 and 186 in FIG. 16. The pulsing conductors 146 and 147 and similar conductors 186 and 187 connect the X and Y conductor energization circuits just described with current sources and pulsing circuitry shown generally in the block diagram of FIG. 8 and which may now be considered in detail.

Referring to FIG. 8, the current source and other control components are shown as connected in circuit paths extending from corresponding terminals of the X and X' address selection switches via conductor 126 and 121, respectively. The conductor 121 terminates at a source of potential 114 through a constant current source 115 and tthe conductor 126 terminates at ground through a current switch 127 and a filter network 117. Bridging the extensions of the pulsing circuit thus generally described is a current shunt switch 116 by means of a conductor 118. In the present detailed description, the conductors 121 and 126 are identified as the pulsing conductors 147 and 146, respectively, and will be referred to by the latter character references. The inputs of the address selection switches X112 are connected via cable 148 and the diodes 149 to the pulsing conductor 147 of FIG. 15, which is extended through FIGS. 14 and 10, and ultimately via conductor 201 of FIG. 13 to the constant current source 115 of FIG. 9. The current source 115 may comprise any suitable circuit devisable by one skilled in the art capable of providing a direct current of the character to be described in greater detail hereinafter. The source 115 is powered from a source of negative potential 114. Immediately before its connection with the current source 115 and following its connection with the bridging conductor 118, the pulsing conductor 147 is diverted to a tracking circuit shown in detail in FIG. 13. The tracking circuit provides for the compensation for any variations in the current source 115 and, as will be seen, in the current source 115' supplying the Y coordinate conductors of the access core switch array, by varying the biasing current of the latter array in accordance with the variations. The desired flux switching action in the selected cores of the access switch array is thus insured notwithstanding variations in either or both of the coincident selection currents.

The connection of the pulsing conductor 147 with the tracking circuit is made via an auxiliary conductor 201 having connected in series therewith a plurality of primary windings 201' of four multiwinding transformers $200_1$ through $200_4$ each of which has a saturable core having a substantially square hysteresis curve. The latter transformers are paired together to generate, for the first pair, $200_1$ and $200_2$, a control signal for the bias current generator 47 of FIG. 7, and for the second pair, $200_3$ and $200_4$, a checking signal for diagnostic purposes which will be described generally hereinafter. Within each transformer pair the primary windings 201' are oppositely poled. Each of the transformers 200 also includes a second primary winding 202, which latter windings are also oppositely poled within each transformer pair and are serially connected together and to a constant current generator 203. Third primary windings 203' of each of the transformers 200, also oppositely poled in each transformer pair and in a sense opposite to that of the windings 202, are serially connected between the bias current generator 47 of FIG. 7 and the bias winding 46 of the access core switch array depicted in FIGS. 7, 15, and 16. Each of the transformers 200 has included therein a secondary winding 204 which windings are all similarly poled and serially connected only to the corresponding winding 204 of the other transformer of each transformer pair and then to respective tracking detector circuits 204' and 204". The output of the former tracking detector circuit, that is, the one associated with the transformers $200_3$ and $200_4$, is a continuous direct current applied to an output conductor 205' which ultimately connects with the maintenance circuits 160 of the store control circuits 140 for purposes which will be described.

The output of the tracking detector circuit 204' is transmitted via a control conductor to control the output of the bias current generator 47. In order to control the latter output in conjunction with the current pulses supplied by the constant current source 115 of FIG. 9 and the constant current source 115' of FIG. 17, another primary winding 202' is coupled in each of the transformers 200, again, oppositely poled in each transformer pair. The latter windings 202', which each in the same sense as the corresponding windings 202 of the transformers, are serially connected together and, as will be seen, connected between the pulsing conductor 187 and the constant current source 115' of the Y coordinate conductor access circuitry. The transformers of the transformer pair $200_1$ and $200_2$ each also have oppositely poled and serially connected windings 207' included therein. The latter windings are connected between a source of negative potential 206' and ground through a resistor 208'. The latter potential, applied through the oppositely poled windings 207', serves to off-set the hysteresis curves of the saturable cores of the transformers $200_1$ and $200_2$ in opposite directions to make possible the detection of positive and negative current variations. As mentioned previously, the corresponding windings 202 and 202' are coupled in the same sense which is opposite to the sense of the coupling of the corresponding primary windings 203'. Although the number of turns of each of the latter windings is the same, the amplitude of the current applied to the bias current winding 203' is twice that of each of the normally equal amplitudes of the currents applied to the windings 202 and 202' from the sources 115 and 115', respectively. As a result, ideally the algebraic sum of either the X or Y access drives applied to the access core switch array and the bias drive applied to the same switch is zero. Any sum greater or less than zero is detected by the detector circuit 204' which in turn provides a control signal to restore the bias current from the source 47 to a value which will give the zero sum. The tracking circuit has little effect on other circuits because dual transformers $200_1$ and $200_2$ as well as transformers $200_3$ and $200_4$ cancel alternating current signals induced from the constant current generator 203.

Figure 9:
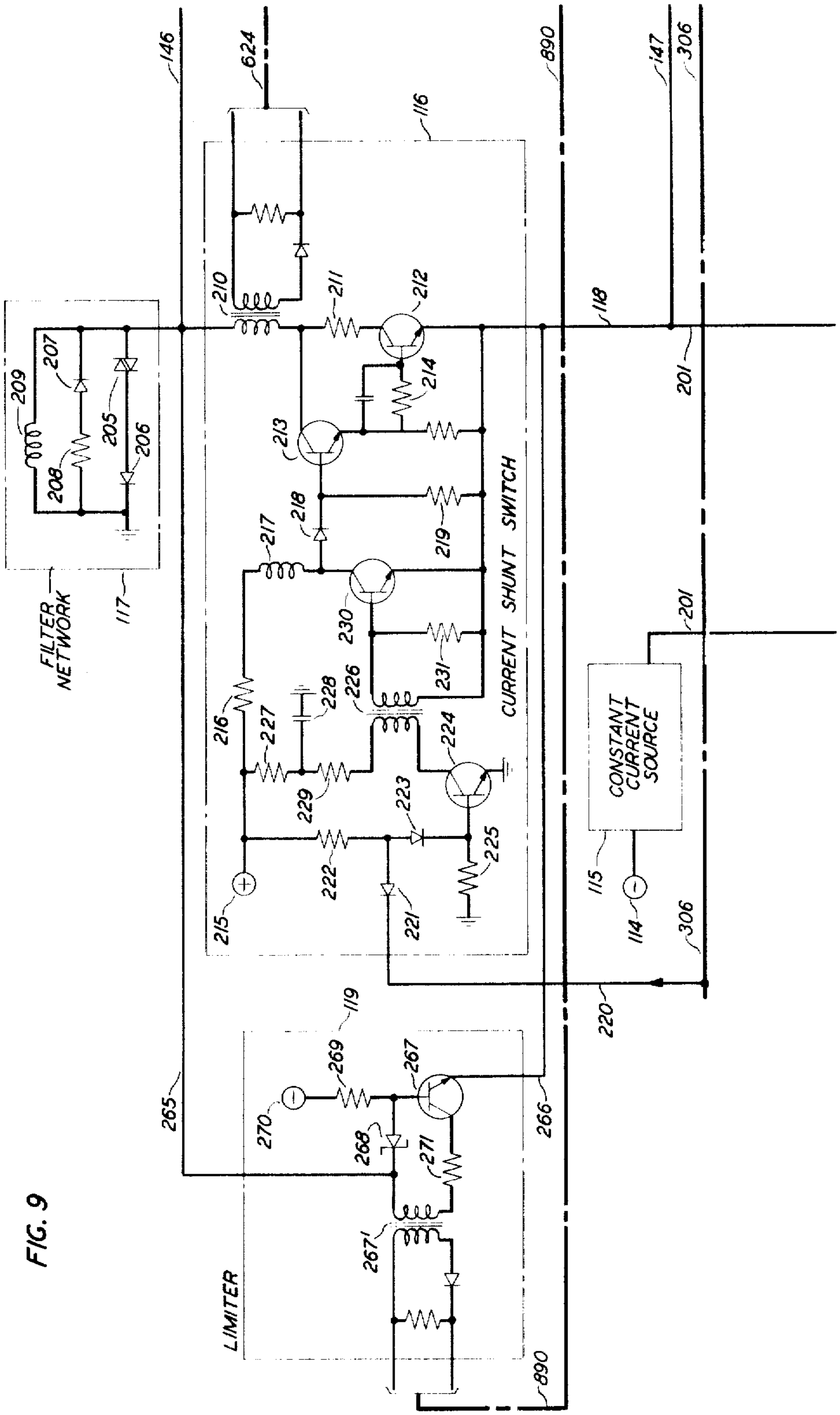
FIGS. 9 through 30 are a schematic diagram showing the circuit details of an illustrative information store according to the principles of this invention when organized in accordance with the diagram of FIG. 36.
Figure 10:
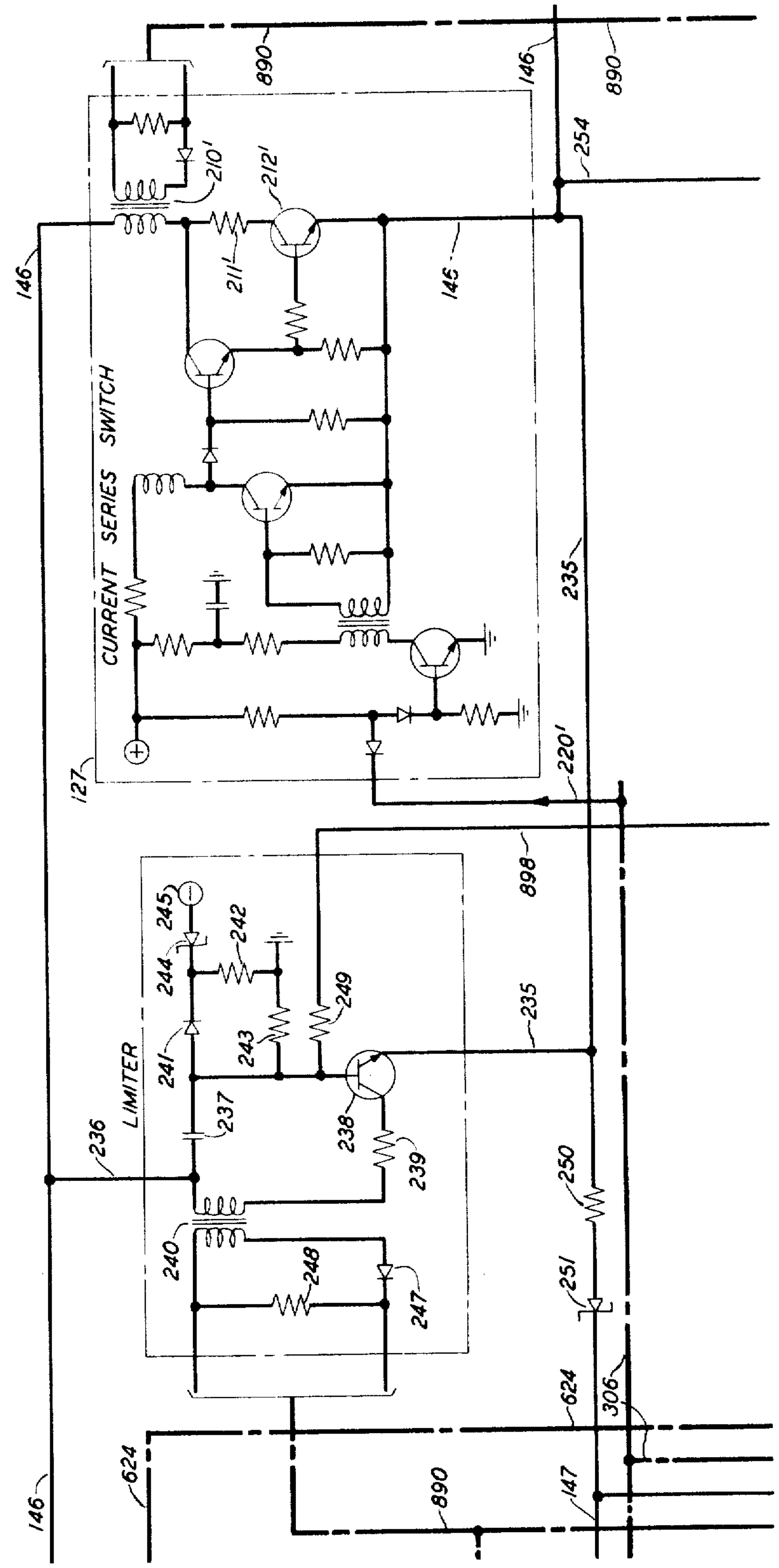

At the other side of the energization circuit, the pulsing conductor 146 is extended from the output terminals of the address selection switches X111 in FIG. 11, through FIG. 10, to ground through a current series switch 127 and a filter network 117 in FIG. 9. The switch 127 will be considered hereinafter. The filter network 117 is provided to minmize the existence of large transient currents both to protect the access circuitry and to reduce noise in the readout circuits. The filter network 117 is connected at one end to the conductor 146 and comprises a plurality of branch paths connected at the other end to ground. A first of the parallel paths includes a varistor 205 and a diode 206, another of the paths includes a diode 207 and a resistor 208, and the last of the paths includes only an inductor 209. The inductor 209 is selected to present a high impedance to rapid current changes but presents a low resistance direct current path to ground for the energization current of the access core switch array. In accomplishing its noise reduction function, the network 117 provides a precharging of its associated X conductors of the access core switch array and this charging current value is determined by a suitable selection of the values of the resistor 208 and diode 207, the latter diode being poled in the direction of current flow for the charging operation. The varistor 205 and diode 206 set the voltage at which the inductor 209 recovers.

In order to apply an energizing current pulse to a selected X conductor 44 during an interrogation of the memory 100, a circuit is completed between the current source 115 and ground at the filter network 117. This circuit is controlled at two points: by a current shunt switch 116 connected in parallel with the X conductors 44 directly between the current source 115 and filter network 117 and by a current series switch 127 serially connected in the pulsing conductor 146. The switches 116 and 127 are substantially identical in organization and only the current shunt switch 116 will be described in detail in terms of its operation. The current shunt switch 116 shown in FIG. 9 is normally on to provide a current path between the source 115 and ground via the filter network 117 thereby shorting out a parallel current path between the source 115 and ground through the X conductors 44 of the access core switch array. Specifically, in the switch 116 this shunt path is provided through the primary winding of a transformer 210, a resistor 211, and the collector and emitter of a transistor 212. The transistor 212 is connected in a conventional circuit arrangement with a second transistor 213 such that the latter holds the former transistor saturated. The collector of the transistor 213 is connected through the resistor 211 to the collector of the transistor 212. The emitter of the transistor 213 drives the base of transistor 212 through a resistor 214 with the result that the emitter of the latter transistor is the output point of a current amplifier comprising the two transisors. Transistor 213, in turn, is maintained in a saturated state by a current flowing from a source of positive potential 215 through a resistor 216, an inductor 217, and a diode 218. An alternative path for this current is presented through a resistor 219 connected to the base of the transistor 213; however, the latter base presents a low impedance as compared to that of the resistor 219. The current thus flowing from the source 215, which is a relatively small current, thus maintains the transistor 213 saturated which in turn holds the transistor 212 on. This current leaves the circuit 116 at the emitter of the transistor 212.

Turning to the input control side of the current shunt switch 116, the circuitry for changing the operation thereof from the normally obtaining state considered in the foregoing may now be described. Control of the switch 116 is achieved by selectively applying a high or a low potential to an input conductor 220 connected to a diode 221. During the foregoing normal condition of the switch 116, in which a low impedance current path is maintained therethrough, a relatively low potential is applied to the conductor 220. Accordingly, a current will flow also from the positive potential source 215, through a resistor 222, through the diode 221, and out through the low potential conductor 220. This follows since the output of the diode 221 is also low at its point of connection with the resistor 222. During a cut-off control of the switch 116, a relatively high potential is applied through the conductor 220, with the result that the diode 221 is nonconducting, and the current normally flowing from the source 215 will be diverted through a diode 223 and thereby to the base of a transistor 224 which presents a low impedance path as compared with the path also presented by a leakage resistor 225. The transistor 224 is thus turned on, with the result that a current again originating in the source 215 is drawn through the primary winding of a transformer 226, the collector and emitter of the transistor 224 to ground at the latter element. A filter comprising a resistor 227 and a capacitor 228 is provided to protect the source 215 from instantaneous current peaks and a second resistor 229 connected in series with the current path limits the current drawn through the transformer primary winding. The transformer 226 applies a current pulse via its secondary winding to the base of a second transistor 230. The resistor 229 comprises a high impedance in series with a relatively high voltage presented by the source 215 in comparison with the driven transistor 230, with the result that a current, rather than a voltage pulse, is applied to the base of the latter transistor. A resistor 231 connected across the secondary winding of the transformer 226 limits the negative-going pulse generated at the recovery of the transformer 226, when the switch 116 is restored to normal, to a value less than the breakdown potential of transistor 230. The saturation of the transistor 230 provides a bypass path for the current flowing from the source 215 through the diode 218 which current maintains both of the transistors 213 and 212 on. The latter current is thus diverted through the transistor 230 with the result that the latter transistor shorts out the input to the transistor 213 turning both the latter transistor and the transistor 212 off. The intended result of the foregoing control of the current shunt switch 116 is thus achieved; that is, the low impedance path between the current source 115 and ground at the filter network 117 is opened. The secondary winding of the transformer 210, the primary winding of which is connected in series with the aforementioned low impedance path, is connected to readout control circuitry which will be considered in detail hereinafter. The input conductor 220 of the switch 116 is connected to the timing cable 306 and timing control circuitry which will also be described in more appropriate sequence.

The pulsing circuit completed via the pulsing conductors 146 and 147 contains one other switch for controlling its continuity. Connected in series with the pulsing conductor 146 between the address selection switches 111 of FIG. 11 and the filter network 117 is a current series switch 127. The switch 127, shown in FIG. 10, is identical in organization and operation to that of the current shunt switch 116, the details of which have just been described. Thus, the switch 127 completes, in the conductor 146, a current path via a primary winding of a transformer 210′, a resistor 211′, and the collector and emitter of a transistor 212′, each of which latter elements are the counterparts of identical elements in the switch 116. The secondary winding of the transformer 210′ comprises a part of the All Seems Well checking circuitry to which this description will return. Operation of the switch 127 is controlled via an input conductor 220′ to which conductor a relatively high potential is applied also from timing circuits via the timing cable 306 to be described in proper sequence hereinafter. The switch 127 is normally closed as is the switch 116 and the continuity of the pulsing conductor 146 is broken by the operation of the switch 127 at the completion of an interrogation operation.

When the switch 127 is operated to open the pulsing circuit in the conductor 146 and thereby terminate the pulse applied to a selected X conductor coincidentally with the pulse applied to a selected Y conductor of the access core switch array, a voltage drop is developed across the switch 127 which is limited by means of a voltage limiter 129. This voltage drop when added to the drop across the selected X conductor of the access core switch array, insures that the core selection X conductor pulse is terminated with the same voltage as that which caused its initiation. The voltage limiter 129 is connected in parallel with the switch 127 in the conductor 146 at one side by means of a bridging conductor 235 and at the other side by means of a conductor 236. The conductor 236 is connected through a capacitor 237 to the base of a transistor 238, the collector of which is also connected to the conductor 236 through a resistor 239 and the primary winding of a transformer 240. The base of the transistor 238 as well as the connected side of the capacitor 237 is connected to a voltage regulator circuit comprising a diode 241 which is connected to ground through a resistor 242. A second resistor 243 is also connected between the base of the transistor 238 and ground. The voltage regulator circuit is completed by the connection of the diode 241 through a Zener diode 244 to a source of negative potential 245. The emitter of the transistor 238 is connected via the conductor 235 to a common connection of the input of the switch 127 with the pulsing conductor 145. The secondary winding of the transformer 240 provides an output through a diode 247 across a resistor 248 to the All Seems Well circuitry previously mentioned. An output of the voltage limiter 129 is also provided at the base of the transistor 238 across a resistor 249 to provide signals for diagnostic circuitry the purpose of which will be described hereinafter.

Normally transistor 238 of the voltage limiter 129 is in a nonconducting state. In this condition capacitor 237 will be charged to a potential determined primarily by the negative potential source 245 and the Zener diode 244. Also in this condition, the conductors 235 will both be at near ground potentials since conductor 236 is connected to ground by conductor 146 and filter network 117, and conductor 235 is connected to conductor 236 by cable 145 through the normally closed series switch 127. The base of transistor 238 will thus be rendered negative relative to its emitter by the potential stored on capacitor 237. Thus the transistor 238 is in a nonconducting state as previously mentioned. When the normally closed series switch 127 is opened, the potential on conductor 235 will rapidly go increasingly negative. When the potential difference between conductor 235 and conductor 236 exceeds the potential on capacitor 237, transistor 238 will be forward-biased and will conduct sufficient current to prevent any further increases in the potential difference between conductors 235 and 236. Resistor 239 aids in dissipating some of the power which would otherwise be dissipated by the transistor 238 when this transistor is in a conducting state. Diode 241 provides the necessary isolation to allow the voltage limiter to limit the potential difference existing between conductors 235 and 236 even though both conductors may be negative relative to ground at the time the potential difference exists.

One further control circuit may conveniently be described at this point. As shown in FIG. 10, connected between the conductors 235 and 147, that is, across the load represented by the X conductors of the access core switch array, is a damper circuit comprising a resistor 250 and a Zener diode 251. The resistor 250 is connected at one side to the conductor 146 via the bridging conductor 235. The damping circuit is provided across the inductive load presented by the X conductors to prevent ringing which otherwise might occur. Accordingly, the resistor 250 represents the critical damping resistance.

The Zener diode 251 limits the damping effect of the circuit to the rise time of the energization pulse.

Figure 14:
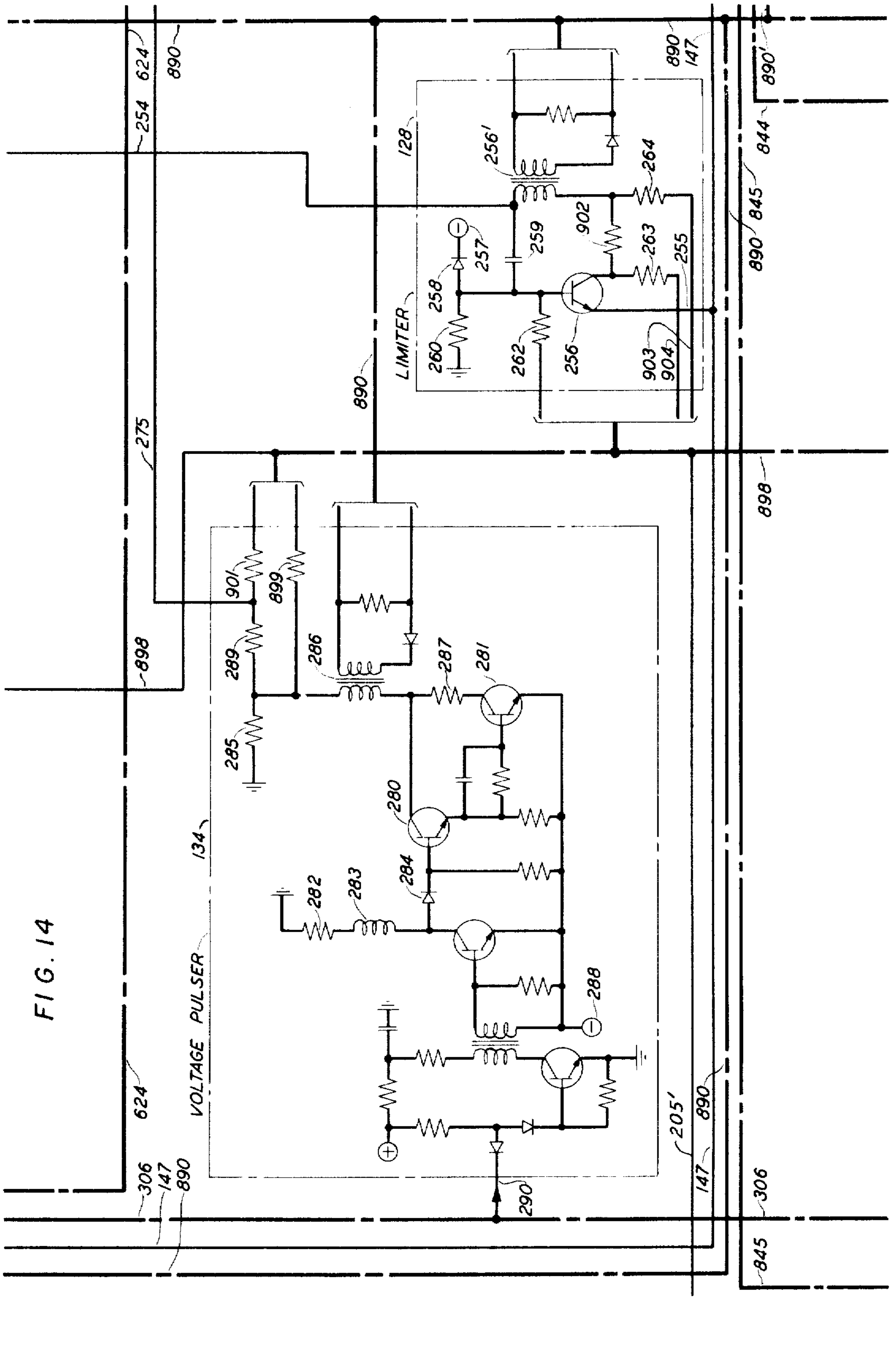

A second limiter circuit, a load limiter 128, is also connected across the load presented by the X conductors of the access core switch array. This limiter circuit 128, shown in FIG. 14, is connected between the pulsing conductors 146 and 147 by means of the bridging conductors 254 and 255. The limiter circuit 128 is substantially similar in organization and operation to the limiter circuit 129 of FIG. 10 previously described, with the exception of the voltage regulator section. In the circuit 128 the base of the counterpart transistor 256 is connected to a source of negative potential 257 only through a diode 258 which is the counterpart of the diode 241 of the limiter circuit 129. The conductor 254 connects with the base of the transistor 256 through a capacitor 259 and the emitter of the latter transistor is connected to the conductor 147 via the conductor 255. Between pulses applied to the pulsing circuit from the constant current source 115 of FIG. 9, the base of the transistor 256 is connected to the source 257 through the forward-biased decoupling diode 258. Current through resistor 260 and diode 258 to source 257 maintains the diode 258 in its forward-biased state. During the time that a pulse is applied to the pulsing circuit, if the voltage on conductor 255 is more negative than the voltage on conductor 254 by the amount of voltage on the capacitor 259, transistor 256 is driven into conduction. As a result conductors 254 and 255 are effectively connected together through resistor 902 and transistor 256, limiting further difference in potential between the two conductors. Capacitor 259 is recharged after each pulse in the pulsing circuit. The function of the limiter circuit 128 is thus to limit the voltage across the selected X conductor of the access core switch array. A large voltage would otherwise be generated when the constant current source 115 supplies its X conductor drive current. As mentioned previously herein, the load of the latter array comprises essentially an inductance because of the core windings. The limiter circuit 128 thus limits this undesired voltage buildup. The limiter circuit 128, like the limiter circuit 129, also includes a transformer which is employed to provide an output for the All Seems Well circuitry previously referred to. The limiter circuit 128 also provides three outputs for checking the operation of the pulsing circuit. These outputs are taken at a first point at the base of the transistor 256 across a resistor 262, at a second point at the collector of the same transistor through a resistor 263, and at a third point, at the conductor 254 side of the capacitor 259 through the primary winding of the aforementioned transformer and a resistor 264. Each of these points is connected in this manner to diagnostic circuitry to be discussed.

One final limiter circuit of the X conductor pulsing circuitry remains to be described. This limiter circuit 119, shown in FIG. 9, is connected in parallel with the current shunt switch 116 between the conductors 146 and 147 and is intended to operate only in the event that the previously described limiter circuits 128 and 129 fail to operate. If the latter limiter circuits function properly, the voltage across the limiter circuit 119 normally fails to reach its breakdown voltage and the latter circuit is thus effectively a standby circuit. The limiter circuit 119 is substantially similar to the circuits 128 and 129 and is connected between the pulsing conductors 146 and 147 by conductors 265 and 266, respectively. The conductor 265 is connected to the base of a transistor 267 through a Zener diode 268, which base is also connected through a resistor 269 to a source of negative potential 270. A transformer 267' also provides a means for obtaining an output for the previously mentioned All Seems Well circuitry, the primary winding of which transformer is connected between the conductor 265 and the collector of the transistor 267, the latter connection being through a resistor 271. Finally, the emitter of the transistor 267 is connected to the conductor 266.

The limiter circuit 119 operates in a manner substantially similar to that already briefly considered in connection with the limiters 128 and 129, that is, the circuit 119 is caused to operate when the base-emitter junction of the transistor 267 is forward-biased, causing the latter transistor to conduct current. This current effectively limits the voltage at the conductor 266 side of the switch 116 to the value of the potential drop across Zener diode 268. The resistor 271 is inserted in the circuit to dissipate the power generated in the collector.

The access core switch array of FIG. 7 within which the access circuitry presently being described is adapted to select a particular crosspoint, presents a considerable amount of stray capacitance as previously mentioned. Accordingly, in order to prevent dissipation of the energizing drive pulse provided by the pulsing circuit through unselected paths, this capacitance is precharged in accordance with the principles of this invention by means of a voltage pulser. The voltage pulser 134, shown in detail in FIG. 14, is connected at its output side with each of the X conductors 44 of the access core switch array via a conductor 275. This connection is made through a plurality of diodes 276, as depicted in FIG. 15, and is further made to the X conductors 44 at the access selection switches X111 side. The voltage pulser switch 134 is substantially similar to the current shunt switch 116 and the current series switch 127, the organization and operation of which have already been considered in the foregoing. Accordingly, the voltage pulser switch 134 will be described only briefly in terms of its operation. The switch 134 is also normally on, this state being maintained by a conventional output circuit arrangement comprising a pair of transistors 280 and 281. A normal current flowing from ground, through a resistor 282, an inductor 283, and thence to the base of the transistor 280 via a diode 284 maintains the latter transistor turned on. A normal current path is thus provided from ground through a resistor 285, a primary winding of a transformer 286, a second resistor 287, through the collector-emitter circuit of the transistor 281, to a source of negative potential 288. A current normally flowing in the path thus traced places the conductor 275, which is connected to one side of the primary winding of the transformer 286 through a resistor 289, at substantially the potential of the voltage source 288. This potential is applied via the diodes 276 to the X conductors 44 of the access core switch array as shown generally in FIG. 15.

This precharging of the X conductors 44 is interrupted during an interrogation operation and the voltage pulser 134 is controlled by means of a relatively high potential applied to its low level logic input stage from timing circuitry via conductor 290. This control potential serves to open the conducting path through the transistor 281 in the manner identical to that already described for the switches 116 and 127. A minor difference existing in the pulser 134 is the provision of the voltage source 288 to constitute a power source for the current in the voltage generating output circuit. Since a current path exists in the pulsing circuit as a whole for the switches 116 and 127, the source 288 is unnecessary in the latter circuits.

The foregoing completes a detailed description of the organization of the pulsing circuit for the X conductors 44 of the access core switch array shown in FIGS. 5 and 7. As mentioned previously, an illustrative information store according to this invention also provides identical pulsing circuitry for the Y conductors 45 of the access core switch array. Because these pulsing circuit components are identical to those just described in the foregoing for the X conductors, they will be described here only generally with particular reference to FIG. 17. Wherever it is appropriate, the same reference characters will be primed to indicate circuitry and components which are identical to those already described in detail.

The current source and other control components of the Y conductor 45 pulsing circuitry are connected in circuit paths extending from corresponding terminals of the Y111 and Y112 address selection switches via conductors 186 and 187, respectively. The conductor 187 terminates at a source of potential 114' through a constant current source 115' and the conductor 186 terminates at ground through a current switch 127' and a filter network 117'. Bridging the extensions of the pulsing circuit thus generally traced is a current shunt switch 116' by means of a conductor 118'. The pulsing conductor 187 is extended from the connections with the inputs of the address selection switches Y112 through the diodes 189 of FIG. 16 to the constant current source 115' of FIG. 17. The latter connection is made through a primary winding 202' of the access core switch array bias tracking circuit already described hereinbefore. At the other side of the pulsing circuit, the pulsing conductor 186 is extended from the output terminals of the address selection switches Y111 in FIG. 16 to ground through a current series switch 127' and a filter network 117'.

In order to apply an energizing current pulse to a selected Y conductor 45 during an interrogation of the memory 100, a circuit is completed between the current source 115' and ground at the filter network 117'. This circuit is also controlled at two points: by a normally on current shunt switch 116' connected in parallel with the Y conductors 45 directly between the current source 115' and the filter network 117' and by a normally on current series switch 127' serially connected in the pulsing conductor 186. A voltage limiter circuit 129' is connected in parallel with the switch 127' in the conductor 186 at one side by means of a bridging conductor 235' and at the other side by means of a conductor 236'. At this point also a damper circuit comprising a resistor 250' and a diode 251' is connected between the conductor 235' and the conductor 187 through a connecting conductor 118'. A second limiter circuit 128' is also connected across the load presented by the Y conductors 45 of the access core switch array by means of a pair of conductors 254' and 255'. One further limiter circuit 119' is connected in parallel with the current shunt switch 116' between the conductors 186 and 187 and is also provided as a protection for the circuit in the event that the previously referred to limiter circuits fail to function. The limiter circuit 116' is connected between the pulsing conductors 186 and 187 by means of the conductors 265' and 266', respectively.

In order to precharge the Y conductors 45 of the access core switch array, a voltage pulser circuit 134' is provided, the single output of which is connected to each of the Y conductors 45 of FIG. 16 through individual diodes 276' via a conductor 275'. Each of the circuits generally referred to in the foregoing operates in a manner and for a purpose identical to those already described in connection with the circuits of FIGS. 9, 10, 13, and 14. Each of these circuits also includes provisions for obtaining an output for the All Seems Well circuitry which will be considered in more detail hereinafter. In addition, the voltage pulser 134' and the limiter circuits 128' and 129' have provision for generating output signals employed for diagnostic purposes also to be later considered. The foregoing circuits of the Y conductor pulsing circuit are also controlled by signals provided by the timing circuits 132 mentioned previously which comprises part of the store control circuits 140 shown generally in FIG. 1. Thus, the current switches 116' and 127' and the voltage pulser 134' are controlled by signals applied via the conductors 323, 233, and 290', respectively. The latter conductors are extended to the aforementioned timing circuits 132 which may now be generally considered.

In order to supply proper timing for the various components of the access circuitry so far described and for the readout circuits of the store to follow, timing circuits 132 are provided, which circuits generate a number of suitably timed control signals as determined by operative needs of the system. The timing circuits 132, which is shown in block symbol form in FIG. 8 and in more detail in FIG. 18, comprises part of a group of store control circuits 140 and may comprise any multisignal generator devisable by one skilled in the art capable of providing the control signals of the character and at the times to be described. The timing circuits 132 contemplated for use in the present information store includes a section for generating the timing signals for the access circuitry and a separate section for generating initial timing signals for the readout circuitry. Although within the timing circuits 132 the individual circuits are shown generally only in block symbol form, they may be understood to comprise conveniently two chains of serially connected pulse generators between which individual flip-flops are controlled to provide the voltage timing signals. Thus, the access chain 301 of the timing circuits 132 comprises a plurality of pulse generators which may advantageously comprise circuits of the character which will be described in detail in connection with the readout circuitry of the store to follow. A plurality of flip-flop circuits, represented by the single block 302, are suitably connected between the pulse generators at points as determined in accordance with the timing of the voltage output signals required for the operation of the present store. The readout chain 303 of the timing circuits 132 similarly comprises a sequence of pulse generators with an attendant plurality of flip-flop circuits represented in FIG. 18 by the single block symbol 304. In the latter section a number of signal outputs are thus made available, only particular ones of which are employed for the readout operation as will appear hereinafter.

Figure 18:
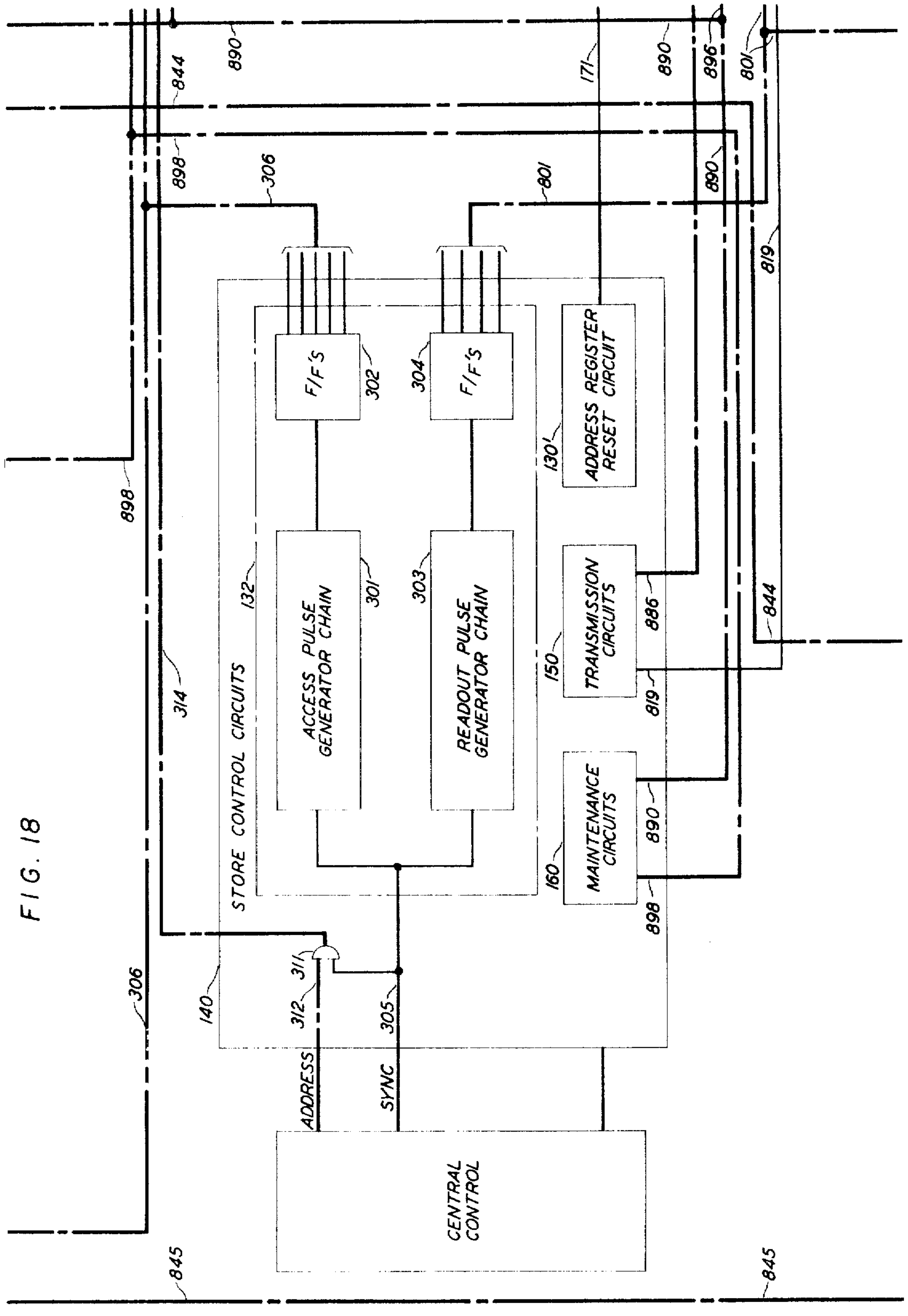

Both the access chain and the readout chain of the timing circuits 132 are controlled by a sync pulse supplied via a conductor 305 from the central control of the system with which the present information store may be employed. The output circuits of the timing circuits 132 are carried by cables to the various components of the store system, the individual conductors of the cable being omitted from the drawings for the sake of avoiding complexity of detail. A plurality of output circuits are shown in FIG. 18 as originating at the flip-flops 302 and each of these provides a control signal which is carried to its controlled component of the access circuitry by a conductor understood to be included in a cable 306. Thus, specifically, a control signal is supplied to the address selection switches X111 via the cable 306 extended to FIG. 19 and thence through FIG. 15 by means of the conductor 175 supplying each of the selection switches X111 of FIG. 12. The cable 306 also connects in FIG. 19 with the conductor 177 which, in that figure, carries the control signal to the address selection switches X112. The cable 306 is also extended through FIGS. 19 and 20 to supply similar control signals via the common conductors 195 and 197 to the address selection switches Y111 and Y112, respectively, of FIG. 16.

The cable 306 is further extended to the X conductor pulsing circuitry to supply a control signal for the voltage pulser 134 via its input conductor 290 of FIG. 14 and is then continued to FIGS. 9 and 10 where control signals are applied to the input conductors 220 and 220' of the current shunt switch 116 and the current series switch 127, respectively. In a similar manner the cable 306 is extended to the Y conductor pulsing circuitry of FIG. 17 to supply a control signal for the voltage pulser 134' via its input conductor 290'. Control signals are further supplied by the cable 306 to the input conductors 232 and 233 of the current series switch 116' and the current shunt switch 127', respectively, of FIG. 17. The specific control signals employed initially to control the timing of the readout circuitry and their transmission thereto will be considered in connection with the description of the latter circuits hereinafter. These signals originate at the flip-flop circuits 304 of the timing circuits 132 and are also carried to the controlled components by means of a cable to be identified in a more appropriate sequence. With the foregoing description of the manner in which the various timing control signals of the information store of this invention are achieved and conducted to the controlled components, an illustrative interrogation operation of the memory 100 by the access circuitry 110 so far described may now be considered.

*Illustrative operation of access circuits 100 and interrogation of memory 100*

As has been previously pointed out, a cycle of operation of the information store of this invention advantageously does not necessitate a write or a rewrite phase. The introduction of the information to be stored into the memory is accomplished by the mechanical insertion of information cards 15 each having affixed thereon at coordinate locations, patterns of effective permanent magnets, which patterns represent the information to be stored. The manner of the insertion of the information cards 15 and their relationship to the interrogation circuitry have already been considered in connection with FIG. 2 et seq., and it will be assumed for purposes of description that the word row defined by the solenoid $\mathbf{11_2}$ containing the binary bits 1, 0, 1, . . . 0 in the B section of the memory plane shown in FIG. 2 is to be interrogated. It will also be assumed for purposes of description that the illustrative word row is found in memory module $\mathbf{43_1}$, the position of which, relative to the other modules of the memory 100 is shown in FIG. 5, and further that this illustrative word row is defined in the access core switch array of that figure by the X coordinate conductor 44*s* and the Y coordinate conductor 45*s*. The latter conductors, because of their coordinate positions in the access core switch array, may also be identified among the representative conductors shown in FIGS. 15 and 16 as the conductors 44*s* and 45*s* respectively, each designated 1 in its sequence of conductors 0–255.

A readout cycle of operation of the information store of this invention may be initiated at any time that no other readout cycle is in progress in response to an order from the central control of the system with which this invention is adapted for use. Thus, although a periodic readout may be instructed, the information store as here contemplated provides information output signals in response to the application of a sync pulse from the common control to the store control circuits 140 and thereby to the timing circuits 132 of FIG. 18. This sync pulse then initiates the interrogation cycle and sets the times and intervals of the various timing control signals provided by the timing circuits 132. Although the energization of a word row solenoid 11 for ultimate interrogation of a row of permanent magnets is accomplished by overlapping or simultaneous operations of the access circuitry components, an interrogation cycle may conveniently be divided into two distinct operations. In the first, an X and Y coordinate conductor of the access core switch array defining the solenoid to be energized, is selected by the address selection switches X111, X112, Y111 and Y112. In the second operation the pulsing circuits of the latter conductors are energized. The illustrative interrogation operation will accordingly be considered in that sequence.

The operations of the access circuitry of the information store of this invention will best be understood by reference to FIG. 31 which depicts the time relationship between the various operative control signals employed, the waveforms being shown in idealized form. In the illustrative embodiment of the invention being described, the intervals between each of the times $t_0$, $t_1$, $t_2$, etc., indicated in FIG. 31 and elsewhere, may be understood as one microsecond. An interrogation cycle is initiated by the application to the store control circuits 140 of a sync pulse 310 at the time $t_0$. The sync pulse 310 is supplied by the central control of the system with which the present information store may be adapted for use and is transmitted to the store whenever information is to be read therefrom. The sync pulse 310 is applied to an input conductor 305 of the timing circuit 132, and it is also applied to a gating means 311 which represents a number of gates for simultaneously applying address signals to the set inputs of the address register 130 of the store control circuits 140, which address register is shown separately in FIG. 12. Address instructions for the interrogation operation are received also from the central control via an input cable 312 and these instruction signals, represented by the new address signal 313 at time $t_1$ in the chart of FIG. 31, are carried from the gating means 311 by means of a cable 314 extended from FIG. 18, through FIGS. 19, 15, and 11, to the input cable 314 of the address register 130 and thus to the set inputs of its flip-flops of the address register 130 are available some interval, say a quarter microsecond, later. The new information output voltage signal on each of the flip-flops is represented in FIG. 31 by waveform 315 which continues to the reset of the address register 130.

It will be recalled from the previous description of the assignment of flip-flops of the address register 130 to the address selection switches, that the flip-flops F0 through F3 control the selection of the address selection switches Y111 at the Y side of the Y coordinate conductors 45, flip-flops F4, F5, F13, and F14 control the selection of the address selection switches Y112 at the Y′ side of the Y coordinate conductors 45, flip-flops F6 through F9 control the selection of the address selection switches X111 at the X side of the X coordinate conductors 44, and that flip-flops F10, F11, F15, and F16 control the selection of the address selection switches X112 at the X′ side of the X coordinate conductors 44. Accordingly, in view of the particular illustrative operation being described, address instruction signals will set the flip-flops F0 and F6, the remaining flip-flops of those above enumerated being left in their reset states. The binary outputs of the flip-flops, which will be available shortly after the time $t_0$ and which are represented in FIG. 31 by the voltage pulse 315, will appear on the binary designated output circuits of the flip-flops F0 through F11 and F13 through F16 as follows: $\mathbf{0}$, $\overline{\mathbf{1}}$, $\overline{\mathbf{2}}$, $\overline{\mathbf{3}}$, $\overline{\mathbf{4}}$, $\overline{\mathbf{5}}$, $\mathbf{6}$, $\overline{\mathbf{7}}$, $\overline{\mathbf{8}}$, $\overline{\mathbf{9}}$, $\overline{\mathbf{10}}$, $\overline{\mathbf{11}}$, $\overline{\mathbf{13}}$, $\overline{\mathbf{14}}$, $\overline{\mathbf{15}}$, and $\overline{\mathbf{16}}$, respectively. The output voltage of the flip-flop F12 and its binary character will be considered in connection with the description of the operation of the readout circuits subsequently.

In accordance with the foregoing binary outputs of the flip-flops of the address register 130, a voltage signal 315 will be applied from the latter register to each of the correspondingly designated inputs of the address selection switches. However, by inspection of the low level logic inputs of the latter switches in FIGS. 11, 16, and 19, it is evident that only in the address selection switches X111–1, X112–0, Y111–1, and Y112–0 will each of the coded binary inputs of the multiple AND gates be energized. The latter switches will thus control the selection of one of each of the X and Y coordinate conductors of the access core switch array. The voltage signals 315 are continuously applied for substantially the interrogation period from the address register 130 and the operation of the foregoing address selection switches now depends only upon enabling timing control signals to be applied to the remaining inputs of the logic input gates of the latter switches.

Before proceeding to the operation of the enabling timing control signals for the selected address selection switches, one further preparatory operation for the energization of the selected X and Y conductors will be considered. It will be recalled that mention was made of the precharging of the capacitance of the wiring of the access core switch array to prevent dissipation of the interrogation current pulse applied thereto during an interrogation. This precharging operation is accomplished by the voltage pulsers 134 and 134′ of FIGS. 14 and 17, respectively.

As previously stated in connection with the detailed description of the organization of the latter circuit, negative potentials originating at the source 288 and the corresponding source in the pulser 134' are applied to one end of the X and Y conductors, respectively. For the X conductors, this voltage is applied via the conductor 275 and a plurality of diodes 276 and for the Y conductors the voltage is applied via the conductor 275' and a plurality of diodes 276'. Before the X and Y conductors are coincidentally energized during the interrogation operation, the voltage pulsers 134 and 134' are simultaneously opened by timing control signals provided by the timing circuits 132 at the time $t_{1.5}$. These enabling signals, depicted ideally in FIG. 31 as the pulses 316 and 317 are transmitted from the timing circuits 132 via the cable 306 to the input conductors 290 and 290' of the voltage pulsers 134 and 134' of FIGS. 14 and 17, respectively. Accordingly, at the time $t_{1.5}$ the voltage pulsers 134 and 134' are controlled to disconnect the voltage sources comprising part of their circuitry from the ends of the X and Y conductors 44 and 45 in order to permit their selective energization.

At the same time signals are applied from the timing circuits 132 and accomplish the preliminary activation of the address selecction switches X111–1 and Y111–1 previously selected by the binary coded address signals 315 received from the address register 130. A timing control signal depicted as the pulse 318 in FIG. 31, is provided by an output flip-flop 302 of the timing circuits 132 to each of the input gates of the address selection switches X111 via the cable 306, the conductor 176, and the common conductor 175. At the same time a timing control signal 319 is also provided from an output flip-flop 302 to the input gates of the address selection switches Y111 via the cable 306, the conductor 196, and the common conductor 195. As a result, the selected switches X111–1 and Y111–1 are energized to complete current paths therethrough in a manner already previously considered.

At this time one end of the groups of X and Y coordinate conductors in which the selected X and Y conductors appear which are to energize the selected word row solenoid, are connected to the pulsing conductors 146 and 186, respectively. Thus, specifically, of the X conductors, the conductors designated by their numerical sequence 1, 17, . . . 241 and connected together by the common conductor 141–1 in FIG. 15 are connected in a current path which may be traced as follows: common conductor 141–1, cable 144 extended to FIG. 11 and then to the address selection switch X111–1, the controlled current path of the latter switch including, as may be seen from the switch X111, the collector-emitter circuit of a transistor 164 and a primary winding 166, to the pulsing conductor 146. By means of the latter conductor, the foregoing current path may be continued through the controlled current path of the current series switch 127 of FIG. 10, the pulsing conductor 146 extended to FIG. 9, and thereby to ground through the filter network 117. Since the voltage pulser 134 was previously opened at the time $t_{1.5}$, each of the X conductors connected to the common conductor 141–1 is connected to ground via the path above traced, and the latter conductors are quickly brought to ground potential before the energization circuit therethrough is completed by the energization of an address selection switch X112 which, as will be seen, occurs sometime later.

In a similar manner, of the Y conductors, the conductors designated by their numerical sequence 1, 17, . . . 241 and connected together by the common conductor 181–1 of FIG. 16, are connected together in a current path which may be traced as follows: common coinductor 181–1, cable 184, extended to the address selection switch Y111–1, the controlled current path of the latter switch identical to that of the switch X111–1 previously considered, to the pulsing conductor 186. By means of the latter conductor the current path is extended via the current series switch 127' to ground through the filter network 117'. The voltage pulser 134' was also opened at the time $t_{1.5}$ and each of the Y conductors connected to common conductor 181–1 is connected to ground via the path above traced to bring the latter conductors quickly to ground potential before the energization circuit therethrough is completed by the subsequent energization of the address selection switch Y111–0 which may now be considered.

Subsequent to the energization of the address selection switches X111–1 and Y111–1 as above described, the address selection switches X112–0 and Y112–0 are activated by timing control signals 320 and 321 applied from the timing chain 132 at the time $t_2$ as represented in FIG. 31. The timing signal 320 is provided by an output flip-flop 302 to each of the input gates of the address selection switches X112 via the cable 306, conductor 176, and the common conductor 177. The timing signal 321 is applied to the input gates of the address selection switches Y112 via the cable 306, conductor 196, and the common conductor 197. As a result, the address selection switches X112–0 and Y112–0, previously selected by the binary coded address signals 315 received from the address register 130, are activated to complete current paths therethrough as previously considered.

With the energization of the address selection switches X111–1 and X112–0, a current path is established between the pulsing conductors 146 and 147 which path includes only the single X conductor 44s since the latter conductor is the only one common to the two groups of X conductors associated by the common conductors 141–1 and 142–0. Similarly, with the energization of the address selection switches Y111–1 and Y112–0, a currenth path is established between the pulsing conductors 186 and 187 which path includes only the single selected Y conductor 45s. This also follows since the latter conductor is the only one common to the two groups of Y conductors associated by the common conductors 181–1 and 182–0. At this time the selected X conductor 44s and selected Y conductor 45s are in readiness for the application of coincident interrogation drive pulses thereto. During the times $t_{1.5}$ and $t_{1.75}$, the X and Y conductors 44s and 45s were brought to ground potential by their connection to ground at the filter networks 117 and 117'.

Although in the foregoing the selection of an X and a Y coordinate conductor of the access core switch array was described as a preparatory operation, the energization of the latter conductor by coincident selection currents occurs at time $t_2$. At this time timing control signals from the timing circuits 132 serve to open the current shunt switches 116 and 116' of the X and Y pulsing circuitry, respectively. These timing control signals, represented in FIG. 31 by the idealized waveforms 322 and 323, respectively, are provided at a flip-flop 302 output of the timing circuits 132 and are conducted to the respective current shunt switches 116 and 116' by means of the cable 306 extended to FIGS. 9 and 17 to the input conductors 220 and 232 of the latter switches, respectively. As previously described in connection with the consideration of the detailed organization of the latter switches, the control signals 322 and 323, during their application, open the current shunting paths between the pulsing conductors 146 and 147 and the pulsing conductors 186 and 187. As a result, the current from the constant current source 115, for the X conductors, and from the constant current source 115', for the Y conductors, are now conducted at the time $t_2$ to the selected X conductor 44s and the selected Y conductor 45s.

More specifically, at the X conductor access circuitry side, the current from the constant current source 115, is normally conducted to ground via the path which may be traced as follows: conductor 201 and its serially included primary winding 202 of the tracking circuit of FIG. 13, shunting conductor 118 and its connected current shunt switch 116, and the filter network 117. Upon the opening of the current shunt switch 116 at the time $t_2$ this current now follows the pulsing path which may be traced again through the conductor 201 and its serially connected primary winding 202, pulsing conductor 147 extended from FIG. 9 through FIGS. 11 and 14 to FIG. 15, a diode 149, cable 148, an input of the energized address selection switch X112–0, emitter-collector circuit of the transistor 164' and primary winding 166', output of the latter selection switch, cable 145 extended to FIG. 19, common conductor 142–0, diode 143, selected X conductor 44*s*, cable 144 extended to FIG. 11, input of the energized address selection switch X111–0, the emitter-collector circuit of the transistor 164 and primary winding 166 of the latter switch, pulsing conductor 146 extended through the now closed current path of the current series switch 127 of FIG. 10, to ground at the filter network 117 of FIG. 9. The current pulse following the above traced path is represented ideally as the waveform 324 in FIG. 31.

At the Y conductor access circuitry side, the current from the constant current source 115' is normally conducted to ground via the path which may be traced as follows: the primary winding 202' of the tracking circuit 200 shown independently in FIG. 13, shunting conductor 118' and its connected current shunt switch 116', and the filter network 117'. Upon the opening of the current shunt switch 116' at the time $t_2$ this current now follows the pulsing path which may be traced again through the primary winding 202', pulsing conductor 187 extended to FIG. 16, a diode 189, cable 188, the input of the energized address selection switch Y112–0, the controlled current path through the latter switch to its output, cable 185, common conductor 182–0, a diode 183, the selected Y conductor 45*s*, cable 184, input of the energized address selection switch Y111–1, the controlled current path through the latter switch to its output, pulsing conductor 186 extended through the now closed current path of the current series switch 127' of FIG. 17, to ground at the filter network 117'. The current pulse following this traced path is represented ideally in FIG. 31 as the waveform 325. The diodes 149 and 189 decouple the unselected X and Y address selection switches.

As mentioned previously, because the selected X and Y conductors of the access core switch array present inductive loads, the current pulses 324 and 325 cannot rise instantaneously to the constant current value of the sources 115 and 115'. At each side, the pulsing circuits have bridged across the current series switches 116 and 116', the voltage limiter circuits 128 and 128', respectively. Since these limiter circuits are placed in parallel with the inductive loads represented by the selected X and Y conductors, the voltages across the loads are prevented from rising above a predetermined value. Accordingly, initially the currents from the constant current sources 115 and 115' divide between the inductive leads and the latter limiter circuits. A rapid transfer of current from the direct path to ground via the current shunt switches 116 and 116' to the selected X and Y conductors is thus effected without the generation of undesirable oscillations at the plateau of the pulses 324 and 325.

With the generation of the coincident selection pulses 324 and 325 and their transmission to the selected X and Y coordinate conductors 44*s* and 45*s* of the access core switch array as above described, attention may now be directed to the selection of an access core of the latter switch with particular reference to FIGS. 2, 5, and 7. Each of the cores 12 of the access core switch array shown in FIGS. 5 and 7 is biased by a continuously applied current in the same direction of magnetic saturation. This current is provided by a bias current source 47 and is applied to each of the cores 12 of the array by a bias conductor 46 threading each of the cores in the same direction. Although, as will become apparent hereinafter, the cores 12 are employed as transformers, to provide an operating threshold, each of the cores 12 is advantageously fabricated of a magnetic material having substantial rectangular hysteresis characteristics. For convenience each of the cores 12 may be understood as being biased to negative saturation by the biasing current. The sense of the coupling of the X and Y coordinate conductors is then such that the cores 12 are driven by the coincident currents 324 and 325 to the direction of opposite, or positive saturation. The relative amplitudes of the biasing current and the current pulses 324 and 325 are adjusted such that their algebraic sum is sufficient, when coincidentally applied, to drive a core 12 beyond its switching threshold. Accordingly, when the current pulses 324 and 325 are applied to the X and Y conductors 44*s* and 45*s*, the core 12' which the latter conductors define in the access core array, is driven around the knee of its hysteresis loop and into the direction of positive saturation. As a result of this flux excursion in the core 12' a current is generated in its coupled solenoid $\mathbf{11_2}$, which latter element is more clearly shown in FIG. 2. The current pulse so generated is represented in FIG. 31 by the waveform 326 occurring substantially between the times $t_2$ and $t_4$. For reasons which will become apparent hereinafter, the positive-going current pulse 326 in the solenoid $\mathbf{11_2}$ is followed by a negative current 327 beginning sometime after the time $t_4$.

Figure 13:
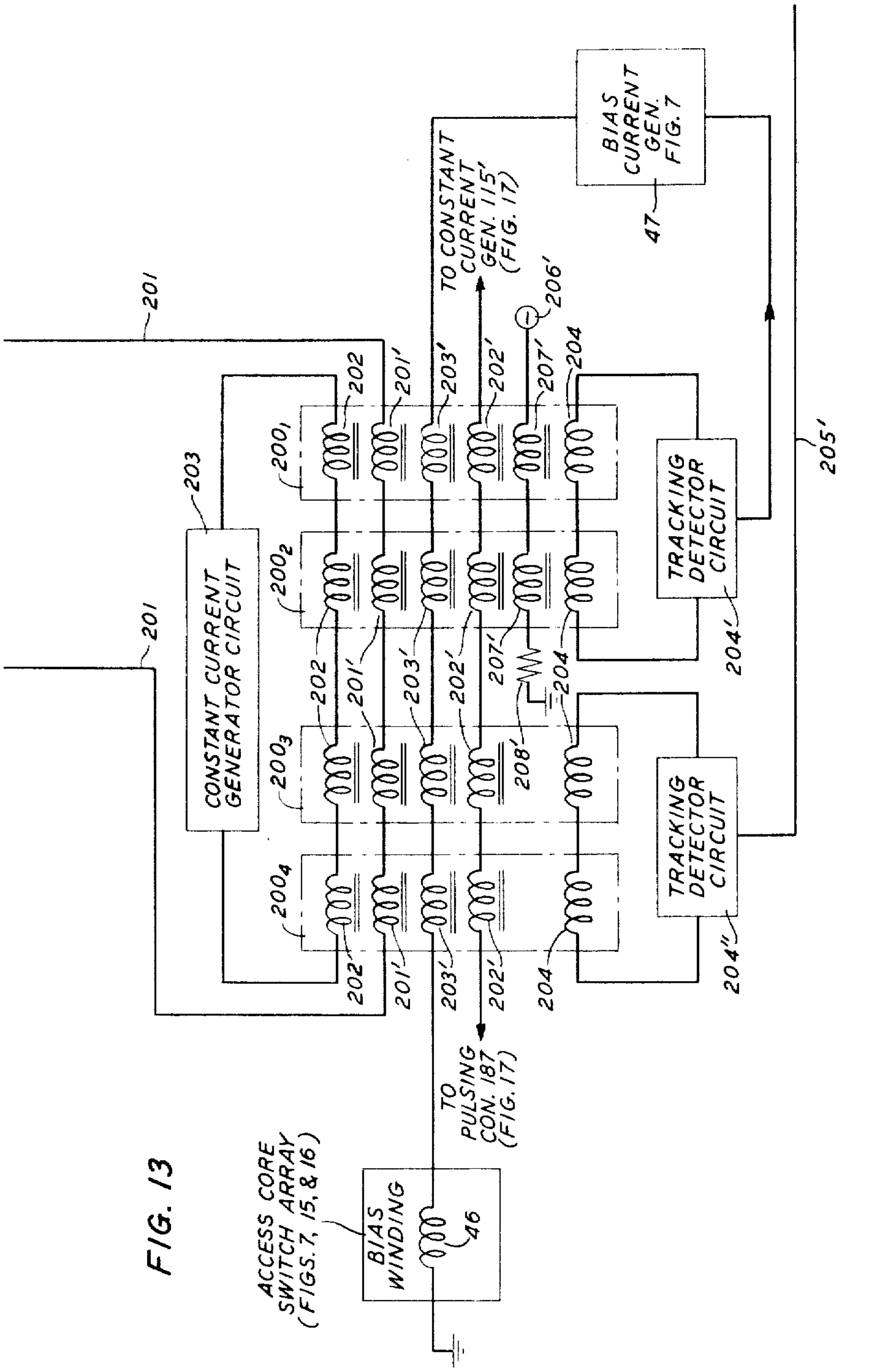

The tracking circuit 200 of FIG. 13 insures, as previously mentioned, that despite variations in either or both of the current pulses 324 and 325, the algebraic sum of the latter currents and the oppositely poled biasing current are sufficient to cause the desired flux excursion in the selected core. The tracking circuit further insures that the algebraic sum of either one or the other of the currents 324 and 325, together with the biasing current is insufficient to cause undesired flux excursions in the remaining unselected cores of the access core switch array.

In FIG. 2 it is apparent that the solenoids 11 are coupled at the outer faces of their loops to individual groups of address segments of two separate groups of memory elements. It will be recalled that in the memory plane of FIG. 2, the near memory elements as viewed in the drawing were designated the B section and the far memory elements similarly viewed were designated the A section. As is obvious from FIG. 4, the directions of the A and B sections are reversed in alternating adjacent planes of the memory modules and this reversal will cause the generation of information representative output signals from the memory 100 of opposite polarities for the adjacent planes as will be subsequently seen. In the illustrative embodiment of the information store, the interrogation operation of which is being described, it will be assumed that the sense of the coupling of each of the solenoids 11 of the memory 100 is such that the interrogation drive pulse 326 generates a current therein which is positive in the A section, that is, in the far face as viewed in FIG. 2, and is negative in the B section, that is, in the near face similarly viewed, considering the source of the current as being a core 12. It will further be assumed that the effective permanent magnets 18 of the information cards 15 maintain the coupled address segments of the wire memory elements 13 in a direction which may be understood as being downward as viewed in the drawing. The drive magnetic fields generated by the current pulse 326 in the solenoid $\mathbf{11_2}$ will also be downward on each face thereof with respect to the coupled address segments of the wire memory elements 13. The magnitude of the solenoid drive pulse 326, and hence that of the drive fields, is such that the fields are sufficient at the crosspoints having no effective permanent magnets 18 thereat to cause a flux switching in the helically wound tape of the coupled wire memory element 13. As will be seen shortly hereinafter, the magnetic conditions of the switched address segments of the wire memory elements 13 are restored to the upward direction as viewed in the drawing during each interrogation with the result that each address segment unattended by an effective permanent magnet will be in a flux condition permitting a response to the interrogation drive fields of the solenoids 11.

Specifically, during the illustrative interrogation operation being described with respect to the exemplary word row defined by the solenoid $\mathbf{11}_2$, a flux switching will occur in the downward direction as viewed in the drawing in the address segments of the wire memory elements $\mathbf{13}b_1$ and $\mathbf{13}b_3$ since, as previously described, at these crosspoints no effective permanent magnets appear. On the other hand, flux switching of the address segments defined by the solenoid $\mathbf{11}_2$ in the memory elements $\mathbf{13}b_2$ and $\mathbf{13}b_n$ will not occur since these address segments are already held in the direction of magnetic saturation to which the drive fields tend to drive them by the coupled permanent magnets 18 at these points. These address segments will merely undergo a minor flux excursion further into saturation. As a result of the flux switchings of the address segments in the wire memory elements $\mathbf{13}b_1$ and $\mathbf{13}b_3$, output voltages will be generated in the electrical conductors of the latter elements on which the magnetic tapes are wound, which voltages generate output currents in the electrical circuits presented by the wire memory element 13, its associated return conductor 14, and a common transformer primary winding 50, which circuits are more clearly depicted in FIG. 6. The output voltages generated are represented in FIG. 31 by the idealized waveform 328 and appear in each of the wire memory elements 13 of the interrogated word row defined by the solenoid $\mathbf{11}_2$ of FIG. 2 not having an effective permanent magnet 18 coupled thereto. In the conventional manner, such an output voltage is indicative of the storage in the word row of a binary 1.

At the address segments of the exemplary word row at which permanent magnets appear, only negligible voltages are generated. However, the shuttling of half-selected access cores on the selected X and Y conductors causes the generation of small voltages at a hundred twenty-six other points on the memory wires. The aggregate voltage produced at these points by waveforms 329 and 329' is depicted in the comparison chart of FIG. 31. The disposition of the information representative output signals so far described will be considered hereinafter following a discussion of the termination of the pulsing of the access core switch array and the effect of this termination on the output signals.

During the interrogation operation so far described, the normally closed current series switches 127 and 127' remained in that condition to permit the completion of the pulsing circuit traced hereinbefore. These switches are opened to initiate the termination of the interrogation operation and function to transfer the pulsing currents 324 and 325 from the selected X and Y conductors back to the direct paths to ground presented through the restored current shunt switches 116 and 116'. The problem of the transfer of the pulsing current mentioned previously also is presented at the termination of the pulses 324 and 325. Thus, it is difficult to transfer instantaneously the current from the constant current sources 115 and 115' back to the current series switches 116 and 116', respectively. The control of the pulsing circuitry of the information store according to this invention is also contemplated to provide for this transfer. The termination of the interrogation cycle is initiated at the time $t_{3.75}$, indicated in FIG. 31, by the application of timing control pulses 330 and 331 from output flip-flops 302 of the timing circuits 132 to the input conductors 220' and 233 of the current series switches 127 and 127', respectively. The timing control pulse 330 is conducted from the timing circuits 132 by means of the cable 306 extended through FIG. 14 to the input conductor 220' of FIG. 10; similarly, the timing control pulse 331 is conducted to the input conductor 233 of FIG. 17 via the cable 306 also extended through FIGS. 19 and 20. The control pulses 330 and 331 control, in a manner previously described, the switches 127 and 127' to open the conducting paths serially connected in the pulsing conductors 146 and 186, respectively. Approximately a quarter microsecond later, at the time $t_4$, the control pulses 322 and 323 are terminated with the result that the direct paths to ground through the current shunt switches 116 and 116' are restored. As a result, the latter switches almost immediately provide a path for the pulsing current from the sources 115 and 115' now interrupted at the open series switches 127 and 127'. However, the energy which is stored in the inductive load presented by the selected X and Y coordinate conductors of the access core switch array must be dissipated. Accordingly, the limiter circuits 129 and 129' connected across the current series switches 127 and 127', respectively, serve to limit the voltages across the latter switches and to provide a path for rapidly reducing the energy of the inductive load.

Upon the opening of the current series switches 127 and 127' and closure of shunt switches 116 and 116', the drive currents 324 and 325 of the X and Y conductors are terminated with the result that the selected core 12' of the access core switch array is returned to the influence of the biasing current from the source 47. The biasing current as a result drives the core 12' back from the point on its hysteresis loop to which it was earlier driven by the coincident current pulses 324 and 325 to its normally biased point in negative saturation. This restoring flux excursion again induces a voltage in the coupled solenoid $\mathbf{11}_2$; this voltage is of opposite polarity to, and follows immediately upon, the voltage pulse 326, being represented in FIG. 31 by the negative-going waveform 327. The resulting current generated in the two faces of the solenoid $\mathbf{11}_2$ will in turn generate magnetic fields in the opposite direction from those which caused the above-described flux excursions in the address segments of the interrogated word row not having permanent magnets 18 associated therewith. The previously switched address segments of the wire memory elements 13 of the interrogated word row will accordingly be restored to their preinterrogated magnetic state and thus be in readiness for a subsequent interrogation cycle. Output signals will, as a result, again be generated in the output circuits presented by the wire memory elements 13, the return conductors 14, and the common primary windings 50, which signals will be of opposite polarity to those generated during the switching of the address segments. These signals are represented in FIG. 31 by the negative-going waveform 332 following immediately upon the positive output signal 328.

During the above-described restoration of the address segments of the wire memory elements 13, the restoration fields of the solenoid $\mathbf{11}_2$ were also applied to the address segments having coupled thereto permanent magnets 18. These segments, it will be recalled, were already maintained in the direction of magnetic saturation in which the initial interrogation drive tended to drive them. Accordingly, during the latter drive only negligible flux excursions were induced in those segments with resulting small output signals such as the signal 329 depicted in FIG. 31 being generated in the respective wire memory elements. In the same manner, during the restoration phase of the interrogation cycle, although the solenoid pulse 327 is of insufficient magnitude to overcome the holding field of the permanent magnets 18, a small flux excursion is again induced in each of the address segments having a permanent magnet coupled thereto. The output currents induced in the wire memory element output circuits will again be small signals of opposite polarity to those earlier generated and are represented in FIG. 31 by the waveform 333. As a result of the interrogation of a bit address in the illustrative word row having stored therein a binary 1, that is, having no permanent magnet 18 associated therewith, a relatively large, positive output signal followed immediately by a similar, negative output signal are generated in the wire memory element output circuits. At a bit address in the illustrative word row having stored therein a binary 0, that is, a bit address having a permanent magnet associated therewith, a relatively small, positive output signal followed immediately by a similar, negative output signal are generated in the wire memory element output circuits.

At this point it should be noted that as previously mentioned, the polarities of the output signals described in the immediately foregoing apply only to the plane of the memory module in which the illustrative interrogated word row is located and to the corresponding alternating planes of the memory module. It will be recalled that, due to the alternating directions of the A and B sections of wire memory elements 13 as they pass the opposite faces of the solenoids 11 of the adjacent memory planes, not only are the positions of the A and B sections reversed in adjacent planes, but the sense of the coupling to the solenoids 11 in adjacent planes of the continuous elements 13 is also reversed. As a result, for the memory planes immediately adjacent the plane shown in FIG. 2 in which the illustrative word row assumed for purposes of description is located, the output signals representative of the storage of a binary 1 and 0 are reversed in polarity. Thus, had the illustrative interrogated word row been located in the planes immediately adjacent to the plane shown in FIG. 2, the output signals representative of the two binary values would be of the polarities indicated for the representative signals 328', 329', 332', and 333' shown by the dashed waveforms in FIG. 31. The manner in which discrimination is accomplished among the foregoing various output signals will be described in connection with the organization and operation of the readout circuitry to follow.

From the foregoing interrogation cycle of operation so far described, it is clear that the binary information is permanently stored. That is, no destructive effect can be had on the effective permanent magnets or the absence of effective permanent magnets at the crosspoints of the coordinate information storage locations on the information cards 15 by the applied fields during an interrogation. The applied solenoid interrogation fields are insufficient to change the magnetization of the permanent magnets and also have no effect on the locations where no magnets, or as the case may be, no effective permanent magnets appear. With respect to the interrogating array of wire memory elements and solenoids, an interrogation cycle of operation is also nondestructive in the sense that the interrogation array is self-resetting during each operative cycle. As was seen in the foregoing, the permanent magnets 18 prevent any permanent magnetic change in the coupled address segments of the interrogation array. For the address segments not so coupled, the biased restoration of the selected core of the access core array also causes the switched address segments to restore to their normal magnetic states.

To restore completely the remaining circuits of the access circuitry to their normal operative states, simultaneously with the restoration of the current shunt switches 116 and 116' at the time $t_4$, the timing control pulses 316 and 317 controlling the operation of the voltage pulsers 134 and 134', respectively, are terminated. As a result, the voltage of the source 288, for the X side of the access circuitry is restored to the X conductors of the access core switch array bringing the latter conductors again to the potential of the source 288. The charging of each of the X conductors is accomplished via the conductor 275 and the diodes 276. Similarly, for the Y side of the access circuitry, the Y conductors of the access core switch array are brought again to the potential of the source of the voltage pulser 134' through the conductor 275' and the diodes 276'.

To insure that each of the foregoing operations is completed, the selected address selection switches X111, X112, Y111, and Y112 are continued in an energized state until the time $t_{4.75}$ at which time the timing control pulses 318 through 321 applied to their input logic circuits are terminated. At the time $t_{4.75}$ also an address register reset pulse 335 is applied under the control of the control circuits 140 to the address register 130 to reset each of the flip-flops F0 through F6. The pulse 335 is applied from the reset circuit 130' of the control circuits 140 via a conductor 171 extended from FIG. 18, through FIGS. 19, 15, and 11 to the reset inputs of the address register 130. As a result, the address register signals 315 are also terminated with respect to their information character at this time. As a result, the controlled current paths through the resistors 164 of the previously selected switches X111–1, X112–0, Y111–1, and Y112–0 are restored to their normally open states. After the address selection switches are restored to their normal states, the current series switches 127 and 127' may also be again closed and this restoration is accomplished by the termination of the timing control pulses 330 and 331 at the time $t_{5.25'}$. Sufficient time is thus allowed for the transfer of the current from the access core switch array load to the direct path to ground through the current shunt switches 116 and 116'. The access circuits 110 are now fully restored and are prepared for a subsequent interrogation operation.

It is convenient at this point to return to the selection of an access core of the access core switch array of FIGS. 5 and 7 in order to consider one advantageous organizational aspect of the information store of this invention. When the coincident selection current pulses 324 and 325 are applied to the selected X conductor **44*s* and selected Y conductor 45*s* to select the core 12', the current pulse 325 alone is also applied to, and magnetically affects, each of the other cores 12 coupled to the selected X conductor 44*s*. Similarly, the current pulse 324 alone is also applied to, and magnetically affects, each of the other cores 12 coupled to the selected Y conductor 45*s*. The small flux excursions caused in these cores 12 by the individual half-select current pulses 324 and 325 induce noise currents in the solenoids 11 coupled to these cores with resulting small drives being applied to the address segments of the wire memory element 13 of the memory in turn coupled to the solenoids. The noise voltages generated in the wire memory element circuits by these minor drives for any single word row would be negligible. However, as is apparent from FIG. 5, for example, two hundred fifty-five solenoids in each X and Y coordinate are subject to the effect of the minor flux excursions in the coupled cores 12 and the cumulative effect of the signals generated in the wire memory elements 13 coupled to the solenoids would tend seriously to interfere with the generation of the desired information output signals as above described. The noise problem thus presented is advantageously reduced in the present information store by the grouping of modules in the memory 100. Thus, it is clear from FIG. 5 that although a selected X conductor controls the flux excursions in each of its coupled cores 12 of each of the modules of a particular column, the cores of only one module of a diagonal grouping of modules are affected. Similarly, although a selected Y conductor controls the flux excursions in each of its coupled cores 12 of each of the modules of a particular row, the cores of only one module of a diagonal grouping of modules is again effected. This may be demonstrated in connection with the illustrative interrogated word row employed for descriptive purposes in the foregoing. The illustrative word row appears in the memory module $43_1$ which is one of the diagonal grouping also including the modules $43_2$ through $43_4$. In the latter grouping of modules the corresponding wire memory elements 13 are connected, together with their return conductors 14, in parallel with a common transformer primary winding 50. Thus, for example, in FIG. 6, assuming the wire memory element $13_1$ to represent the memory element $13b_1$ of FIG. 2 which for purposes of illustration was assumed to be in the module $43_1$, then the elements $13_2$, $13_3$, and $13_4$ would lie in the modules $43_2$, $43_3$, and $40_4$, respectively, each sharing a common primary winding 50. From this organization, it is evident that the only noise which would be generated in the primary transformer 50 would be that created by the cores 12 of the X and Y conductors associated with the module $43_1$ alone. Any noise signals generated in the other modules $42_1$, $41_1$, and $40_1$ or other modules $42_2$, $41_3$, $40_4$ which share the column and row, respectively, of the module $43_1$, will not be generated in the same wire memory elements 13 as those generated in the illustrative elements 13** of the module $43_1$. Although noise signals may be generated in the other modules of the column and row, they will appear in separate and different wire memory element circuits.

In recapitulation, as a result of the aforedescribed illustrative interrogation operation, the currents generated in the word row defined by the exemplary solenoid $11_2$ of FIG. 2 are as follows: a positive current pulse 328 followed by a negative current pulse 332 are generated in the wire memory elements $13b_1$ and $13b_3$ and small positive and negative shuttle current pulses 329 and 333 are generated in wire memory elements $13b_2$ and $13b_n$. The manner in which these information representative output signals are utilized and the circuitry involved in accordance with the principles of this invention may now be considered. The organization of the readout circuits 120 shown in block symbol form in FIG. 1 will first be described followed by a detailed consideration of their operation.

*Detailed description of readout circuits 120*

Figure 23:
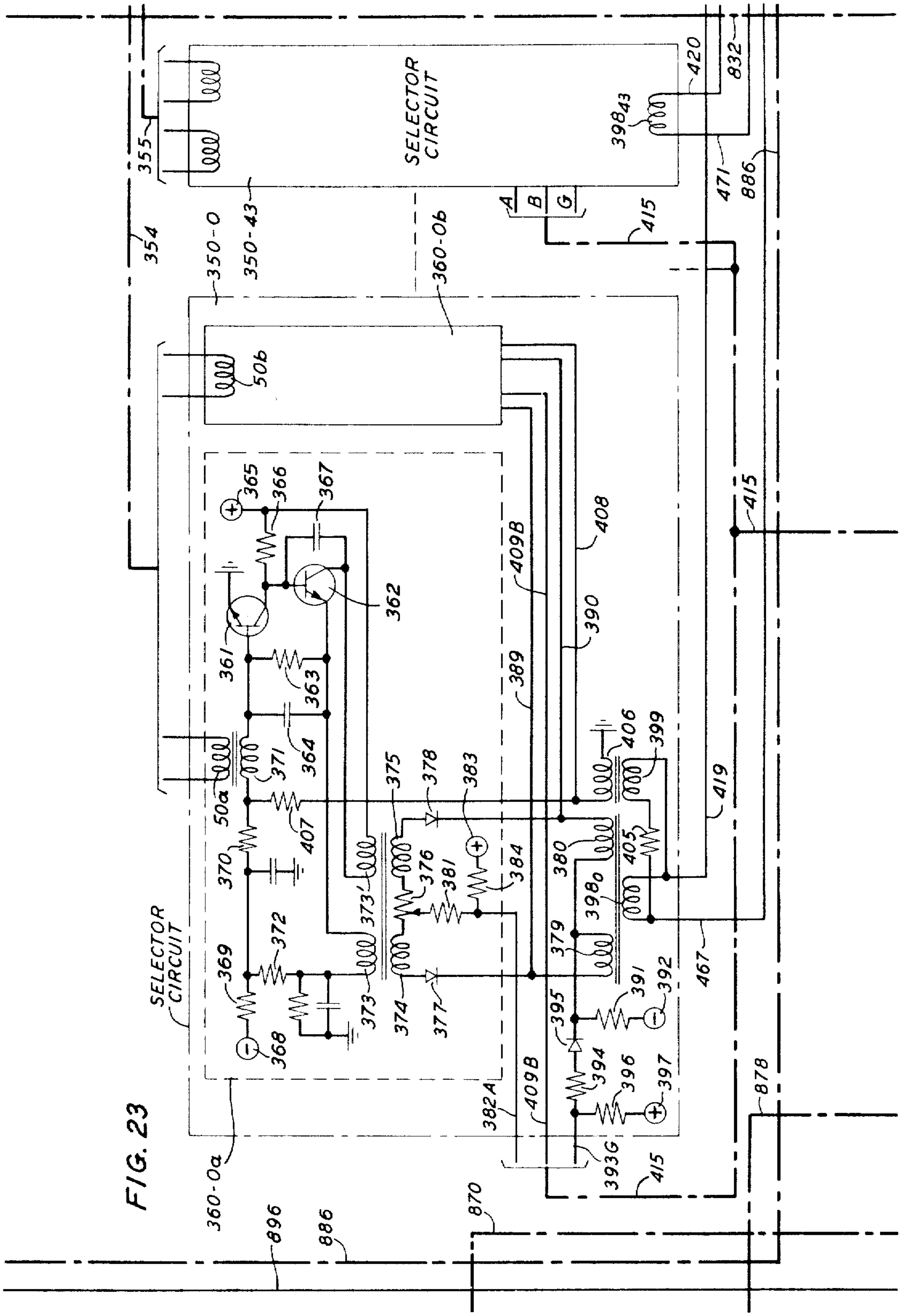
Figure 24:
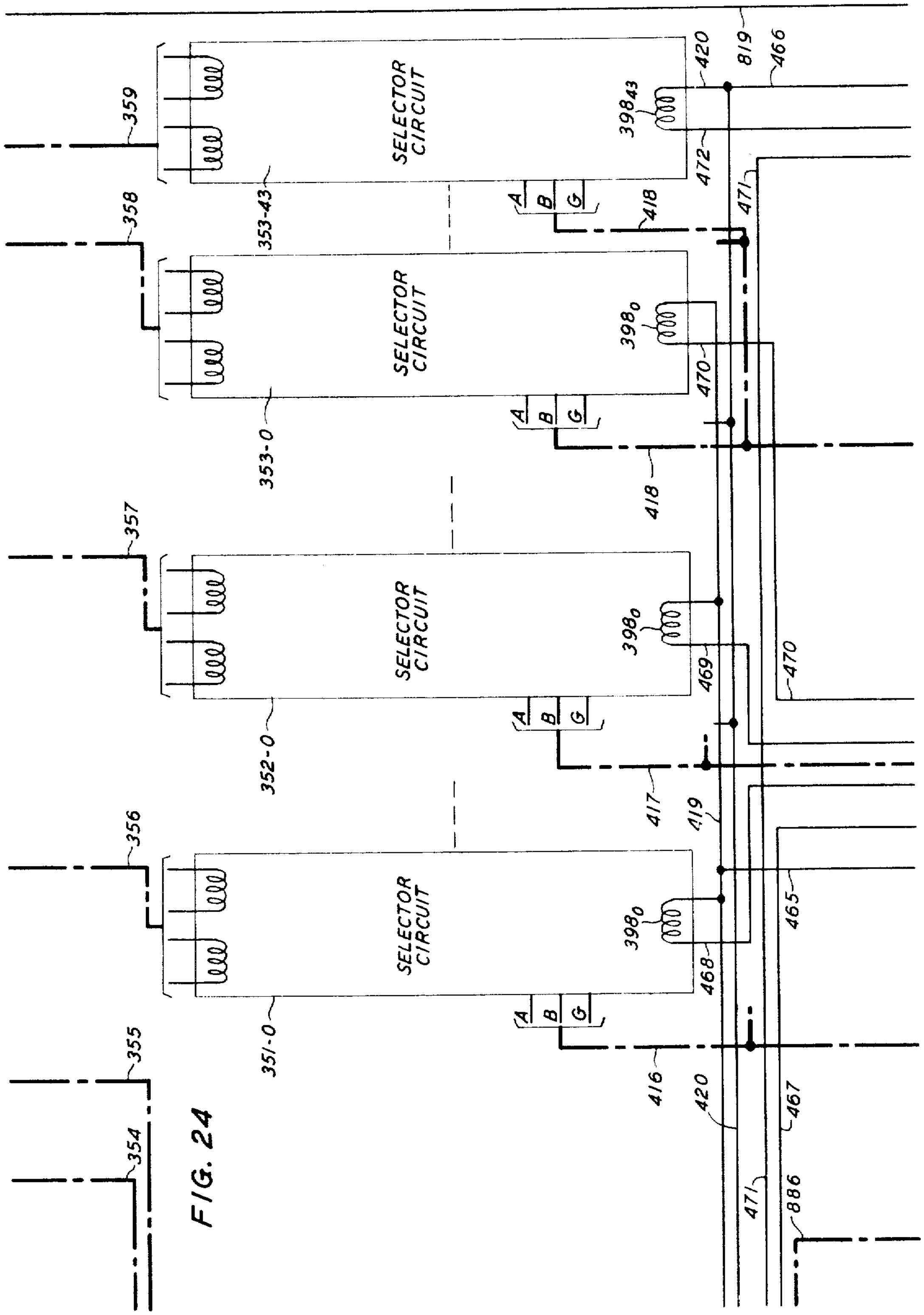

The organization and details of the readout circuits 120 are shown in, and will be described with particular reference to FIGS. 20 through 30. In order to facilitate an understanding of the organization of the readout circuits, portions of the memory 100 are repeated in FIG. 20. In the latter figure each of the module groups 40 through 43 of FIG. 5 is shown as an individual block symbol each having extending therefrom representative first and last ones of the forty-four wire memory element-return conductor terminations of the A and B sections of the four module groups described in the foregoing. Each module group is thus shown as having termination pairs **14*a*–0 and 13*a*–0 through 14*a*–43 and 13*a*–43, and 14*b*–0 and 13*b*–0 through 14*b*–43 and 13*b*–43 extending therefrom, the terminations being so designated only at the module group 40. As previously described, each of these termination pairs is completed at a common transformer primary winding 50 as depicted in FIG. 6, the latter winding serving as a common circuit output for the corresponding wire memory element-return conductor pairs of the memory modules of a module group. The transformer primary windings 50 to which the A and B terminations are connected appear in pairs in selector circuits, which circuits are arranged in groups individual to the module groups 40 through 43. Specifically, the terminations of the module group 40 are connected to transformer windings 50 of a group of selector circuits 350–0 through 350–43, representative first and last ones of which selector circuits are shown in FIGS. 23 and 24, respectively. In like manner, the terminations of the module group 41 are connected to transformer windings 50 of a group of selector circuits 351–0 through 351–43, only the first of which selector circuits is shown in FIG. 24. The terminations of the module group 42 are connected to transformer windings 50 of a group of selector circuits 352–0 through 352–43, only the first of which selector circuits is also shown in FIG. 24. Finally, the terminations of the module group 43 are connected to transformer windings 50 of a group of selector circuits 353–0 through 353–43**, only the first and last of which selector circuits are shown in FIG. 24.

The details of the selector circuits 350 through 353 are specifically shown only with respect to the first selector circuit 350–0; since these details are identical with respect to each of the other selector circuits, the latter circuits are shown in block symbol form only. The specific interconnections of the terminations of the module groups 40 through 43 with their transformer windings 50 of the selector circuits are not shown in detail in the drawings, these interconnections being represented only by single cables. It will be recalled that from each module group there are eighty-eight terminations divided into forty-four terminations for each A and B section of the memory planes. Each of the terminations in turn comprises a wire memory element and its return conductor which are designated in FIG. 20 with respect to the module group 40 consistent with the designation of these elements in FIG. 2. The first of the forty-four A section terminations is a return conductor **14*a*–0 associated with its wire memory element termination 13*a*–0. The first of the forty-four B section terminations is a return conductor 14*b*–0 associated with its wire memory element termination 13*b*–0. These pairs of terminations are carried to the transformer primary windings 50*a* and 50*b*, respectively, of the selector circuit 350–0 by means of a cable 354 extended to FIG. 23. The second through forty-third termination pairs are to be understood as being similarly carried to the respective selector circuits 350–1 through 350–42, not specifically shown in the drawing. Similarly, the last of the forty-four A section terminations is also a return conductor 14*a*–43 associated with its wire memory element termination 13*a*–43. The last of the forty-four B section terminations is a return conductor 14*b*–43 associated with its wire memory element termination 13*b*–43. The latter pairs of terminations are carried to the selector circuit 350–43 and therein to transformer primary windings 50*a* and 50*b* via a cable 355. The terminations of the module group 41 are similarly carried via cables to the selector circuits 351. Thus, a cable 356 carries the first of the forty-four A and B section terminations to the transformer primary windings 50*a* and 50*b*, respectively, of the selector circuit 351–0. Only the latter selector circuit is shown as representative of its group, and it is understood that each of the selector circuits 351–1 through 351–43, not shown in the drawing, is similarly connected to the remaining A and B section terminations of the module group 41**.

The terminations of the module group 42 are connected in a manner identical to that described for the selector circuits and module groups previously considered, the representative connections via the cable 357 being shown only for the first selector circuit 352–0 of the selector circuit group. Finally, with respect to the last module group 43, the representative first and last A and B section terminations are shown in FIG. 24 as being carried by the cables 358 and 359 to the representative selector circuits 353–0 and 353–43, respectively.

A recapitulation at this point of the organization of the binary address output terminations and their association with the groups of selector circuits will serve to provide a clearer background for the further readout circuits to follow. It will be recalled that each of the corresponding binary bit addresses of the A and B sections of the planes of each of the memory modules of a module group is defined by a single wire memory element-return conductor circuit and, further, that the corresponding ones of the latter circuits share a common transformer output winding 50 as depicted in the simplified schematic of FIG. 6. Thus, since each word row of the memory of the information store contains forty-four bit addresses, each of the module groups has an A section of forty-four output windings **50*a* and a B section of forty-four output windings 50*b*. The corresponding output windings 50*a* and 50*b* of each bit address of a module group are paired in each of the individual sector circuits 350 through 353. Each module group thus has forty-four selector circuits associated with it, each selector circuit being connected to both the A and B section bit addresses defined by a set of the corresponding wire memory element-return conductors of a module group. As will appear from the description of the circuit details of the selector circuits hereinafter, a further assignment of individual circuits is made for the individual transformer primary windings 50***a* and 50*b* within each selector circuit.

From the illustrative interrogation operation described hereinbefore, it is apparent that information representative output signals are generated in a particular memory module within a module group as controlled by the address signals received from the address register 130. In accordance with this selective interrogation, the selector circuits 350, etc., serve the function of transmitting from the information store only the output signals desired from the interrogated word row of the store and isolating any spurious signals which may be generated in other memory modules during an interrogation. As will be seen hereinafter, this isolation operation is accomplished by enabling only those selector circuits of the group associated with the module group in which the interrogated word row appears. However, it will further be recalled that, during an interrogation, because an interrogate solenoid 11 is inductively coupled to both an A section and a B section group of wire memory elements 13, both of the forty-four bit binary words stored in the magnet cards of the two sections are simultaneously read out. Thus, since only the information represented by one of these words is desired at any given interrogation, an additional discrimination is made in the selector circuits 350, etc., between the A and B section words simultaneously read out. This is accomplished by choosing between the outputs of two identical amplifier circuits contained in each of the selector circuits 350 through 353. The details of the latter circuits may now be considered with particular reference to FIG. 23 and the single amplifier circuit 360–0*a* there shown in detail as partially comprising the selector circuit 350–0. Since the other amplifier circuit 360–0*b* completing the latter circuit is identical in organization and detail, it is shown in block symbol form only. Similarly, although pairs of amplifier circuits are not specifically shown in the remaining selector circuits 350 through 353, it is to be understood that each of the latter circuits includes a pair of amplifier circuits identical to the single one now to be described in detail.

An individual amplifier circuit 360 of a selector circuit comprises a pair of transistors 361 and 362 connected for Class A amplification. The Class A amplifier output is through the transformer windings 373 and 373′. The input transformer transforms the output impedance of four memory modules to the correct value to work into the base of transistor 361. There are three feedback paths. Resistor 372 and 369 form a direct current feedback which determines the operating point of the amplifier. Resistor 363 and capacitor 364 provide both direct and alternating current feedback of a nature so as to make the input transformer winding 371 see a lower impedance than the base of transistor 361. Resistor 407 presents an alternating current feedback path from the selected output coupled through resistor 405 and windings 399 and 406 and is of a nature so as to raise the impedance seen by winding 371.

The two feedback paths together cause transformer winding 371 to operate into the optimum impedance. Feedback from winding 406 is to both amplifiers 360–0*a* and 360–0*b*, and is effective in reducing the amplitude of switching transients which may occur when changing the selected paths. The internal gain of the amplifier is very large compared to the gain with feedback. The frequency response is controlled by the high frequency rolloff due to capacitor 364. Both amplifiers 360–0*a* and 360–0*b* may simultaneously be amplifying signals. Since only one is to be used at one time, a means is provided for choosing the desired path. If either side is desired, then lead 393G is made near ground and current from source 392 and resistor 391 will cease flowing through diode 395 and start to flow through windings 379 and 380. If side 360–0*a* is selected then lead 382A is made positive and lead 409B is made near ground. The current from windings 379 and 380 therefore flows through diodes 377 and 378, windings 374 and 375, potentiometer 376, and resistor 381 and 384 to source 383. Because of the high voltage difference between sources 383 and 392, the amount of current flowing is constant and independent of the resistance of diodes 377 and 378. The two diodes will generally have different resistances so potentiometer 376 is adjusted to cause the current through windings 374 and 379 to equal the current through windings 375 and 380. Since the currents are equal and in opposite directions in windings 374 and 375 and windings 379 and 380, there is a negligible transient caused by making or removing a selected path.

Since amplifier 360–0*b* is identical to amplifier 360–0*a*, it is selected over amplifier 360–0*a* by making lead 409B positive and 382A near ground. When so selected, the memory signal connected to winding 50*b* is amplified and coupled to windings 379 and 380 through diodes equivalent to diodes 377 and 378. The impedance of diodes 377 and 378 is very low compared to the impedance around the loop of windings 374, 375, 378, 380, 379, 377, and again to 374, therefore very little signal is lost in the diodes and windings 374 and 375 are essentially connected to windings 379 and 380 in the correct polarity so as to couple the signal on windings 373 and 373′ to the winding 398$_0$. If neither side is to be selected then lead 393G is made positive and the current through resistor 391 flows through forward-biased diode 395 and leads 382A and 409B are made near ground to assure that diodes 377 and 378 in both amplifiers 360–0*a* and 360–0*b* are back-biased or open circuited.

To recapitulate, each of the amplifier circuits within each of the selector circuits 350, etc., is provided with a control conductor such as the control conductors 382A and 409B. As will become apparent hereinafter, control signals selectively applied to the latter conductors determine which of the A and B section word row signals are to be transmitted from the selector circuit stage to subsequent stages of the readout circuits. Each of the selector circuits is further provided with a control conductor such as the control conductor 393G and, as will be seen, a control signal applied on a selected one of the latter conductors determines which group of selector circuits is to be collectively enabled. Each selector circuit has a single output taken from a secondary winding such as the secondary winding 398$_0$ and the binary coded signals generated in the memory of the information store are transmitted via these windings of an enabled group of selector circuits to the subsequent stages of the readout circuits. The manner in which the control conductors, such as the conductors 382A, 409B, and 393G, are multiplied to each of the other selector circuits 350–0, etc., to form new groupings of the latter circuits, may now be considered in detail.

Figure 20:
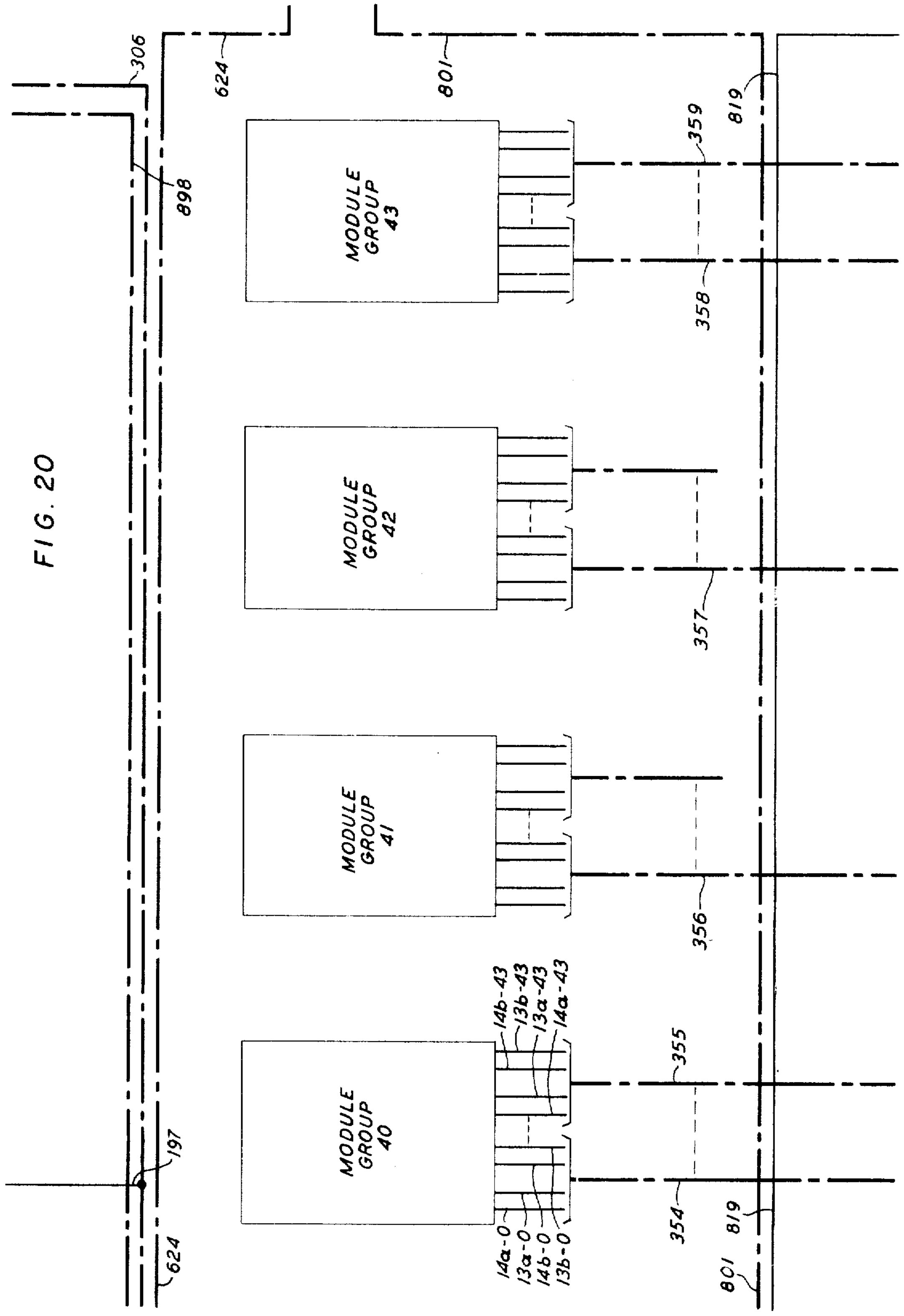

As previously mentioned, the selector circuits are enabled collectively in particular groups associated respectively with the module groups 40 through 43 as arranged in FIG. 20. Thus, during an interrogation only one of the groups of selector circuits 350 through 353 is collectively enabled. To accomplish this enabling operation control signals are simultaneously applied to the corresponding control conductors of the selector circuits of a group such as the control conductor 393G of the selector circuit 350–0. Accordingly, each of these control conductors is connected to a common conductor. Similarly, selection between the A and B section output signals is simultaneously made in each of the selector circuits of the enabled group. Each of the control conductors of the selector circuits such as the control conductors 382A and 409B of the selector circuit 350–0 is thus connected to a common conductor. More specifically, each of the corresponding conductors 382A, 409B, and 393G of the selector circuit group 350 serving the module group 40 is connected to respective common conductors represented in FIG. 23 by the cable 415 extended to FIG. 24. The corresponding control conductors, designated merely as A, B, and G, of the selector circuit group 351 serving module group 41, are connected to respective common conductors represented in FIG. 24 by the cable 416. In a similar manner the corresponding control conductors A, B, and G of the selector circuit groups 352 and 353 serving respectively the module groups 42 and 43, are connected to respective common conductors represented by the cables 417 and 418, respectively. The input terminations of the cables thus designated will be considered hereinafter in connection with an illustrative operation of the readout circuits. It is clear from the foregoing organization of the control input conductors of the selector circuits 350, etc., that one group of forty-four selector circuits may be enabled at one time and that simultaneously within each of the selector circuits within the enabled group, the same A or B section amplifier circuit output is prepared.

Turning now to the output ends of the selector circuits 350, etc., the output organization of the latter circuits will be considered. From the assignment of forty-four selector circuits to each of the module groups 40 through 43, it is apparent that one selector circuit is assigned for each of the forty-four double bit addresses of the two word rows simultaneously read out during an interrogation of the memory. Since during any interrogation only one module group is involved, corresponding ones of the four selector circuit groups 350, 351, 352, and 353 share a single output circuit. Accordingly, the output circuits of the latter selector circuits are also connected to common output conductors corresponding to the foregoing bit address grouping. Thus, one end of the output winding $\mathbf{398_0}$ of the first bit address selector 350–0 of the first selector circuit group associated with the module group 40 is connected by means of a common conductor 419 to the corresponding windings $\mathbf{398_0}$ of each of the first bit address selector circuits 351–0, 352–0, and 353–0. These winding connections are shown explicitly in FIG. 24. The other ends of each of these four windings are carried to subsequent circuitry in the manner to be described. Similar connections are made for each of the remaining forty-three bit address selector circuits of each selector circuit group. The last such bit address connections are shown in FIG. 24 for the selector circuit groups 350 and 353 which comprise connections of the corresponding ends of the output windings $\mathbf{398_{43}}$ of the selector circuits 350–43, . . . $\mathbf{353_{43}}$ by means of the common conductor. The other ends of each of these windings will also be considered shortly in connection with a subsequent stage of the readout circuits which may now be described.

As is apparent from the foregoing organization of the selector circuits 350, etc., for output purposes, the grouping of these circuits is by bit address. Thus, for example, the selector circuits 350–0, 351–0, 352–0, and 353–0 constitute the first bit address group, the selector circuits 350–1, 351–1, 352–1, and 353–1 constitute the second bit address group, etc. Forty-four such selector circuit groups are thus formed, each comprising four selector circuits. Each of the bit address selector circuit groups thus formed has associated herewith a single readout amplifier 450. Specifically, the selector circuit group 350–0 through 353–0 has associated therewith the readout amplifier 450–0 depicted in detail in FIG. 27. Although not specifically depicted in the drawing, the selector circuit groups 350–1 . . . 353–1 through 350–42 . . . 353–42 are understood as similarly having readout amplifiers 450–1 through 450–42, respectively, associated therewith. The last selector circuit group 350–43 through 353–43 has associated therewith the readout amplifier 450–43. Since the readout amplifiers are identical in organization and operation, only representative ones are shown in the drawing, the amplifier 450–43 being shown only in block symbol form.

Each of the readout amplifiers 450 is connected to its four selector circuits by means of an input circuit comprising a parallel connection of four resistors 460 through 463. The capacitor 493 of each of the amplifiers 450 is connected to the common conductor connecting one end of the output windings 398 of its associated group of four selector circuits. Thus, for example, the capacitor 493 of the amplifier 450–0 is connected via a conductor 465 to the common conductor 419 connected to one end of each of the windings $\mathbf{398_0}$ of the first bit address group of selector circuits 350–0 through 353–0. Although not explicitly shown in the drawing, the second group of output windings $\mathbf{398_1}$ are connected via a similar conductor to the capacitor 493 of the amplifier 450–1 comprising the second amplifier of the forty-four amplifiers 450. These connections are continued through the last of the readout amplifiers 450–43 in which the capacitor 493 is connected to the common conductor 420 via a conductor 466. The other ends of each of the output windings 398 of the selector circuits are connected to the other resistors 460 through 463 of the amplifiers 450 according to the particular module group 40 through 43 with which the output windings 398 are associated. Thus, specifically, the other end of the output winding $\mathbf{398_0}$ of the selector circuit 350–0 is connected via a conductor 467 to the resistor 460 of the readout amplifier 450–0, the output winding $\mathbf{398_0}$ of the selector circuit 351–0 is connected via a conductor 468 to the resistor 461 of the same readout amplifier, the output winding $\mathbf{398_0}$ of the selector circuit 352–0 is connected via a conductor 469 to the resistor 462 of the same readout amplifier, and the output winding $\mathbf{398_0}$ of the selector circuit 353–0 is connected via a conductor 470 to the resistor 463 also of the same readout amplifier. In a similar manner the other ends of the output windings $\mathbf{398_1}$, $\mathbf{398_2}$, $\mathbf{398_3}$, are connected to the corresponding resistors of the readout amplifiers 450–1 through 450–43. To cite one last example, the other ends of the output windings $\mathbf{398_{43}}$ of the selector circuits 350–43, 351–43, 352–43, and 353–43 are connected to the resistors 460 through 463 of the readout amplifier 450–43 via conductors, the representative first and last of which are shown in the drawing as the conductors 471 and 472. Each readout amplifier 450 thus serves a corresponding bit address selector circuit of each of the four selector circuit groups.

Each readout amplifier is organized for Class A amplification and comprises, as may be seen with reference to the respresentative amplifier 450–0, in addition to the resistor input circuit described in the foregoing, a first and a second transistor 480 and 481, the former having its emitter connected to the paralleled resistors 460 through 463 and its base connected to ground and also to the emitter of transistor 481. The collector of transistor 480 is connected to the base of transistor 481 and to a source of positive potential 482 through two resistors 483 and 484. A third transistor 485, connected as an emitter-follower, has its base connected to the collector of transistor 481 and also to the potential source 482 through a resistor 486. The collector of the transistor 485 is also connected to the latter potential source through a resistor 487. The potential source 482 provides a power source for the three transistors and a capacitor 488 connected to the common power connections provides an alternating current path to ground. The output of the amplifier 450–0 is taken at the emitter of the emitter-follower transistor 485 and a feedback circuit is provided from the latter output point through a resistor 489, a variable resistor 490 for controlling the gain of the circuit, a resistor 491 having a capacitor 492 connected thereacross and also through resistor 496' and windings 398, to the emitter of transistor 480. An alternating current path to ground connected to one end of the output windings 398 of the selector circuits, via the conductor 465 for the amplifier 450–0, is provided through a capacitor 493. Reference potential levels are established for the inputs and output ends of the circuit by a source of negative potential 494 through resistors 495 and 496, respectively.

Figure 29:
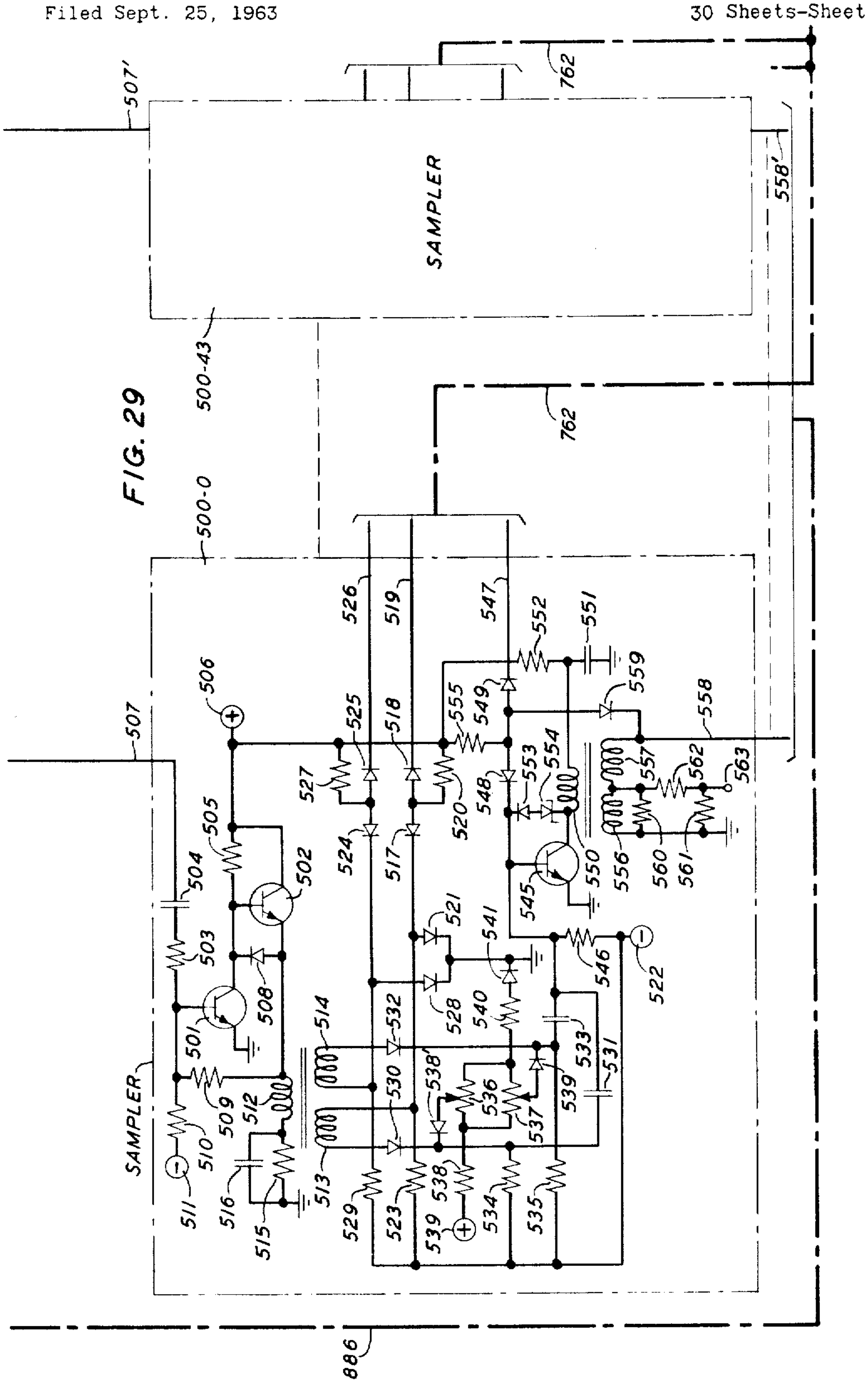

Continuing with the organization of the readout circuits of the information store of this invention, one final output stage is considered. As depicted in FIG. 29, associated with the readout amplifiers 450 is a plurality of sampler circuits 500. Thus, sampler circuits 500–0 through 500–43 are associated respectively with the readout amplifiers 450–0 through 450–43. Before proceeding to a detailed consideration of a sampler circuit, it will be helpful to an understanding of its organization to describe briefly the function it is intended to perform. It will be recalled that, as depicted in FIG. 31, the initial polarity of a readout signal indicative of a binary 1 may be either positive or negative, depending upon the particular plane of a module in which an interrogation takes place. As a result, these signals, applied via the output windings 50*a* and 50*b* to the selector circuits 350 through 353 and amplified in the readout amplifiers 450, will also be bipolar when applied to the sampler circuits 500. Accordingly, a sampler circuit 500 again amplifies either its positive or negative input and provides, in either case, at its output, a positive signal indicative of the readout of a binary 1. It also serves as a means for providing a threshold for noise and bipolar shuttle signals generated at the bit addresses of the memory containing binary 0's.

The first of the forty-four sampler circuits, the sampler circuit 500–0, is shown in detail in FIG. 29, and may be divided into three sections: a first amplifier section, a rectifier section, and a detector, second amplifier section. The first amplifier section comprises a pair of transistors 501 and 502, the latter transistor being connected as an emitter follower. The input signal is coupled by a capacitor 504 and appears across feedback resistor 503. The input voltage appearing across resistor 503 develops an input current. This input current is almost exactly balanced by the current from feedback resistor 509. The difference between these two currents is the input to transistor 501 which obtains its direct current bias from resistor 510 and the source 511. Transistor 501 amplifies this current which flows through resistor 505. The voltage across resistor 505 is coupled to the output of the amplifier winding 512 by emitter-follower transistor 502. Connected at one end between the collector of the transistor 501 and the base of the transistor 502 is a diode 508 connected at its other end to the emitter of the transistor 502. This diode, as will be seen hereinafter, permits the emitter of transistor 502 to follow transistor 501 even though its current capabilities have been exhausted. The output of the emitter-follower transistor 502 is applied to a transformer primary winding 512 which is coupled to two secondary windings 513 and 514 which latter windings comprise the input to the rectifier section of the sampler circuit 500–0. A resistor 515 having a capacitor 516 connected thereacross and connected between one end of the primary winding 512 and ground determines the biasing for transistor 502. The secondary windings 513 and 514 as shown in FIG. 29 are coupled in the same sense to the primary winding 512 in order to achieve the discrimination between the bipolar input signals which the rectifier section of the sampler now to be described accomplishes.

Each of the secondary windings 513 and 514 has connected thereto identical control circuits to which strobe control signals are selectively applied in the manner to be described. These control circuits are connected to opposite ends of the secondary windings 513 and 514 in a manner such that the control signals applied thereto operate on signals of opposite polarity transferred from the primary winding 512. The first of the two control circuits is connected to one end of the secondary winding 513 and includes a pair of diodes 517 and 518 connected back-to-back in an input conductor 519. The latter diodes at their junction point are also connected through a resistor 520 to a source of positive potential, which in this case conveniently comprises the source 506. The above-mentioned end of the secondary winding 513 is also connected through a third diode 521 to ground and to a source of negative potential 522 through a resistor 523. The second control circuit is connected to the end of the secondary winding 514 opposite to that corresponding to the end of the secondary winding 513 to which the first control circuit is connected. The latter circuit comprises a pair of diodes 524 and 525 connected back-to-back in an input conductor 526. The latter diodes at their junction point are also connected through a resistor 527 to the source of positive potential 506. The above-mentioned end of the secondary winding 514 is also connected through a third diode 528 to ground and to the source of negative potential 522 through a resistor 529. The other ends of the secondary windings 513 and 514, from which the output signals are taken in the detection section of the sampler are connected respectively to circuits connected together at a common point at a transistor of the output amplifier section. The circuit connected to the above-mentioned end of the secondary winding 513 includes a diode 530 and a capacitor 531 and the circuit connected to the end of the secondary winding 514 includes a diode 532 and a capacitor 533. The latter circuits are also connected between the diode and capacitor through resistors 534 and 535, respectively, to the source of negative potential 522. A potential control is provided for the thresholds of the diodes 530 and 532 by a pair of potentiometers comprising, respectively, a resistor 536 and a resistor 537 connected together at one end through a resistor 538 to a source of positive potential 539 and also connected together at the other end to ground through a resistor 540 and a diode 541. The potentiometer resistors 536 and 537 each have a variable contact associated therewith, the contact of the resistor 536 being connected through a diode 538' to the negative side of the diode 530 and the contact of the resistor 537 being connected through a diode 539' to the negative side of the diode 532.

As previously mentioned, the outputs of the detection section of the sampler circuit 500–0 are taken from the transformer secondary windings 513 and 514 and specifically at the capacitors 531 and 533 which have a common connection with the base of an output amplifier transistor 545. The latter base is also connected to the source of potential 522 through a resistor 546 and has connected to it a third control input circuit comprising a conductor 547 having a pair of back-to-back diodes 548 and 549 serially connected therein. The transistor 545 is connected as an amplifier and has its output taken from its collector across a primary winding 550 which winding has its other end connected to ground through a capacitor 551 and to the potential of the source 506 through a resistor 552. The base and the collector of the amplifier transistor 545 have connected therebetween a diode 553 and a Zener diode 554. The junction point of the back-to-back diodes 548 and 549 of the control conductor 547 is connected through a resistor 555 to the potential of the source 506.

The output of the second amplifier section, and thereby the output of the sampler circuit, is taken across a pair of secondary windings 556 and 557 coupled to the primary winding 550. The windings 556 and 557 are serially connected together at one end, the other end of the winding 556 being connected to ground and the other end of the winding 557 being connected to an output conductor 558 of the sampler circuit 500–0. The latter end of the winding 557 is also connected through a diode 559 to the junction of the diodes 548 and 549. A test pad comprising resistors 560, 561, and 562, is connected across the winding 556 and provides a convenient point for testing the output of the sampler circuit 500–0 at a test terminal 563.

The sampler circuits 500 comprise the final circuits of the sequence of output stages of the memory of the information store of this invention and, as previously mentioned, provide the means for generating an information output signal of a single polarity regardless of the polarity of the bipolar signals generated in the memory during an interrogation operation. A number of controls is provided to a sampler circuit as already suggested by the foregoing reference to the control input conductors 519, 526, and 547. Before proceeding to a description of the control and logic circuits provided to insure the desired output signals and their timing, the operation of the sampler circuit 500–0 will be generally described. Such a general description will facilitate an understanding of the readout control and logic circuits to be described hereinafter. It will be recalled from previous description that the signals applied to a sampler circuit 500 are bipolar in nature; that is, a binary 1 is signalled by the introduction to the sampler circuit of either an initial positive or a negative going voltage followed immediately by a negative or a positive voltage, respectively. As will subsequently appear, the sampler circuit concerns itself only with the initial entering waveform and it is only with this input voltage that the following general description will deal.

Whatever the polarity of the initial phase of an input signal to the sampler circuit 500, the input signal is amplified in the conventional amplifier section comprising the transistors 501 and 502, and this amplified signal is applied to the primary winding 512 connected to the emitter-follower comprising the latter transistor. Even should the current carrying capabilities of the transistor 502 be exhausted, provision is made for the latter element to follow the transistor 501 by the introduction of the diode 508. Ordinarily the potential of transistor 501 is that of the emitter of transistor 502 and when the latter transistor is unable to follow the transistor 501 the diode 508 becomes forward-biased and the recovery of the transistor 502 after becoming saturated is insured. Assuming for purposes of description that the initial phase of the input signal applied to the first amplifier section is negative-going, this signal is inverted during amplification and is applied as a positive signal to the secondary windings 513 and 514 of the detection section. The latter windings, it will be recalled, are coupled in the same sense to the primary winding 512; accordingly, with the application of a positive signal thereto the end of the winding 514 connected to the control conductor 526 and the corresponding end of the winding 513 will be positive and the end of the winding 513 connected to the control conductor 519 and the corresponding end of the winding 514 will be negative. Diode 530 is, as a result, being driven by a positive voltage, however, not sufficiently to overcome its forward-biasing. The diode 532 is being driven by a negative voltage, and is accordingly further back-biased. The output voltage from the winding 513 may thus be transmitted to the output section of the sampler if an additional positive potential is applied to the positive side of the diode 530. Accordingly, at the optimum time a positive strobe voltage is applied to the conductor 519. The strobe voltage causes the junction of the diodes 517 and 518 to go positive which permits the negative end of diode 517 to go in a positive direction until diode 521 is forward-biased. As a result, the negative end of winding 513 also goes positive. The timing of the strobe voltage is such that this rise in potential of the latter winding occurs at the point of the positive-going signal applied from the primary winding 512 at which the greatest difference between a 1 and a 0 signal occurs. The combined positive signals are then sufficient to complete the forward-biasing of the diode 530. To insure that the negative end of the diode 530 is at a proper level to insure the forward-biasing, the variable tap of the potentiometer resistor 536 is adjusted to an optimum point. The signal amplified in the first amplifier section is thus strobed, or sampled, during the duration of the strobe current applied to the control conductor 519. As will appear hereinafter, this strobe voltage is applied for one-quarter microsecond and samples the input signal at the aforementioned optimum point, thereby discriminating against between 1 and 0 and also extraneous noise signals advantageously to achieve the maximum signal to noise ratio. The particular timing of the strobe signal with a concurrently applied strobe voltage on conductor 547 and its source will be considered in detail hereinafter.

The sampled signal is applied through the capacitor 531 to the base of the output transistor 545 which, as previously mentioned, is connected as an amplifier. The latter transistor is normally conducting current from the source 506 through resistor 552 via the primary winding 550 to ground at the emitter of the transistor. The diodes 553 and 554, the former of which is a Zener diode, are employed to establish a suitable potential between ground and the collector of transistor 545. A bias is supplied to the base of the transistor 545 by its connection through the resistor 546 to the potential source 522. When the positive signal is applied to base of the latter transistor through capacitor 531, the collector of transistor 545 goes negative. The coupling of the secondary winding 557 is such that, as the result of the positive current on the connected end of the winding 550, the output conductor 558 also has a positive potential applied thereto. This latter positive signal was initiated by the strobe control current pulse applied to the control conductor 519. This positive output signal would ordinarily terminate at the termination of the latter strobe current. However, by means of an advantageous feedback circuit the positive output signal is regenerated in the second amplifier circuit and is terminated by the termination of a previously applied second positive strobe current pulse on the control conductor 547.

Prior to the time that the strobe voltage pulse is applied to the conductor 547, diodes 549 and 559 are conducting current from the source 506 to ground through the resistor 555, ground for the diode 549 being provided in the subsequent control circuitry to be described and ground for the diode 559 being provided at one end of the secondary winding 556. The diode 548, which is a shifter diode, is back-biased by the positive signal applied from the detection circuit as previously described. When the positive strobe voltage is applied to the conductor 547, the circuit operation is unaffected since diode 559 is conducting, thereby holding the potential of the junction of the diodes 548, 549, and 559 at a constant value. When the positive potential appears on the secondary winding 557 at the time of the strobe voltage applied to the conductor 519 previously, the diode 559 becomes back-biased with the result that the diode 548 goes positive at its positive end. The latter diode then conducts, thereby applying a regenerative feedback current to the base of the transistor 545 which current originates at the source 506 and is transmitted via the resistor 555. As a result, after the termination of the strobe voltage applied to the conductor 519, the transistor 545 continues to conduct until the regeneration of the current is terminated. This termination is accomplished by terminating the strobe voltage applied to the conductor 547 which thus terminates the positive output signal appearing on the output conductor 558. The duration of the latter output signal is thus determined by the two strobe voltages applied to the two conductors 519 and 547.

In the foregoing, the operation of a sampler circuit was described when its input was an initially negative-going signal representative of the storage in the memory of the information store of a binary 1. For this signal a strobe voltage was applied to the control conductor 519 preceded by a strobe voltage on the control conductor 547. In the equally possible event that the binary 1 representative signal is an initially positive-going signal, a strobe voltage is applied to the control conductor 526 rather than to the conductor 519. In the latter case the control circuit connected to the secondary winding 514 of the rectifier section is energized and its operation is identical in every respect to that described for the control circuit connected to the winding 513 and the control conductor 519. In this case, the output amplifier section of the sampler circuit receives its input via the diode 532 and capacitor 533. It may be noted at this point that the succeeding phase of either a positive or negative signal applied to the sampler circuit has no effect on the output produced. Since a strobe voltage is applied on neither the control conductor 519 nor 526 during this phase, the signal applied to the secondary windings 513 and 514 is insufficient by itself to forward-bias either the diode 530 or the diode 532.

Each of the remaining sampler circuits 500–1 through 500–43 is organized and operates in a manner identical to that described in detail for the sampler circuit 500–0 and the representative last of the series of sampler circuits is shown in block symbol form only. Each of the latter circuits also has provided thereon an output conductor 558'. The source of the strobe voltages, the control of their application and their precise timing, and the manner in which is determined the polarity of the readout signal to be expected from the memory and which is ultimately applied to a sampler circuit 500 may now be considered in detail.

*Detailed description of readout control circuits*

The timing and control circuitry for the readout circuits of the information store described in the foregoing are depicted in the sequence of FIGS. 21, 25, 28, and 30 and will be described with reference thereto. It will be recalled from the foregoing description of the sampler circuits 500 of FIG. 29, that each of these circuits is selectively supplied with a strobe control signal on its control conductor 547 and also a strobe control signal to either one of its control conductors 519 or 526. These strobe control signals, the specific character of which will subsequently be considered, originate in a strobe generator 600, shown in FIG. 21, and are suitably delayed by a series of delay pulse generators 650–1 through 650–4, shown in FIGS. 25 and 28, and are separately amplified in strobe amplifiers 700–1 through 700–3, depicted in FIG. 30, from which latter amplifiers the strobe control signals are applied to the sampler circuits 500. The organization of the foregoing circuits may now be considered in detail.

Figure 21:
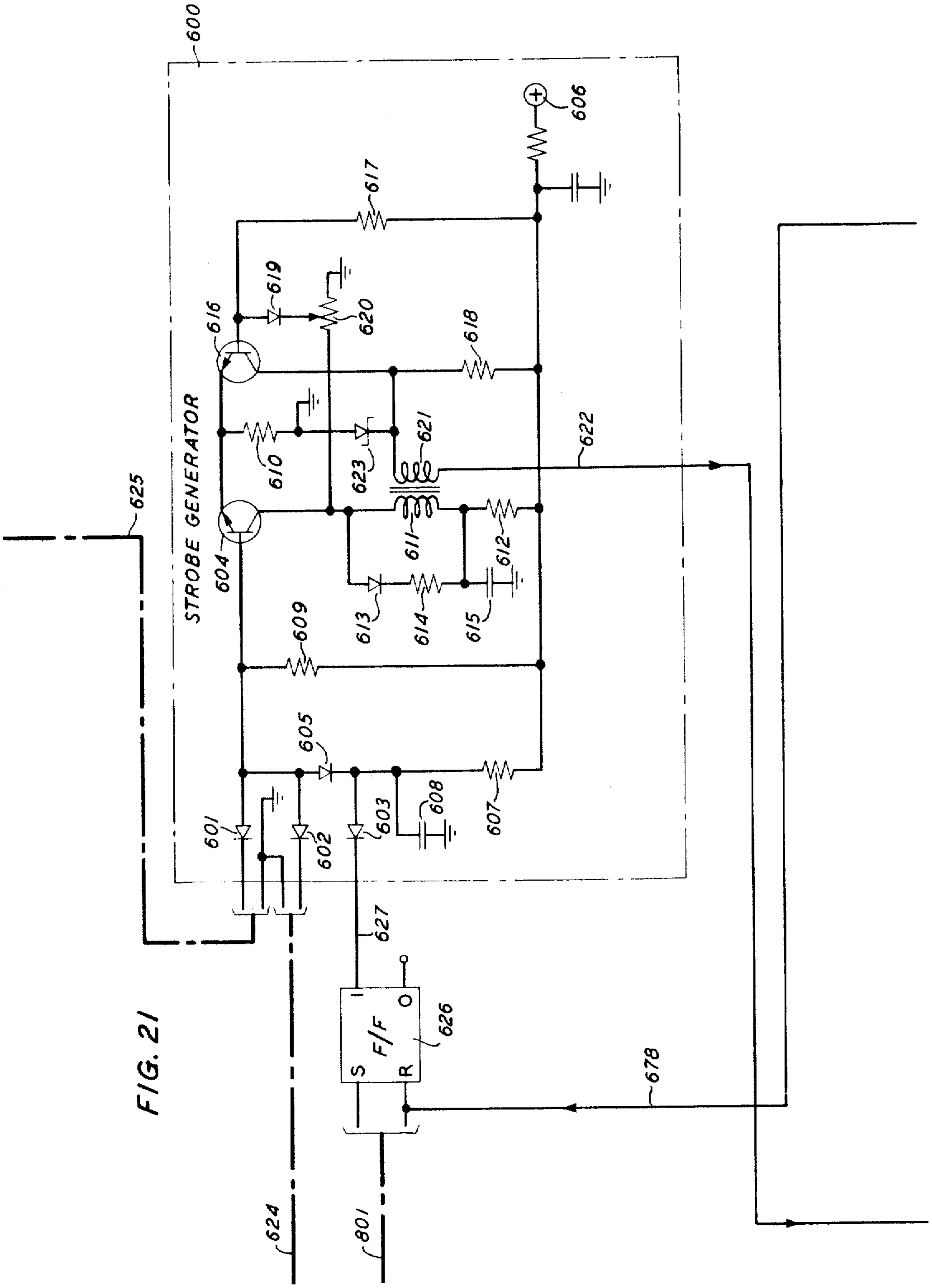
Figure 22:
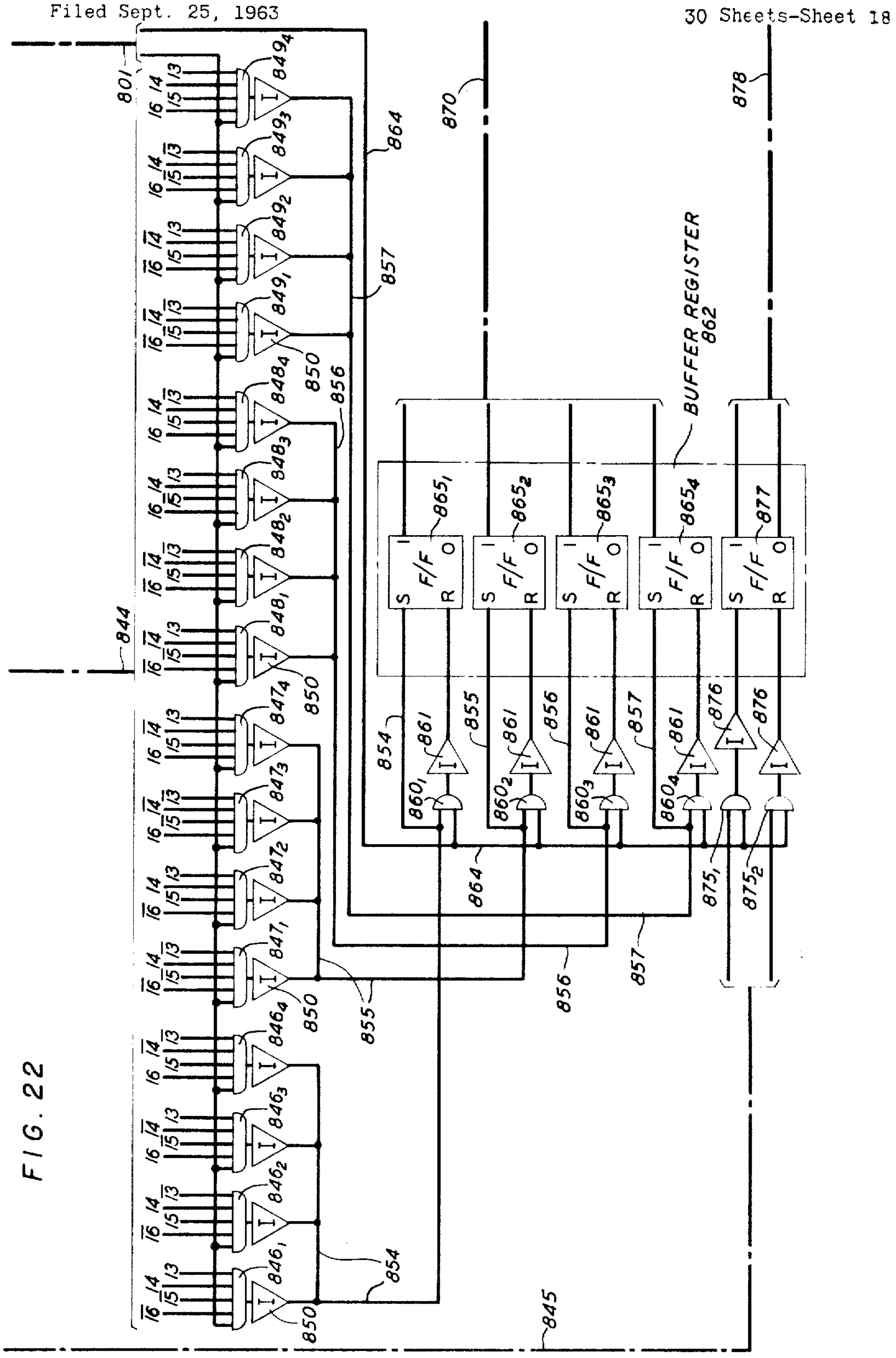

The strobe generator 600 of FIG. 21 comprises a three-input AND gate followed by a pulse amplifier section. The three inputs are applied across three diodes 601, 602, and 603. The diodes 601 and 602 are connected together at their positive sides and to the base of a transistor 604 and also to the positive side of a fourth diode 605. The latter diode is connected at its negative side to the diode 603 and to a source of positive potential 606 through a resistor 607. A bypass capacitor 608 is also connected to this end of the diode 605 and to ground at its other end. In the circuit of the transistor 604, the base is connected through a resistor 609 to the potential source 606, the emitter being connected through a resistor 610 to ground. The collector is connected to the potential source 606 through a transformer primary winding 611 and a resistor 612. During the operation of the circuit, recovery of the transformer is insured by a diode 613 and resistor 614 connected across the primary winding 611 and to ground through a capacitor 615. A normally conducting transistor 616 normally prevents the transistor 604 from conducting by the connection of the two emitters. The transistor 616 is supplied through its base via a resistor 617 by the potential source 606 to which its collector is also connected through a resistor 618. The potential at the common emitter point of the two transistors is determined by the potential source 606 as applied through a diode 619 and the potentiometer variable tap of a resistor 620. The latter resistor is connected between ground and the collector of transistor 604. A transformer secondary winding 621 coupled to the primary winding 611 is connected at one side to the collector of transistor 616 and at its other side to an output conductor 622 of the strobe amplifier 600. A Zener diode 623, connected between ground and the collector side of the winding 621, provides for the potential control of output signals generated by the strobe circuit.

The strobe amplifier 600 is energized at the concurrent application of positive control signals applied to the three-input gate including the diodes 601 through 603, the timing and character of the control signals being considered hereinafter in connection with a description of the operation of the read-out control circuits. One of the positive control signals applied to the gate diode 601 originates at an output of the current shunt switch 116' of the store access circuits and the positive control signal applied to the gate diode 602 originates at an output of the current shunt switch 116 of the store access circuits. More specifically, the control signal applied to the diode 602 is generated upon the energization of the current shunt switch 116 in the secondary winding of the transformer 210 depicted in FIG. 9, connections being carried from each end of the latter winding by means of a cable 624 extended from FIG. 9, through FIGS. 10, 14, 15, 19, 20 to FIG. 21 where one side of the secondary winding is grounded in the strobe generator 600. In a similar manner, the control signal applied to the gate diode 601 is generated upon the energization of the current shunt switch 116' in the secondary winding of the corresponding transformer, which shunt switch 116' is shown in block symbol form in FIG. 17, connections being carried from each end of the latter winding by means of a cable 625 extended from FIG. 17 to FIG. 21 where one side of the secondary winding is also grounded in the strobe generator 600.

The last positive control signal applied to the gate diode 603 is provided by an output of a flip-flop circuit 626 via a conductor 627. Since the flip-flop circuit 626 is of a character employed generally in the information store being described and, further, since it incorporates in its circuitry gating means also generally employed in the store, these circuits will be described at this point with particular reference to FIGS. 34 and 35. The flip-flop circuit 626 comprises a pair of two-input AND gates 629 and 630 having connected to the respective outputs inverter circuits 631 and 632 as shown in FIG. 34. One of the inputs of the gate 629 is designated the set input and one of the inputs of the gate 630 is designated the reset input. The other inputs of the gates 629 and 630 are cross connected to the outputs of the opposite inverter circuits 632 and 631, respectively. The output of the inverter circuit 631 also provides the 1 potential condition and the output of the inverter circuit 632 also provides the 0 potential condition. The AND gate-inverter combinations will be better understood by reference to the circuit details depicted for one such circuit in FIG. 35. The two-input AND gate section of the combination comprises a pair of diodes 633 and 634, the positive sides of which are connected together and to a source of positive potential 635 through a resistor 636. The negative sides of the diodes 633 and 634 are connected to the input terminals of the AND gate. A transistor 637 is also connected by means of its base and the negative side of another diode 638 to the source 635 through the resistor 636. The collector of the transistor 637 is connected to the output terminal of the AND gate-inverter combination and also to a second source of positive potential 639 through a resistor 640. The emitter of the transistor 637 is connected directly to ground and the base is connected thereto through a resistor 641.

The circuit of FIG. 35 operates between a low, substantially ground potential and a high potential of substantially 4.5 volts established by the potential source 639. When either of the inputs of the diodes 633 or 634 is low, the diode 638 is back-biased with the result that the transistor 637 is cut off. The output of the latter transistor is thus substantially at the potential of the source 639, that is, high. When, on the other hand, both of the inputs to the diodes 633 and 634 are high, that is, in the present case, at 4.5 volts, the latter diodes are back-biased and the diode 638 is forward-biased. The source 635 thus supplies current to the base of the transistor 637 through resistor 636 causing the latter element to conduct. The output terminal at the collector is thus brought essentially to ground potential. The logic side of the circuit of FIG. 35 is thus responsive to the AND condition of positive-going input signals, the output of the logic side being inverted by transistor 637 to provide a negative-going, or low potential condition responsive to the positive inputs. Any other input combinations will produce a positive-going, or high potential on the terminal of transistor 637.

In view of the operation of the AND gate-inverter combination circuit of FIG. 35, the operation of the flip-flop circuit of FIG. 34 is evident. Assuming that the flip-flop circuit of FIG. 34 is originally in a reset state, with a positive or high potential appearing on the 0 output terminal, then this high potential is also applied to one of the inputs of the AND gate 629 by a cross connection as depicted in the figure. When a negative-going potential is now applied to the set input connected to the AND gate 629, the output of the latter gate will be low or substantially ground potential. This output condition is inverted by the inverted circuit 631 to provide at its 1 output a positive-going signal indicative of the set condition of the flip-flop. This output potential is also applied via a cross connection to one of the inputs of the AND gate 630. The reset input of the latter gate is also high with the result that the 0 output has low, or ground potential appearing thereon. The flip-flop circuit of FIG. 35 is thus switched from one of its states to the other by applying a negative-going potential to a normally high input of the gates 629 and 630.

Assuming that the three input signals are concurrently applied to the input gate of the amplifier 600, the normally nonconducting transistor 604 begins to conduct because of the positive potential applied to its base. As a result, a negative-going potential is developed at its collector thereby causing the base of transistor 616 to go negative, momentarily shutting off the latter transistor. The common emitter point of transistors 604 and 616 also goes negative, resulting in a fast pulse rise time at the collector of transistor 604. A negative output pulse is thus generated at the secondary winding 621. The resistor 607 and capacitor 608 at the input gate provide a delay circuit to delay the deenergizing action of the termination of the positive signal applied to the diode 603 for reasons which will appear hereinafter.

The negative output of the strobe generator 600 is applied to the first of a succession of delay pulse generator 650–1 through 650–4 with intermediate output points provided along the series of generators for control purposes such as are provided in the timing circuits 132 of FIG. 18. Since each of the delay pulse generators 650 is identical in organization and operation only the first of the generators 650–1 is shown in detail in FIG. 25 and will now be described. The input side of the delay pulse generator 650–1 comprises a logic gate comprising a pair of diodes 651 and 652 connected back-to-back in series with the conductor 622 and the base of a transistor 653. Current normally flowing from a source of positive potential 654 through a resistor 655, connected between the latter source and the junction of the diodes, to ground through a resistor 656 connected to the base of the transistor 653, maintains the latter transistor normally conducting. The transistor 653 normally conducts along a circuit originating at the potential source 654 including a resistor 657 connected between the latter source, the collector of the transistor 653, and the emitter of the latter transistor to ground. The input stage thus far described controls a second stage comprising a transistor 658 having its base connected through a varistor 659 to a control circuit traced from a source of positive potential 660, through a resistor 661 to ground through resistor 664′, and a diode 662 connected to one side of the varistor 659. A current flowing in the latter circuit maintains the transistor 658 also normally conducting with the result that its base is substantially at ground potential. The transistor 658 normally conducts along a path originating at a source of positive potential 663, through a resistor 664, its collector and emitter, a diode 665, and resistors 666 and 667 to a source of negative potential 668. A timing capacitor 669 is connected between the junction of the resistor 666 and diode 665 and the collector of transistor 653, which capacitor, as will appear, controls the delay introduced between the input and output of the generator circuit 650–1.

When a negative-going input signal is applied to the generator circuit 650–1 via the conductor 622, the diode 652 is back-biased and the transistor 653 is turned off. As a result, the potential on its collector will rise as limited by a diode 670 connected between the latter collector and the positive end of the diode 665 through a resistor 671. The diode 665 operates in conjunction with a Zener diode 693 connected between ground and the positive side of diode 665 through resistor 671 to clamp the collector of transistor 653 to a predetermined voltage during its de-energized state. This voltage is applied instantaneously to the timing capacitor 669 thereby charging the latter capacitor and back-biasing the connected diode 665. Once the latter diode is cut off, the potential on the emitter of transistor 658 tends to rise because of its connection through the resistor 671 to the positive potential source 660 through resistor 661. The extent to which the emitter rises in potential is controlled by a diode 672 connected between the latter emitter and ground. During this time the capacitor 669 discharges through the circuit terminating in the negative potential source 668 until such time as the diode 665 is again forward-biased, which discharge time is the delay introduced by the generator circuit 650–1. Raising the potential on the emitter of transistor 658 turns off the latter element and the current normally flowing in the collector-emitter circuit of transistor 658 is now steered through a diode 673 and a resistor 674 and through the path previously traced to the potential source 668. The diode 673 is connected to the base of a transistor 675 which is normally nonconducting with the result that the latter transistor is rendered conductive by the current flowing in the diode 673. It may be noted that the latter transistor begins to conduct substantially at the same time that the negative-going input pulse is applied to the circuit 650–1 via the conductor 622 previously mentioned. The transistor 675 conducts along a circuit from the potential source 660, a resistor 676 and its collector-emitter circuit to ground at the latter element. The potential drop across the transistor 675 during its conduction is applied to the negative side of a diode 677 connected between the junction of the input diodes 651 and 652 and the collector of transistor 675. As a result, the current normally maintaining the input transistor 653 conductive is steered through the diode 677 through the transistor 675 to ground to maintain the transistor 653 off after the termination of the input control pulse applied to the conductor 622. The potential drop existing across the transistor 675 is also applied at about the same time as the application of the input control pulse to an output conductor 678 which output condition extends for the time that the transistor 675 conducts which is, as will appear hereinafter, until the time that the diode 665 is again forward-biased, that is, until the timing capacitor 669 is discharged.

A normally nonconducting output transistor 679 has its base connected through a diode 680, a capacitor 681, and a second diode 682 to the collector of the transistor 675. One side of the capacitor 681 is connected to the negative potential source 668 via a resistor 683 and the other side of the capacitor 681 is also connected to this potential source through a resistor 684 and to ground through a diode 685. The base of the transistor 679 is connected to a source of positive potential 686 through a resistor 687. A second output conductor 688 of the circuit 650–1 is connected to the collector of the transistor 679 which collector is also connected to the source of positive potential 660 through a resistor 689. Since the transistor 675 is normally nonconducting, a negative current flows from the source 668 through the resistor 657, through the resistor 683, the diode 682, the resistor 676, to the positive supply of the source 660. Similarly, a negative current flows from the negative source 668, through the resistor 684, the diode 680, to the positive source 686 through the resistor 687. These currents maintain capacitor 681 charged sufficiently to hold transistor 679 nonconducting. When transistor 675 begins to conduct the potential across it drops and diode 682 becomes back-biased with the result that the current in the resistor 683 is steered to the capacitor 681. As a result, capacitor 681 charges, holding the base of transistor 679 more negative. When transistor 675 is again turned off at the termination of the delay time set by the discharge time of capacitor 669, diode 682 is again forward-biased and the potential at the junction of diode 682, resistor 683, and capacitor 681 rises. As the latter capacitor discharges it back-biases the diode 680 raising the potential on the base of transistor 679 from the source 686 thereby rendering the latter transistor conductive. The latter transistor will remain on for the length of time required to recharge capacitor 681 through the resistor 684. The capacitor 681 and the latter resistor are thus the timing circuit for determining the length of an output signal on the output conductor 688. When the capacitor 681 is again charged, transistor 679 is turned off thereby terminating the output signal on its collector and the output conductor 688.

A pair of diodes 694 and 695 connected between the collectors of the transistors 675 and 679, respectively, and potential source 660 serve to limit the potential excursions at the latter collectors and also stabilize the potential at a predetermined level. Zener diode 690, diode 691, and varistor 692 connected to the negative potential source 668, insure a stable potential from this source. In recapitulation, the delay pulse generator circuit 650–1 is energized by a one-quarter microsecond negative pulse from the strobe generator circuit 600 and produces virtually simultaneously, a negative pulse on the output conductor 678 for the length of the delay time of the circuit 650–1, which in the case of this particular circuit is one microsecond. After the delay time, a negative pulse lasting for one-half microsecond is generated on the output conductor 688.

The delayed output of the delay pulse generator 650–1 is carried along a series of substantially similar generators 650–2 through 650–4 which differ only in the value of the timing capacitors corresponding to the capacitor 669 of the generator 650–1. The values of these capacitors are determined such that the generators 650–2, 650–3, and 650–4 provided a delay between their inputs and outputs of one-quarter microsecond. Another similar generator 650–5 provides a delay of one-half microsecond for purposes which will subsequently appear. The remaining delay pulse generators are accordingly shown in block symbol form only, their details being ascertainable by reference to the foregoing description of the generator 650–1. The specific interconnections of the delay pulse generators 650 may be described with reference to FIGS. 25 and 28. The output conductor 688 of the generator 650–1 is connected to the input of the generator 650–2; the output conductor 678 of the generator 650–1 is connected to the reset input of the flip-flop circuit 626 of FIG. 21, which circuit is also of the character as depicted in FIG. 34 as are other flip-flop circuits associated with the pulse generators 650–2 through 650–5. An output conductor 688–2 of the generator 650–2, corresponding to the output conductor 688 of the generator 650–1, connects at one point to the input of the delay pulse generator 650–3. A corresponding output conductor 688–3 of the latter pulse generator in turn is connected at one point to the input of a third delay pulse generator 650–4. The corresponding output conductor 688–4 of the latter delay pulse generator is connected to the 1 output of a flip-flop circuit 696. Returning to the output conductor 688–2 of the pulse generator 650–2—this conductor is also connected to the set input of a flip-flop circuit 697. The output conductor 688–3 of the pulse generator 650–3 is also connected to the set input of the flip-flop circuit 696. Only the first delay pulse generator 650–1 provides an output on its conductor 678, this output not being necessary for the purposes achieved by the remaining generators.

The relationship of the one-half microsecond delay pulse generator 650–5 to the other such generators already mentioned may best be understood by proceeding to the final components of the readout control circuitry depicted in FIG. 30. These circuits comprise three strobe amplifier circuits 700–1, 700–2, and 700–3, interconnected variously with the above-mentioned flip-flop circuits to provide the stroke signals for the sampler circuits 500 of FIG. 29.

The strobe amplifier 700–1 comprises a two-input logic section and a current amplifier section. The input logic section at the right hand of the diagram of FIG. 30 comprises a pair of transistors 710 and 711 having the bases connected to respective input conductors 712 and 713. The input conductor 712 has serially connected therein a diode 714 and the input conductor 713 has similarly connected therein a diode 715. In the case of the strobe amplifiers 700–2 and 700–3 the corresponding input conductors are each controlled by control signals applied thereto in a manner to be described to achieve an AND logic operation. For the strobe amplifier 700–1, however, one of the AND inputs is permanently supplied by the connection of the input conductor 713 to ground, which ground potential is the condition also selectively applied to the companion input conductor 712 and to the corresponding input conductors of the amplifiers 700–2 and 700–3 to cause their operation. Normally, positive potential conditions on the input conductors 712, etc., maintain the logic transistors 710 and 711 conducting by back-biasing the diodes 714 and 715. To insure that the control signals applied to the input conductors in fact are sufficient to cause the back-biasing of the diodes 714 and 715 the potentials on the bases, emitters, and collectors of the transistors 710 and 711 are controlled by a number of potential control circuits. The emitter-base potentials of the conducting transistors 710 and 711 are partially controlled by a bleeder circuit comprising a resistor 716 connected to the collectors of the latter transistors, which resistor is also connected to ground through two other resistors 717 and 718. Control of the potentials at the bases of the two transistors is also provided by a pair of parallel, normally conducting current paths traced from a source of positive potential 719, dividing through two resistors 720 and 721 connected to the latter source, back to a common circuit path through a pair of diodes 722 and 723 at their junction point, the resistors 717 and 718 to ground at the latter resistor. The negative ends of the diodes 722 and 723 thus also establish the potentials at the bases of the normally conducting transistors 710 and 711.

At the output sides of the transistors 710 and 711 voltage divider circuits are provided to supply the necessary potentials to the amplifier section of the circuit 700–1. Thus, one divider circuit, comprising a conducting path through the transistors 710 and 711, comprises a pair of resistors 724 and 725 serially connected between the ground resistor 718 and the collectors of the latter transistors. Another divider circuit may be traced from the latter collectors through a pair of resistors 726 and 727, a diode 728 to the ground resistor 718. The current in the conducting transistors 710 and 711 is carried via the foregoing paths from ground at the resistor 718 through the collector-emitter paths of the latter transistors through a resistor 729 to a source of negative potential 730.

The amplifier-output section of the circuit 700–1 comprises two parallel conducting paths each having included therein a pair of series connected transistors. The first of the paths includes a pair of transistors 731 and 732 and the second path includes a pair of transistors 733 and 734. These transistors are further paired by connecting together the bases of the transistors 731 and 733 and connecting together the bases of the transistors 732 and 734. In the first parallel conducting path the emitter of the transistor 731 is connected to the collector of the transistor 732 and in the second conducting path the emitter of the transistor 733 is connected to the collector of the transistor 734. The parallel conducting paths may be further traced from the origin at a source of positive potential 735, a resistor 736, a further parallel connection comprising parallelly connected transformer primary windings 737 and 738, and to the collectors of the transistors 731 and 733 which are directly connected together. The two parallel conducting paths are terminated at the emitters of the transistors 732 and 734 which are each connected to ground through respective resistors 739 and 740 having capacitors 741 and 742 respectively connected thereacross.

The transistor pairs 731–732 and 733–734 are maintained normally conducting under the control of either or both of the normally conducting transistors 710 and 711 by the potentials supplied via connections to the aforementioned bleeder circuits. Thus, enabling potentials are supplied to the bases of the transistors 731 and 733 by their common connection to the junction of the bleeder resistors 724 and 725. Similarly, enabling potentials are supplied to the bases of the transistors 732 and 734 by their common connection to the junction of the bleeder resistor 727 and the positive side of the diode 728. One side of the primary windings 737 and 738 is maintained at a regulated predetermined potential by a regulator circuit connected in parallel with the current path leading to the primary windings comprising a transistor having its collector connected to one side of each of the primary windings 737 and 738 through a resistor 744 and its emitter connected to ground. Its base is also connected to the one side of the primary windings through a resistor 745 and a Zener diode 746, and it is also connected to the emitter through a resistor 747. The potentials for maintaining the transistor pairs 731–732 and 733–734 conducting will be supplied only during the time that either or both of the logic transistors 710 and 711 are conducting, which conditions prevent any output from the strobe amplifier 700–1. Only when both of the AND input conditions on the input conductors 712 and 713 are present will an output be generated at the output end of the circuit, which operation may now be described.

In the case of the strobe amplifier 700–1 being described, one of the AND input conditions is permanently present in the connection of the terminal of the conductor 713 to ground. This ground connection forward-biases the input diode 715 to cause a current flow from the source 719 through the resistor 721 to ground through the latter diode. As a result, the base of the transistor 711 will be at substantially ground potential, thereby cutting off the latter transistor. However, since in the normal, unoperated state the diode 714 is still back-biased by a high potential applied from the other end of the input conductor 712 as will hereinafter appear, the transistor 710 continues to conduct and thus provide the operative potentials for the normally conducting transistor pairs. The other AND condition to be applied to the strobe amplifier circuit 700–1 is a negative-going signal to substantially ground potential. This signal, as will appear subsequently, is provided at the proper time by the flip-flop circuit 697 of FIG. 28 for the amplifier 700–1. When this negative-going signal is applied to the input conductor 712, the diode 714 is also forward-biased with the result that it also conducts current from the source 719 bringing the base of transistor 710 substantially to ground potential. This back-biases the base-emitter junction causing the transistor 710 to turn off. Since both of the emitters of the now nonconducting transistors 710 and 711 are connected to the negative potential source 730, they now go negative, thereby forward-biasing a diode 748 connected between the latter emitters and the junction of resistors 726 and 727. This negative potential signal is transmitted through a capacitor 749 connected across the resistor 727, and is directly applied to both of the bases of the transistors 732 and 734. Both of the latter transistors are, as a result, turned off. As the transistors are turned off, the transistors 731 and 733 also are cut off. As both pairs of transistors are simultaneously turned off, a positive voltage pulse appears at the collector ends of the primary windings 737 and 738. To prevent an undue rise in this voltage and to protect the transistors 731 and 732 across which the voltage appears, a Zener diode 750 is connected between the collector of the transistor 731 and the winding 737 and a conventional diode 751 is serially connected with the diode 750 to prevent current conduction through this path during normal operation. A resistor 752 is connected between the collectors of the transistors 731 and 732 and the windings 737 and 738 to prevent ringing when the energy in the latter windings is dissipated at the time that the amplifier 700–1 is restored to its normal operative state at the termination of the controlling input signals.

At the output end of the amplifier 700–1 the primary windings 737 and 738 have coupled thereto the secondary windings 753 and 754, respectively. One end of the winding 753 is connected to a source of positive potential 755 providing a predetermined voltage less than that provided by the positive source 735. The other end of the latter winding is connected through a diode 756 to an output terminal 757. The latter terminal is also connected through a resistor 758 to the potential source 735 through the resistor 736. One end of the secondary winding 754 is connected to an output conductor $759_1$, and the other end of the same winding is connected to ground. When the normally conducting transistor groups of the amplifier 700–1 are cut off as previously described, the positive-going signal generated in the windings 737 and 738 is made available in opposite polarities at the secondary windings 753 and 754. A positive signal on the winding 754 is conveyed to the sampler circuits 500 of FIG. 29 at the time to be considered.

Since the terminal 757 is connected to the opposite end of the winding 753 from that of the connection of the output conductor 759 to the corresponding winding 754, a negative signal is applied to the terminal. In the case of the specific amplifier 700–1 being described this terminal is not employed. The corresponding terminals, not shown, of the strobe amplifiers 700–2 and 700–3 are connected together and to the delay pulse generator 650–5 of FIG. 28 for purposes which will subsequently appear. The resistor 758, connected to the source 735 insures, for the amplifiers 700–2 and 700–3, that the terminals 757 are brought back to a normal potential after the termination of the negative pulse applied thereto. The diode 756 serves to isolate the nonenergized amplifiers 700 from the particular one energized during an interrogation operation. A capacitor 760 is connected between the junction of the resistors 736 and 758 and ground and assists the regulator circuit including the transistor 743 in providing voltage regulation at this point.

It will be appreciated that when either but not both of the input conductors 712 and 713 are energized some coupling within the input logic stage of the amplifier 700–1 may cause the connected transistor 710 or 711 to respond. Accordingly, in order to prevent the generation of unwanted noise signals from the amplifier 700–1, the diode 748 is inserted between the emitters of the transistors 710 and 711 and the bleeder circuits already described. The diode 748 is maintained back-biased sufficiently so that only the complete cut off of both of the transistors 710 and 711 will cause the emitters to go sufficiently negative to forward-bias the diode 748. The output conductor 759$_1$ of the amplifier 700–1 is carried via a cable 762 to each of the strobe control input conductors 547 of each of the sampler circuits 500 of FIG. 29. The cable 762 also carries the corresponding output conductors 759$_2$ and 759$_3$ of the strobe amplifier circuits 700–2 and 700–3 to the strobe control input conductors 519 and 526, respectively, of each of the sampler circuits 500 of FIG. 29.

The foregoing completes the detailed consideration of the readout control circuits of one specific illustrative information store according to this invention. The description of an illustrative operation of the information store, previously begun with a consideration of an illustrative interrogation of the memory 100 and the operation of the access circuits 110, may now be completed. The readout circuits 120 operate both responsive to and in coordination with the operation of the access circuits 110. Accordingly, circuitry, not yet considered, for providing for the cooperation of the readout circuits 120 with the access circuits 110 will be described at the time at which they are operated during the operation of the readout circuits 120, which operation may now be considered.

*Operation of readout circuits 120*

It will be recalled from the previous description of the operation of the access circuits 110 and the interrogation of the memory 100, that bipolar, alternating waveforms are received from the memory 100 representative of the binary values read out. Thus, a binary 1 output may be represented by a relatively large positive signal followed immediately by a negative such signal or it may be represented by a relatively large negative signal followed immediately by a positive such signal. Similarly, a binary 0 output may be represented by a relatively small positive signal followed immediately by a negative such signal or it may be represented by a relatively small negative signal followed immediately by a positive such signal. These output signal conditions are depicted ideally in FIG. 31 by the waveforms 328–332, 328′–332′, 329–333, and 329′–333′. As also previously explained, the bipolar nature of the binary output signals results from the alternating direction in which the A and B section tapes containing the wire memory elements 13 pass along the solenoids 11 of the succession of memory planes making up a memory module. Within each of the memory modules 40 through 43 making up the array depicted in FIG. 5, the output binary signals thus alternate with respect to polarity for the succession of memory planes within which the interrogation occurs. The particular physical arrangement of the output points contemplated in the specific embodiment of the information store of this invention being described is such that the polarities of the binary output signals also alternate among the corresponding memory planes of the memory modules. Thus, referring to the memory array depicted in FIG. 5, the output signals representing binary 1's generated upon the interrogation of any word row in the first memory plane, reading from the left as viewed in FIG. 5, of each of the memory modules 43$_1$, 42$_1$, 41$_1$, and 40$_1$ of the first column of modules, will be a signal comprising an initial negative-going wave followed by a positivegoing wave as depicted by the waveforms 328′–332′ in FIG. 31. These polarities then alternate as an interrogation moves to the right in the memory modules of the first column. The output signals so generated in any word row in the first memory plane, also reading from the left in FIG. 5, of each of the modules 42$_2$, 43$_2$, 40$_2$, and 41$_2$ of the second column of modules, on the other hand, will be a signal comprising an initial positive-going wave followed by a negative-going wave as depicted by the waveforms 328–332 in FIG. 31. These polarities then also alternate as an interrogation moves to the left in the memory modules of the second column. This alternation of polarities in the first memory planes of the modules is continued through the third and the last column of modules of the array of FIG. 5. Obviously, the arrangement and organization of the output points of the memory modules may be such that corresponding word rows of the modules would have identical output signal polarities.

From the foregoing, it is evident that since a signal representing a single binary bit may be of either polarity, the readout circuitry is controlled to anticipate the particular polarity of signal which may be expected from an interrogated word row of the memory 100. This function, it will be recalled, is accomplished by the detection section of the sampler circuits 500 of FIG. 29 where either one of two circuits in each one is simultaneously enabled by a strobe control input signal selectively applied to the input conductors 519 and 526. Since the latter conductors obtain their inputs from the strobe amplifiers 700–2 and 700–3, respectively, of FIG. 30, the latter circuits must be selectively enabled. The sampler circuits 500–0 through 500–43 are also collectively enabled by strobe control signals applied to the strobe input conductors 547 from the strobe amplifier 700–1 of FIG. 30. The latter circuit thus also necessitates a timely energization.

In still another selection operation to be accomplished by the readout circuits 120, the signals generated simultaneously in the wire memory elements of both an A and a B section tape during an interrogation are discriminated. This is accomplished by the selectively applied control signals on the control conductors 382A and 409B of the selector circuits 350 through 353 depicted in FIGS. 23 and 24. It will also be recalled in connection with these circuits that a particular group associated with the module group of FIG. 20 in which an interrogation takes place is collectively enabled. Control signals for accomplishing the latter enabling are applied to the control conductors 393G of the selector circuits 350–353.

Thus, in recapitulation, the operation of the readout circuits involves a number of controls and selections: at the time that the forty-four information signals representative of the desired word being read out appear across the wire-memory element-return conductor pairs, the proper group of forty-four selector circuits 350–353 and all of the sampler circuits 500 must be placed in a condition to receive the information signals; within the selected group of selector circuits the desired amplifier sections must be enabled to discriminate between the simultaneously appearing A and B section information signals; and within the sampler circuits the required rectifier sections are advantageously enabled to anticipate the polarity of the information signals. Since each of these control and selection operations must be accomplished to correspond precisely to the selections performed by the access circuitry, each is also directly determined by the addressing source controlling the access circuitry, namely, the address register 130 of FIG. 12. However, before proceeding to a description of the manner in which the address register 130 provides the control of the readout circuitry, the control and operation of the readout control circuits of FIGS. 21, 25, 28, and 30 will be considered with particular reference to the pulse chart provided in FIG. 32.

From the pulse chart of FIG. 31, it will be recalled that an interrogation of the information store of this invention is initiated at a time $t_0$ by a sync pulse 310 received from the central control of the parent system. The sync pulse 310 will also constitute the reference point from which each of the operations of the readout circuits is timed. Particular ones of the operations now to be described are intended to provide an enabling strobe signal on one or the other of the strobe input conductors 519 and 526 of the sampler circuits 500, depending on the polarity of the binary information signals generated in the memory. This enabling is timed, as previously mentioned, to occur during the first alternation of the information signals and within this period, at a time at which the waveforms representative of a binary 1 and a binary 0 present the maximum amplitude difference in order to achieve an optimum discrimination between the two. For the specific illustrative information store being described, this time has been determined as occurring at $t_{3.5}$ following time $t_0$ in the chart of FIG. 32, the time divisions again representing one microsecond. Accordingly, the development of the strobe signals by the readout control circuits for application to the sampler circuits will now be described.

At the time $t_{1.5}$ a negative pulse 800 is applied from a flip-flop in the readout pulse generator chain 303 of the timing circuits 132 of FIG. 18 via a cable 801, extended through FIGS. 19 and 20, to the set input of flip-flop 626 of FIG. 21. The latter flip-flop, which was previously reset as will be described, as a result, provides a positive-going potential, represented as the pulse 802 in FIG. 32, substantially without delay, to the input conductor 627 of the strobe generator 600. The latter circuit, however, is not energized (in order to avoid mistaking any noise in the readout circuits as being a 1) until the access circuitry becomes active at about time $t_2$ as indicated in the chart of FIG. 31. The complete energization of the strobe generator 600 occurs upon the application of the other inputs to its AND gate input from the X and Y access circuitry current shunt switches 116 and 116' of FIGS. 9 and 17, respectively. Simultaneous positive pulses 803 are applied from these switches via cables 624 and 625, respectively, at the time $t_2$. The AND condition is not satisfied until both pulses 803 are simultaneously present. The strobe generator 600, in the manner previously explained, develops at the time $t_2$, a negative pulse 804 which is applied via the conductor 622 to the input of the first delay pulse generator 650–1 of FIG. 25. The latter circuit is energized and instantaneously a negative pulse 805 is generated on its output conductors 678. This pulse is carried via the latter conductor back to the reset input of the flip-flop 626 causing the removal of the signal 802 from its output conductor 627. The strobe generator 600 is thus turned off; however, internal circuit delay assures that its output pulse 804 has a duration of about one-quarter microsecond.

The delay pulse generator 650–1 provides a delay of 1.0 microsecond; accordingly this time interval after its energization, at the time $t_3$, provides a negative pulse 806 on its output conductor 688. This pulse thus occurs during the application of the X and Y conductor coincident drive pulses 324 and 325 as shown in FIG. 31. The pulse 806 is applied via the conductor 688 to the input of the second delay pulse generator 650–2, which generator provides a second delay of 0.25 microsecond to apply at its output conductor 688–2, a negative pulse 807. This pulse is applied via the conductor 688–2, at one point, to the set input of the flip-flop circuit 697 of FIG. 28. As a result, the latter circuit is set, causing its 0 output to produce a negative-going signal 808. This signal is applied via the input conductor 712 to the input AND circuit of the strobe amplifier circuit 700–1 of FIG. 30. Since the other input of the latter circuit is already permanently connected to ground which is substantially the potential of the signal 808 as previously explained, the AND condition for this circuit is satisfied, thereby cutting off this normally conducting circuit to produce a positive strobe signal 809 across its secondary winding 754. The signal 809, occurring at the time $t_{3.25}$ as the result of the delay introduced by the delay pulse generator 650–2, is applied via the output conductor 759$_1$ and the cable 762 to the input conductors 547 of each of the sampler circuits 500 of FIG. 29. The latter circuits thus are provided with one of the three strobe signals necessary to produce the final information output signals to be transmitted to the store control circuits 140 and thence to the central control of the parent system. In the foregoing only the initiation of the first strobe control signal 809 is described; its termination is accomplished by the energization of one or the other of the remaining strobe amplifier circuits 700–2 and 700–3 in a manner which may now be considered.

Figure 25:
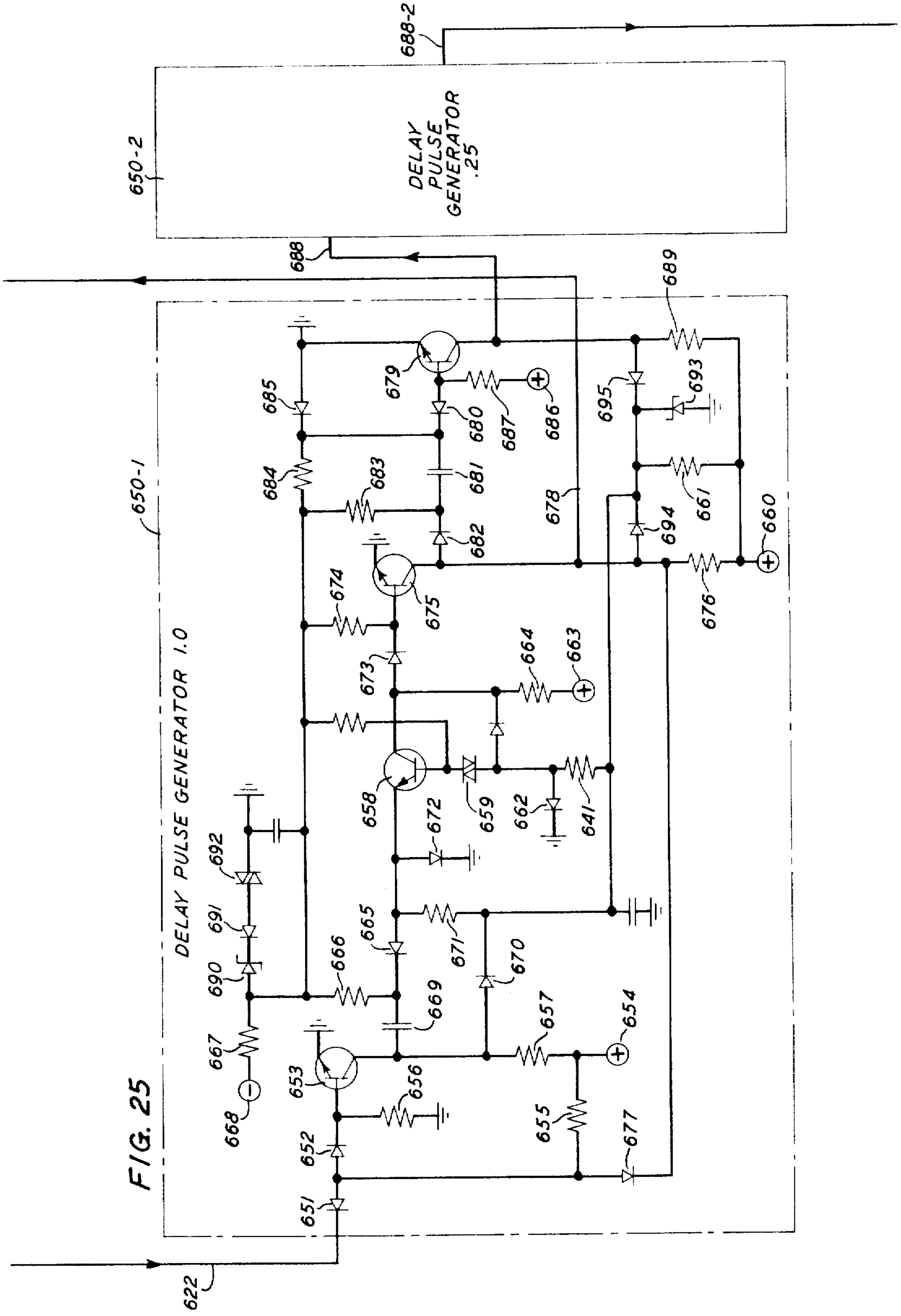
Figure 28:
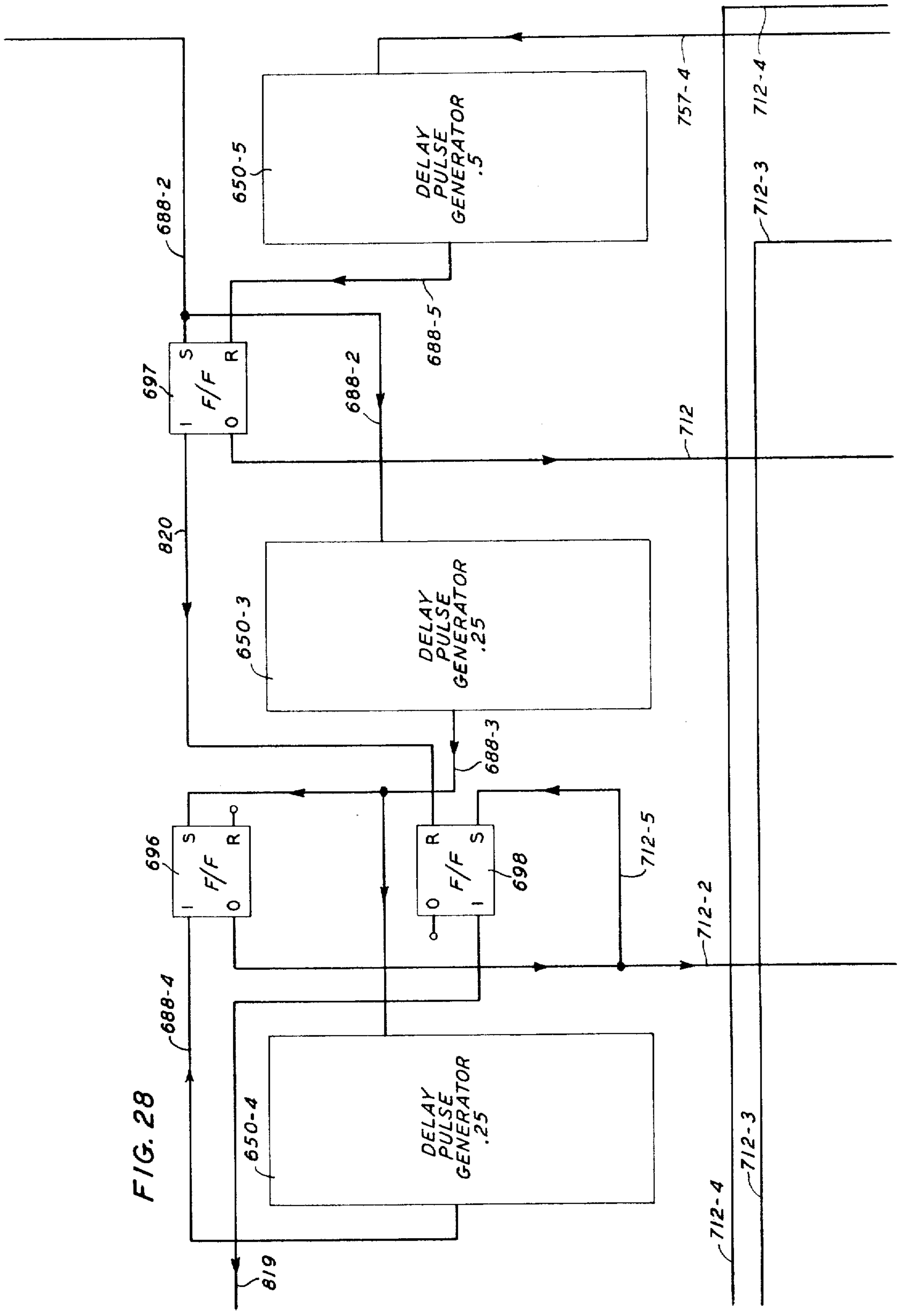

The signal 807 provided at the output conductor 688–2 of the delay pulse generator 650–2 of FIG. 25, in addition to being applied to the flip-flop circuit 697, is also applied at the time $t_{3.25}$ to the input of the delay pulse generator 650–3 of FIG. 28. This circuit provides for a further delay of 0.25 microsecond and after this interval, at the time $t_{3.5}$, generates a negative signal 810 on its output conductor 688–3. This signal is applied at one point to the set input of another flip-flop circuit 696 with the result that its 0 output makes available a negative-going potential 811, also at the time $t_{3.5}$. This pulse 811 is applied via an input conductor 712–2 to the inputs of both of the strobe amplifiers 700–2 and 700–3 corresponding to the input conductor 712 of the strobe amplifier 700–1. It will be recalled that these inputs of the former circuits are connected together and each comprises part of an AND logic input of these circuits. At the time $t_{3.5}$ each of the inputs of the remaining strobe amplifiers 700–2 and 700–3 may be energized depending upon which one also receives the other of its AND inputs. The latter input potential is selectively received via the remaining input conductors 712–3 and 712–4. Which of these conductors is energized is controlled by the information present in the address register 130 of FIG. 12 in the manner to be described. The signal condition originating at the address register and which appears on one or the other of the conductors 712–3 and 712–4 continues for a time duration extending from $t_{0.25}$ to $t_{4.75}$ and is indicated on the chart of FIG. 32 as the waveform 813. Accordingly, at the time $t_{3.5}$ a positive-going strobe control signal 814 is generated on an output conductor 759$_2$ or 759$_3$.

In addition to the strobe control pulse 814 generated on one of the output conductors 759$_2$ and 759$_3$, a negative pulse 815 is also generated on an output conductor 757–2 or 757–3 of the amplifiers 700–2 and 700–3. This pulse is negative because, as previously explained, of the sense of the coupling of the output transformer winding in these amplifiers corresponding to the winding 753 of the strobe amplifier 700–1. (This output of the latter amplifier, it will be recalled, is not utilized.) The output conductors 757–2 and 757–3 are connected together and are extended in an OR connection via a conductor 757–4 to the input of a final delay pulse generator 650–5 of FIG. 28. This generator provides for a delay of 0.5 microsecond. Accordingly, since the strobe amplifier output pulse 815 occurs at the time $t_{3.5}$, the delay generator 650–5 produces a negative output pulse 816 at the time $t_4$ on its output conductor 688–5. This signal is applied thereby to the reset input of the flip-flop circuit 697, the effect of which is to restore the 0 output to a positive-going potential and its 1 output to a negative-going potential. The positive-going potential on the conductor 712 thus cuts off the strobe amplifier 700–1 at the time $t_4$ thereby providing for a strobe control signal 809 on the input conductors 547 of the sampler circuits 500 of FIG. 29 of 0.75 microsecond duration as depicted in the chart of FIG. 32.

Prior to the termination of the strobe control pulse 809 at the time $t_4$ and during the 0.5 microsecond delay introduced by the delay pulse generator 650–5, the strobe control pulse 814 is terminated under the control of flip-flop circuit 696. The output signal 810 occurring at the time $t_{3.5}$ is applied not only to the set input of the flip-flop circuit 696, but also the input of the delay pulse generator 650–4 via the conductor 688–3. This generator provides for a delay of 0.25 microsecond; accordingly, at the time $t_{3.75}$ a negative-going potential 817 is produced on its output conductor 688–4 which pulse is thereby applied to the 1 output of the flip-flop circuit 693. As a result, as the 1 output goes negative, the 0 output goes positive, thereby terminating the negative pulse 811 appearing thereon after a duration of one-quarter microsecond. The delay pulse generator 650–4 is thus employed only to provide a positive-going cut-off pulse on the 0 output of the flip-flop 696, which cut-off pulse in turn cuts off whichever of the strobe amplifier circuits 700–2 or 700–3 was energized via the conductor 712–2 at the time $t_{3.75}$. This completes the description of the sequence and manner of control of the operation of the strobe amplifiers 700–1, 700–2, and 700–3. The readout control circuits, however, provide for the timely generation of one further control signal.

It will be recalled that the initiation of an interrogation operation of the information store of this invention was controlled by a sync pulse 310 originating in the central control of the parent system which was supplied to the store control circuits 140 at the time $t_0$. At the time that information output signals are returned to the central control in response to a direction for interrogation, the information store of this invention also provides for a store sync pulse to be returned at the time $t_{3.5}$. The store sync pulse 818 is generated as the result of the setting of the flip-flop circuit 696 responsive to the applied pulse 810 from the delay pulse generator 650–3. The negative pulse 811 generated by the flip-flop 696 as a result is applied, not only to initiate the opertaion of one of the strobe amplifiers 700–2 or 700–3 via the conductor 712–2 as previously described, but also to the set input of a flip-flop circuit 698 via a conductor 712–5. As the latter circuit is set, a positive-going pulse is provided on its 1 output conductor 819 which is initiated at the time $t_{3.5}$. The pulse 819 is terminated at the time $t_4$ when the flip-flop circuit 697 is reset responsive to the signal 816 applied from the delay pulse generator 650–5. At this time a negative potential appears on the 1 output of the flip-flop circuit 697 which is carried to the reset input of the flip-flop circuit 698 via a conductor 820. The store sync pulse 818 is transmitted by means of the conductor 819 extended through FIGS. 27, 24, 20, and 19 to transmission circuits 150 of the store control circuits of FIG. 18 which transmission circuits 150 provide for the ultimate delivery of the store sync pulse to the central control of the parent system.

In the normal operative case the readout control circuits are de-energized, as was seen, by the resetting of the flip-flop circuit 626 of FIG. 21 by the pulse 805 supplied by the delay pulse generator 650–1 at the time $t_2$. It will further be recalled that the operation of the strobe generator 600 was dependent upon the application of each of its three AND inputs, two of which are received from the current shunt switches 116 and 116' of the X and Y access circuits. Should for any reason the latter inputs not appear, provision is made in the readout control circuits for turning the strobe generator 600 off to any extraneous noise which may be present. This is accomplished by applying in every case at the time $t_3$ a negative pulse 821 from the readout pulse generator chain 303 via the cable 801 to the reset input of the flip-flop circuit 626. In the description of the readout control circuits where, in the pulse chart of FIG. 32, the duration of a pulse is not described, such as in the case of the delay pulse generator outputs, the duration is approximately 0.5 microsecond.

The manner in which selection is made between the strobe amplifiers 700–2 and 700–3 via the selection conductors 712–3 and 712–4 and the further selection of the group of selector circuits 350–353 and, within the selected group, the A and B section amplifiers, may now be considered. The ultimate control of these selection operations, it will be recalled, was mentioned as originating in the address register 130 of FIG. 12. As previously explained, selection between the strobe amplifiers 700–2 and 700–3 is made for the purpose of anticipating in the readout circuits the polarity of the information representative signals generated in the readout amplifiers 450. Since this polarity alternates between the planes of each memory module and also between each module of the memory and, further, since the polarity of readout signals remains constant for the corresponding planes of the memory modules of a column of such modules as depicted in FIG. 5, only the address signals from the address register 130 controlling the vertical, or X, conductors 44 of the access core switch array of FIG. 5 are relevant to a determination of the polarity of the readout signals which may be anticipated. The selection of a vertical, X conductor 44, it will be recalled, is controlled by the information bits from flip-flops F6, F7, F8, F9, F10, F11, F15, and F16 of the address register 130. From the previously provided description of the selection of the address selection switches X111 and X112, it may be shown that the bits 6 and 15 define the polarity of the output signals for the particular plane within the memory 100 in which the interrogated word row appears. From the previously provided description of the particular polarities of the readout signals from each plane and module, the sense of the couplings of the secondary windings 513 and 514 of the sampler circuits 500 of FIG. 29 may be adjusted so that the proper detection sections with respect to the polarity of the readout signals connected thereto may be enabled responsive to the selection of a strobe amplifier 700–2 or 700–3 of FIG. 30.

Figure 26:
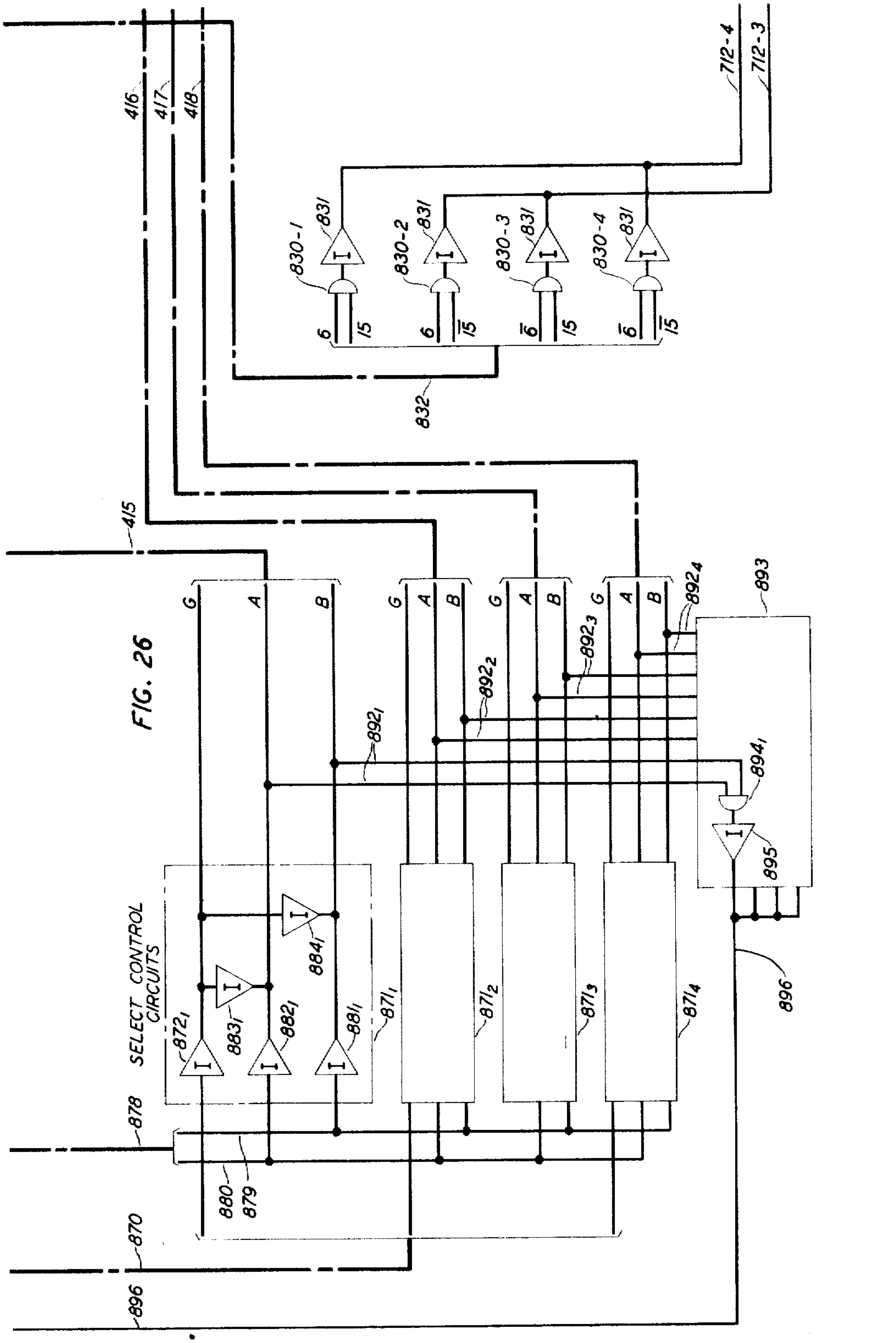
Figure 27:
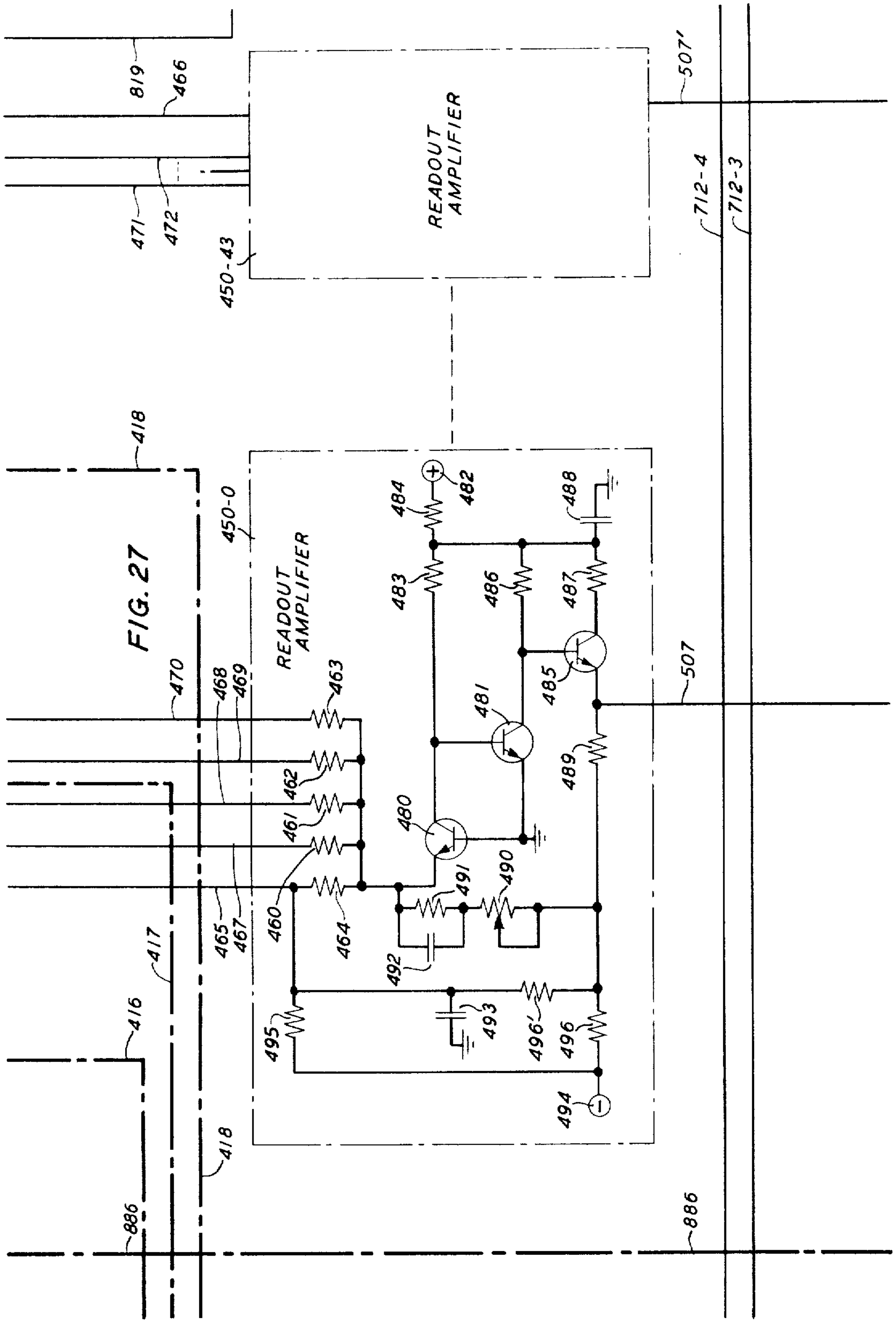

The latter amplifiers are energized in an AND connection, as previously described, partially via the conductors 712–3 and 712–4 extended through FIGS. 28 and 27 to FIG. 26 at which point they connect to a plurality of AND gating arrangements, the details of which are depicted in FIG. 35 and which have been previously described. More specifically, AND gates 830–1 through 830–4, each having a pair of inputs, have their outputs connected to a respective inverter circuit 831. The outputs of the latter circuits are associated with the conductors 712–3 and 712–4 in OR connections in a manner such that either the output of the inverter circuit 831 of the gate 830–1 or the output of the inverter circuit 831 of the gate 830–3 is connected to the conductor 712–3 and either the output of the inverter circuit 831 of the gate 830–2 or the output of the inverter circuit 831 of the gate 830–4 is connected to the conductor 712–4. The inputs of the gates 830 are designated in accordance with the outputs of the flip-flops of the address register 130 to which they are connected. These connections are carried via a cable 832 extended through FIGS. 23, 19, 15, and 11 to the respective conductors 833 through 836 which complete the connections to the outputs of the 6th and 15th bit flip-flops of the address register 130.

At this point it is convenient to return to the illustrative operation of the access circuitry previously described. It will be recalled that, for purposes of illustration, it was assumed that the word row being interrogated is the one defined by word row solenoid $\mathbf{11_2}$ depicted in FIG. 2 appearing in the second plane from the left of the memory module $43_1$ of FIG. 5. This word row contains the bits 1, 0, 1 . . . 0 and, as previously described the 1 readout signals generated by the interrogation of this row will comprise an initially positive signal followed by a negative signal depicted as the waveforms 328 and 332 in FIG. 31. The X conductor 44r selection bits provided by the address register 130 to select the word row solenoid $\mathbf{11_2}$ to read out this exemplary word are the bits 6, $\overline{7}$, $\overline{8}$, $\overline{9}$, $\overline{10}$, $\overline{11}$, $\overline{15}$, and 16 indicating that the bits 6 and $\overline{15}$ are a 1 and 0, respectively. Positive-going potentials indicative of these values are carried by the conductors 833 and 836, respectively, and the cable 832 to the AND gates 830 of FIG. 26. These potentials from the address register have already been described and are represented in FIG. 31 by the waveform 315. Also as previously described, the gates 830 are AND gates providing a positive-going output potential upon the application of simultaneous positive signals to their two inputs. Inspection of the designated inputs of the gate 830–2 indicates that, in view of the bits 6 and $\overline{15}$ received from the address register 130, this gate will be enabled, thereby producing a positive-going potential on its output. This positive signal is inverted in the associated inverter circuit 831 and applied to the conductor 712–4 and carried to the strobe amplifier 700–3. The latter circuit is energized in the manner already described, to apply the strobe control pulse 814 to the control conductor 526 of the sampler circuits 500 via the cable 762. The sense of the coupling of the winding 514 of the particular detection section of the latter circuits to which it is connected is such that the diode 532 of this section is forward-biased to strobe, or sample, a portion of the information readout signals applied to the output amplifier sections of the sampler circuits 500.

One further selection under the control of information bits provided by the address register 130 remains to be described. A particular group of selector circuits 350–353 of FIGS. 23 and 34 and, within the particular group, an A or a B section output stage is selected. In order to select among the selector circuit groups 350–353 the two most significant Y conductor information bits 13 and 14 and the two most significant X conductor information bits 15 and 16 are employed and to select between the A and B sections of the selector circuits 350–353 the 12th bit is employed. The information bits 13 through 16 are taken from the address register 130 outputs by means of the conductors 837 through 843, respectively, and are carried to readout selection gating circuits of FIG. 22 by means of a cable 844 extended through FIGS. 16, 15, 14, and 18. The 12th bit is carried via a cable 845 extended through the latter figures to A and B selection gating circuits of FIG. 22.

The readout selection gating circuits comprise a plurality of groups of five inputs AND gates 846 through 849. Each group of gates in turn comprises four gates designated by subscripts and each group 846 through 849 is associated with and controls the selector circuits 350 through 353 associated respectively with the memory module groups 40 through 43. The module groups are represented in FIG. 20 and the module organization within each module group is shown specifically in FIG. 5. Four of the inputs of each of the gates 846 through 849 are connected to the outputs of the 13th, 14th, 15th, and 16th flip-flops of the address register 130 via the cable 844 such that the connections are made in accordance with gate inputs as designated in FIG. 22. Although these logic connections are not specifically shown in the drawings, they are readily envisoned by one skilled in the art. As was described in connection with the addressing of the X and Y conductor address selection switches of the access core switch array previously herein, it will be apparent that the 15th and 16th information bits from the address register 130 define the four columns of the memory array 100 and 13th and 14th information bits define the four rows. The designations of these bits will therefore positively define a particular column and row and, hence in accordance with the memory organization shown in FIG. 5, the particular module group within which an interrogation is taking place. These bits are thus advantageously employed to make the proper selection among the selector circuits 350–353.

More specifically, in accordance with the illustrative interrogation operation assumed previously, these bits are designated as $\overline{13}$, $\overline{14}$, $\overline{15}$, and $\overline{16}$. Accordingly, each of the inputs of the AND gates 846–849 of FIG. 22 thus labelled will have a positive potential applied thereto via the cable 844 extended from the address register 130 of FIG. 12 and its connections through the conductors 838, 840, 842, and 842′. Inspection of the gate group 849 determines that the AND gate 849$_1$ alone has a positive potential on each of its logic inputs designated in accordance with the information bits provided by the address register 130. In this connection reference may be made to the pulse comparison chart of FIG. 33 where for convenience particular pulses depicted in FIGS. 31 and 32 are repeated and which chart may also be employed for recapitulation hereinafter. The output of the address register 130, the positive-going waveform 315, is that applied to the AND gate 849$_1$ and the inverted output of the address register 130, depicted as the negative-going waveform 813, is that applied via the AND gates 830 to select between the strobe amplifiers 700–2 and 700–3. At the time $t_{1.0}$ a positive-going pulse 855 is applied from a flip-flop 304 output of the readout pulse generator chain 303 of FIG. 18 via the cable 801 and a common conductor 856 to the timing input of each of the AND gates 846–849 including the gate 849$_1$. The latter gate is thus alone enabled and provides a positive-going output signal indicative of the fact that each of its input conditions has been met. This positive output is inverted in the connected inverter circuit 850 and applied to a common conductor 857 connecting together each of the outputs of the inverters of the group of gates 849. The gates 846 through 849 together with their connected inverter circuits 850 may each comprise the details of the AND gate-inverter combination depicted in FIG. 35 and previously described in conjunction therewith.

The inverters of each of the other groups of gates 846 through 848 are similarly connected together at their outputs by common conductors 854 through 856, respectively. The gates 846 through 849 are connected with their respective inverter circuits 850 in a manner so that the completion of each of the AND conditions of the AND gate produces a negative-going potential on the output of the inverter circuit and the failure of each of the AND conditions produces a positive-going potential on the output of the inverter circuit. The common conductors 854 through 856 accordingly have positive-going potentials thereon and the conductor 857 has a negative-going potential thereon as the result of the information provided by the address register 130. These potentials are applied to a second group of AND gates 860. The latter gates 860$_1$ through 860$_4$ are each two-input gates one input of which is connected to a respective common conductor 854 through 857. The gates 860 are also provided at their outputs with an associated inverter circuit 861 in a manner to supply output potentials such as described for the AND gate-inverter combinations 846–849. The common conductors 854–857, in addition to being connected to the respective inputs of the gates 860, are also extended to bypass the gates to provide at each gate-inverter combination a pair of connections to a buffer register 862.

The negative-going potential on the common conductor 857 is applied to one of the inputs of the AND gate 860$_4$ at the same time that the positive-going potentials on the conductors 854 through 856 are applied to one input of the AND gates 860$_1$ through 860$_3$. Also at the time $t_{1.0}$ another positive timing pulse 863 is applied to the other inputs of the gates 860 via a common conductor 864. The latter conductor is extended via the cable 801 from the output flip-flops 304 which are associated with the readout pulse generator chain 303 which originates the pulse 863. As a result of the negative potential from the gate 849$_1$ and the positive potential 863 from the timing circuits at the time $t_{1.0}$, the output of the AND gate 860$_4$ will be negative-going, which signal condition is inverted by the associated inverter circuit 861 into a positive-going signal. At the same time the negative going potential also bypasses the gate $860_4$ via the extension of the conductor 857. Positive potentials, on the other hand, are applied to both inputs of the remaining gates $860_1$ through $860_3$, and negative-going outputs, as a result, will appear on the outputs of the associated inverter circuits 861 at the same time that positive potentials will appear on the bypass extension of the conductors 854 through 856.

An input of each of the gates 860 and the outputs of each of the latter gates having potential conditions thereon as described above are connected to the inputs of associated flip-flop circuits 865 of the buffer register 862. These flip-flop circuits advantageously are also of the character depicted in FIG. 34. More specifically, the inverter outputs of the gates $860_1$ through $860_4$ are connected to the reset inputs of the flip-flop circuits $865_1$ through $865_4$, respectively. The bypass conductors 854 through 857 are connected, respectively, to the set inputs of the latter flip-flop circuits. The flip-flop circuits are set and reset by the application of near ground potentials and produce positive or near ground potentials, respectively at their 1 outputs, which are the only ouputs employed. A negative potential applied to a set or reset input will thus serve to set or reset the flip-flop, respectively. In accordance with the potentials previously described on the inputs of the flip-flops 865, each of the flip-flop circuits $865_1$ through $865_3$ will be reset and the flip-flop circuit $865_4$ will be set. As a result, the flip-flop circuits $865_1$ through $865_3$ will provide a near ground potential on the 1 output and the flip-flop circuit $865_4$ will provide a positive potential on its 1 output. The latter pulse is depicted in FIG. 33 as the waveform 866 and the former, near ground potential is depicted in that figure as the waveform 867. Both of these pulses will continue unless changed by a new address at the time $t_1$ of a following cycle. The output potential conditions of the flip-flop circuits 865 are transmitted via a cable 870 through FIG. 23 to select control circuits 871 of FIG. 26.

The select control circuits 871 comprise, with respect to the selection of a particular group of selector circuits 350–353, only a plurality of inverter circuits 872 associated respectively with the flip-flop circuits 865. Thus the flip-flop circuits $865_1$ through $865_4$ are connected via the cable 870 with the inverter circuits $872_1$ through $872_4$, only the first of these inverter circuits being shown in the drawing. The inverter circuits 872 are in turn connected via the cables 415 through 418 to the group selection input conductors of the groups of selector circuits 350 through 353. Thus, for example, the inverter circuit $872_1$ is connected to the input conductor 393G of each of the selector circuits 350–0 through 350–43 of FIGS. 23 and 24 via the cable 415. In accordance with the potentials applied to the inverter circuits 872 of FIG. 26 from the flip-flop circuits 865 as described in the foregoing, after inversion in the latter circuits, the outputs of the inverter circuits $872_1$ through $872_3$ are positive potentials which are applied to the input conductors, such as the input conductor 393G, of each of the selector circuits 350 through 352. The output of the inverter circuit $872_4$, not specifically shown in the drawing but which is associated with the flip-flop circuit $865_4$, on the other hand, will be a positive potential which is applied via the cable 418 to the group input control conductors of the selector circuits 353–0 through 353–43 corresponding to the conductor 393G of selector circuit 350–0. It may be mentioned at this point that the inverter circuits 872 and other inverter circuits to be described as included in the select control circuits 871 may advantageously comprise a circuit combination such as depicted in FIG. 35 with the exception that only one input is provided.

At this point and before proceeding to a consideration of the operation of the above-described control potentials applied to the group input conductors of the selector circuits 350 through 353, the final selection operation for determining the A and B section memory output signals will be described. As previously mentioned this selection operation is controlled by the output of the 12th flip-flop circuit of the address register 130 of FIG. 12. The setting of this flip-flop circuit is controlled by information received from the central control of the parent system and, as also previously mentioned, controls which of the two binary words simultaneously read out of the memory during an interrogation operation is to be allowed to emerge from the information store. In accordance with the illustrative binay word to be read out of the memory during the interrogation operation being described, the address register 130 is controlled to select, by means of the 12th information bit, the B section tape of the memory plane being interrogated in the memory module $43_1$. As will appear hereinafter, either the bit 12 or its complement $\overline{12}$ may be arranged to select either the A or the B tape readout signals for transmission to central control making the information request. In this specific embodiment of the information store of this invention, the bits 12 and $\overline{12}$ are arranged to select the A and B tape readout signals, respectively. Accordingly, the output conductor of the 12th flip-flop circuit of the address register 130 designated in accordance with the bit $\overline{12}$ has a positive potential, depicted in FIG. 33 as the waveform 315, appearing thereon. This positive potential is carried via the cable 845 extended through FIGS. 16, 15, 14, and 18 to timing gate-inverter circuits preceding the buffer register 862 of FIG. 22. The timing gates comprise specifically a pair of two-input AND gates $875_1$ and $875_2$ each having one of its inputs connected via the cable 845 to a 12 or a $\overline{12}$ output conductor of the 12th flip-flop of the address register 130. The other input of each of the gates 875 is connected to the common timing conductor 864 also connected to an input of each of the AND gates 860. Each of the gates 875 also has connected thereto at its output side an inverter circuit 876 with the result that, when the address register information bit $\overline{12}$ is applied to the AND gate $875_2$ coincidentally with the timing signal 863 appearing on the timing conductor 864 at the time $t_1$, a near ground potential will appear at the output side of its connected inverter circuit 876.

The outputs of both of the inverter circuits 876 are connected, respectively, to the set and reset inputs of a flip-flop circuit 877 of the buffer register 862. Thus, more specifically, the near ground potential produced by the inverter circuit 876 connected to the AND gate $875_2$ is applied to the reset input of the flip-flop circuit 877. The latter circuit, which is of the character identical to the flip-flop circuits 865, is as a result reset to provide a positive potential on its 0 output and a near ground potential on its 1 output. These potentials are carried via a cable 878 through FIG. 23 to the selection control circuits 871 of FIG. 26. At this circuit the cable 878 applies the potentials to two common conductors 879 and 880, the conductor 879 being connected via the cable 878 to the 1 output of the flip-flop circuit 877 and the conductor 880 being connected via the cable 878 to the 0 output of the latter flip-flop circuit.

The common conductor 879 is connected to four inverter circuits $881_1$ through $881_4$ associated respectively with the groups of control conductors of the selector circuit groups 350 through 353. Only the inverter circuit $881_1$ is shown in FIG. 26, the remaining inverter circuits $881_2$ through $881_4$ being included in the block symbols depicted in FIG. 26. In the selection control circuit $871_1$ the B output of the inverter circuit $881_1$ is connected via the cable 415 to each of the input control conductors 409B of each of the selector circuits 350–0 through 350–43. Similarly, the common conductor 880 is connected to four inverter circuits $882_1$ through $882_4$ also associated, respectively, with the groups of control conductors of the selector circuit groups 350 through 353. Only the inverter circuit $882_1$ is shown in FIG. 26, the remaining inverter circuits $882_2$ through $882_4$ being included in the block symbols depicted in FIG. 26. In the selection control circuit $871_1$ the A output of the inverter $882_1$ is connected via the cable 415 to each of the input control conductors 382A of each of the selector circuits 350–0 through 350–43. Each of the remaining A and B outputs of the inverter circuits 881 and 882 are similarly connected to the A and B input control conductors of the selector circuits 351–0 through 351–43, 352–0 through 352–43, and 353–0 through 353–43, corresponding to the conductors 382A and 409B of the selector circuits 350–0 through 350–43, via the cables 416, 417, and 418, respectively.

Within each of the selection control circuits 871, the groupings of inverter circuits 872, 881, and 882 have two more inverter circuits associated therewith. Connected between the output of each of the inverter circuits 872 and the outputs of the associated inverter circuits 882 and 881 are respectively connected the further inverter circuits 883 and 884, the inverter circuits of the selection control circuit $871_1$ being designated $883_1$ and $884_1$. Although not specifically shown in FIG. 26, each of the remaining of these groupings in the selection control circuits 871 also has a corresponding pair of inverter circuits similarly connected as the inverter circuits $883_1$ and $884_1$. The positive potential appearing at the 0 output of the buffer register 862 flip-flop 877 is thus applied via the cable 878 and the common conductor 880 to each of the inverter circuits 882 of the selection control circuits 871. In a similar manner the near ground potential now appearing on the 1 output of the flip-flop circuit 877 is carried by the same cable and the common conductor 879 to each of the inverter circuits 881 of the selection control circuits 871. The inverter circuits 883 and 884 make possible a second function of the select control circuits 871 in addition to that of selectively providing the potentials to select a group of selector circuits and, within the selected group, of selecting the desired A or B amplifier section. The select control circuits 871 also insure that the nonselected groups of selector circuits are inoperative during an interrogation operation and thus will be unable to transmit noise or other undesired signals to the readout amplifiers and subsequent circuitry.

As will be described in greater detail hereinafter, the selection of a particular group of selector circuits 350 through 353 is accomplished by the application of a near ground potential to the group input control conductors of the selected group, such as the conductors 393G of the group of selector circuits 350. Selection of an A or a B section within the selector circuits of a selected group is accomplished by the application of positive potential to the selected A or B input control conductor, such as the conductors 382A or 409B of the selector circuits 350. From the potentials applied from the buffer register 862 of FIG. 22, it will be recalled that these control conditions are met by the outputs of the select control circuit $871_4$. The positive potential depicted as the waveform 866 in FIG. 33 applied from the flip-flop circuit $865_4$ via the cable 878 is inverted in the inverter circuit $872_4$ and thus is applied as a near ground control signal via the cable 418 to each of the group input control conductors of the group of selector circuits 353–0 through 353–43 of FIG. 24. The positive potential also depicted as the waveform 866 in FIG. 33 applied from the 0 output of the flip-flop circuit 877 via the cable 878 and thereby to each of the inverter circuits 882 of the selected control circuits 871, is inverted in each of the latter inverter circuits and is thus applied as a near ground control signal via the cables 415 through 418 to each of the A control conductors of the selector circuits 350 through 353.

The near ground potential, depicted as the waveform 867 in FIG. 33, which is applied from the 1 output of the flip-flop circuit 877 via the cable 878 is transmitted to each of the inverter circuits 881 of the select control circuits 871. At these points, the near ground potentials are inverted and thus applied as positive control signals via the cables 415 through 418 to each of the B control conductors of the selector circuits 350 through 353. Each of the selector circuits of the selector circuit groups thus would normally have the B section amplifier therein partially selected. However, since only the group control input conductor of the selector circuit group 353–0 through 353–43 has the selecting near ground potential appearing thereon, the latter group, as will presently become evident, is selected for operation. The group and A selection potential outputs of the select control circuits $871_1$ through $871_3$ are such that, as previously explained, none of the associated selector circuits 350 through 352 can be energized by the incoming information signals from the memory 100 during the presently considered interrogation operation. Further to insure that these selector circuits will not respond to the incoming information signals, the B section outputs of the select control circuits $871_1$ through $871_3$ are inverted to the polarity opposite to that necessary to enable the B amplifier sections of the selector circuits 350 through 352.

This is accomplished by the addition of the inverter circuits 884. For example, in the selector control circuit $871_1$, the positive potential appearing on the group output of the inverter circuit $872_1$ is inverted in the inverter circuit $884_1$ thereby bringing the potential on the connected B output also down to the near ground low potential. (This operation may be better understood by a reconsideration of the circuit of FIG. 35 where it will be evident that if an identical circuit to the one depicted has its output connected to the output of the transistor 637, then the outputs of both circuits will be near ground if one is in that condition.) Should the A section of the selected selector circuits have been selected for energization, the inverter circuits 883 would accomplish the same function for the A sections of the nonselected selector circuit groups. The inverter circuits $883_4$ and $884_4$ of the presently active selector control circuit $871_4$ will have no effect on the potentials appearing on the A and B outputs since the A output will remain low and the inverter circuit $884_4$ provides the same polarity output as the inverter circuit $881_4$ which selects the B section amplifier of the selector circuits 350–0 through 350–43.

Turning now to the selector circuits 350–0 through 350–43, the operation of these circuits responsive to the group and amplifier section selection control signals provided thereto by the select control circuits 871 may be considered. The details of the A section amplifier of the selector circuit 350–0 are provided in FIG. 23 and reference may conveniently be had thereto in this connection. In the amplifier section 360–0*a*, in order to pass a positive or negative information signal read out of the memory 100 during an interrogation, the diodes 377 and 378 both must be enabled. The companion amplifier section 360–0*b*, shown in FIG. 23 in block symbol form, has a similar pair of diodes. The diodes 377 and 378, and the corresponding diodes of the amplifier section 360–0*b*, are enabled by the cooperative forward-biasing provided by potentials supplied by the group and A or B section input control conductors 393G, 382A, and 409B, respectively. Thus, when the selector group 350 is to be selected, the near ground potential 867 is applied to the control conductor 393G in the manner previously described. At the same time a positive potential 866 is applied, also as previously described, to one or the other of the conductors 382A or 409B of each of the selected selector circuits 350–0 through 350–43; in the present illustrative operation being described this will be the conductor 409B. The positive signal 866 is thus applied to the positive side of the diodes 377 and 378 of the amplifier sections 360–

0*b* through 360–43*b* and the near ground signal 867 is applied to the negative side of each of the foregoing diodes through the common selector circuit primary windings 379 and 380. The diodes 377 and 378 of each of the amplifier sections 360–0*b* through 360–43*b* of the selector circuits 353–0 through 353–43, respectively, are thus forward-biased by the cooperative application of the positive B select signals and the near ground group select signals.

In the A section amplifiers of the selector circuits 353– through 353–43 it may be noted that, although the partial biasing provided by the group select near ground potentials are present, the diodes are maintained back-biased by the near ground potentials applied to the A input control conductors from the select control circuits 871. Similarly, in each of the nonselected selector circuit groups 350 through 352, each of the A and B section amplifier control signals as well as the group control signals maintain the diodes in a back-biased condition.

The control signals provided by the selector control circuits 871 of FIG. 26, as described in the foregoing, thus select the selector circuits 353–0 through 353–43 and, within these circuits, the B section amplifiers which are associated with the module group 43 for transmission of the information signals representative of the binary bits being read out during the illustrative interrogation operation being described. As previously described, the selector circuits 353–0 through 353–43 transmit their outputs to forty-four readout amplifiers 450–0 through 450–43, respectively, shown in FIG. 27. Thus, the binary bits 1, 0, 1, . . . 0 of the binary word being read out will be transmitted via the output windings $\mathbf{398_0}$, $\mathbf{398_1}$, $\mathbf{398_2}$, . . . $\mathbf{398_{43}}$ to the readout amplifiers 450–0, 450–1, 450–2, . . . 450–43, respectively. More specifically, the information signals 328–332 will be transmitted to the readout amplifier 450–0 via the input conductor 470, the information signals 329–333 will be transmitted to the readout amplifier 450–1, via its input conductor, the information signals 328–332 will be transmitted to the readout amplifier 450–2 via its input conductor corresponding to the conductor 470, the intermediate bits of the exemplary word not determined in this illustrative operation will be transmitted to the readout amplifiers 450–3 through 450–42 via their input conductors, and the information signals 329–333 will be transmitted to the readout amplifier 450–43 via its input conductor 472. These information signals are depicted in the pulse chart of FIG. 31 and are repeated for convenience in the chart of FIG. 33. The polarities of the 1 and 0 information signals indicated are in accord with the polarities of these signals generated in the particular memory module and, within that module, the particular plane, chosen for describing an illustrative interrogation operation of the information store of this invention as previously explained.

The foregoing information signals are amplified in the listed readout amplifiers 450 and then transmitted to the associated respective sampler circuits 500 of FIG. 29 via the conductors 507. Specifically, the foregoing signals are transmitted to the sampler circuits 500–0, 500–1, 500–2, . . . 500–43 where, after further amplification, they are strobed by the strobe control signals applied thereto from the strobe amplifiers 700–1, and 700–2 or 700–3 of FIG. 30. From the previous description of the operation of the strobe amplifiers 700, it will be recalled that the amplifier 700–1 was enabled at the time $t_{3.25}$ to provide the three-quarter microsecond positive strobe pulse 809 depicted in the chart of FIG. 32. Further, the strobe amplifier 700–3 was enabled responsive to address signals supplied by the address register 130 of FIG. 12 via the gate-inventer circuits 830–831 of FIG. 26 to provide, at the time $t_{3.75}$, the quarter microsecond positive strobe pulse 814 also depicted in the chart of FIG. 32. These strobe pulses are applied to the control conductors 547 and 526, respectively, of each of the sampler circuits 500–0 through 500–43 to enable the proper detection and output amplifier sections thereof at the time when the optimum ratio between the 1 and 0 information signals incoming from the readout amplifiers 450 exists. The strobe pulses 809 and 814 are repeated in the chart of FIG. 33 for convenience and, as there indicated by the dashed lines, only the initial alternation, in the present illustrative case, the positive phase, is strobed by the strobe pulse 814. However, as described in connection with the detailed organization of the sampler circuits 500, the regeneration of the output amplifier sections thereof provides for an output signal extending to the trailing edge of the strobe pulse 809. Thus, a positive output signal indicative of a binary 1 extending from the time $t_{3.5}$ to the time $t_4$ is generated by the sampler circuits 500. Each of the latter circuits also provides discrimination so that no output signal responsive to the input of the 0 signal 329 is produced.

In accordance with the illustrative interrogation operation being described, the sampler circuits 500–0 and 500–2 will produce positive output signals, depicted as the pulses 885 in FIG. 33, and the sampler circuits 500–1 and 500–43 will produce no output pulses during the output time interval $t_{3.5}$ to $t_4$. These output signal conditions, representative of the forty-four bit binary word 1, 0, 1, . . . 0 being read out of the memory 100, are carried via the output conductors 558 of the sampler circuits 500 and a cable 886 extended through FIGS. 27, 24, 23, and 19 to the transmission circuits 150 of FIG. 18. The latter circuits comprise part of the information store control circuits 140 by means of which the information signals read out of the memory 100 during an interrogation are transmitted to the central control of the parent system in which the request for the information originated. Each of the circuits involved in the illustrative interrogation described in the foregoing is restored at the time and in the manner already set forth hereinbefore in connection with the description of their detailed organization and operation. Thus, upon the resetting of the address register 130 at the time $t_5$ by the pulse 335 from the address register reset circuit 130′ of FIG. 18, the information store of this invention will again be in readiness for another interrogation operation at the time $t_0'$. At this point the description of the information store proper and an illustrative operation thereof are completed. There remains only to consider briefly auxiliary checking and maintenance operations advantageously made possible by the information store of this invention.

*All seems well and diagnostic functions*

At various points in the information store signals may be taken, either during each interrogation of the memory or at the request of central control, which indicate the apparent proper or improper functioning of particular circuits. These signal conditions are carried to maintenance circuits 160 of the store control circuits 140. The maintenance circuits 160, since they do not comprise essential aspects of this invention, are shown in block symbol form only in FIGS. 1 and 18. One group of checking circuits, termed the All Seems Well circuits, maintain surveillance over the pulse generating circuits of the information store and provide signals during each interrogation operation of the store. Diagnostic circuits check particular static voltage states only upon the request of this information from central control.

Each of the limiter circuits 119, 128, and 129 of the X conductor access circuits as well as the corresponding circuits of the Y conductor access circuits, as previously mentioned, provides for an output signal to be taken from a transformer secondary winding incorporated therein. Specifically, the limiter circuit 128 of FIG. 14 is provided with a transformer 256′ across the secondary winding of which may be taken voltage signals indicative of the degree of operation of this circuit. Thus, in normal operation a voltage of a predetermined level appears across this secondary winding. Should this limiter circuit be called into operation as previously described, this voltage level will increase. The absence of a voltage signal, or the exceeding of the predetermined normal voltage level may then be detected in the maintenance circuits 160 by any means devisable by one skilled in the art, such as, for example, trigger circuits which respond to different input voltage levels. The limiter circuits 119 and 129 are similarly provided with transformers 267' and 240, respectively, across which similar voltages of different levels may appear to indicate the normal operation or variance from the normal operation. The current series switch 127 and the voltage pulser 134 also are provided with All Seems Well output transformers 210' and 286, respectively, across the secondary windings of which output voltages identical to those described for the limiter circuits may be developed to indicate the normal operation or malfunctioning of these circuits. For each of the foregoing circuits, the All Seems Well signals are carried to the maintenance circuits 160 of FIG. 18 by means of a single cable 890 extending from each secondary winding output point.

The corresponding limiter, current series switch, and voltage pulser circuits of the Y conductor access circuits are similarly provided with All Seems Well output transformers, and the voltage signals generated therein are also carried to the maintenance circuits 160 of FIG. 18 via a cable 890' which connects with the cable 890. Each of the address selection switches X111 is also provided with an All Seems Well output secondary transformer winding **166*a* coupled to its primary winding 166. Similarly, each of the address selection switches X112 also has coupled to its primary transformer winding 166' a secondary All Seems Well winding 116*a*'. The winding 166*a* of each of the switches X111 is connected to a common conductor 175' which in turn is carried through FIG. 15 to a cable 890. The winding 166*a*' of each of the switches X112 is connected to a common conductor 177' also carried to the cable 890. The latter cable is extended to the maintenance circuits 160 in FIG. 18 as previously explained. Similar windings, not shown, for providing an All Seems Well output, are supplied for each of the address selection switches Y111 and Y112 and are carried via common conductors 195' and 197' to cable 890' in FIG. 16. The latter cable is extended, as also previously traced, to the cable 890 and, thereby, to the maintenance circuits 160 of FIG. 18. From the foregoing All Seems Well secondary windings 166*a* and 166*a*' of the X address selection switches and similar windings in the Y address selection switches, the fact that a selected pair of selection switches is closed in each group and the amplitude of the current pulses transmitted thereby may be determined by the maintenance circuits 160**. In addition, a substantial reduction in the amplitudes of the current pulses may also indicate the fact that an unselected one of the address selection switches is closed due to some malfunctioning.

In the readout circuits, All Seems Well signals may be taken from the select control circuits 871 of FIG. 26, specifically from the A and B selection output conductors. Each of the A and B selection output conductor pairs of the control circuits 871 has connected thereto checking conductor pairs 892 through $892_4$. Each of the conductor pairs 892 terminates in a detection circuit 893 having included therein four AND gates $894_1$ through $894_4$ associated respectively with the conductor pairs $892_1$ through $892_4$. Only the AND gate $894_1$ is specifically shown in FIG. 26; however, each of the gates 894 advantageously comprises gates of the character depicted in detail in FIG. 35. Thus, each of the gates 894 also has connected to the output thereof an inverter circuit 895 having a single output. Each of the conductor pairs 892 are connected to the two inputs of its respective gate 894 in the detection circuit 893. The single outputs of the inverter circuits 895 are carried by means of a cable 896 extended through FIGS. 23 and 19 to the All Seems Well cable 890 and thereby to the maintenance circuits 160 of FIG. 18.

It will be recalled that, during an interrogation operation, either an A or a B selection conductor alone of one of the select control circuits 871 has a positive potential appearing thereon to be conveyed to the connected selector circuits of the group 350 through 353 and, within these circuits to the selected amplifier section. Each of the other A and B selection conductors will have a negative potential appearing thereon. Accordingly, should any A and B selection conductor pair or pairs both have positive potentials appearing thereon, the connected AND gate 894 in the detection circuit 893 will be enabled to provide an output signal, which latter signal is inverted in the associated inverter circuit 895. A negative signal is thus transmitted via the path above traced to the maintenance circuits 160 of the store control circuits 140 as indicative of an abnormal condition in the addressing of the readout control circuits.

At each of the points of the store described in the foregoing, signals are supplied during an interrogation operation indicative that All Seems Well in the operation or that a malfunction has occurred calling for corrective action. In addition to the checking signals thus made available during each interrogation of the memory of the store, the central control with which the information store of this invention may be associated may call at other times for specific diagnostic information referred to previously. Thus, as specifically depicted in the detailed circuitry of the X conductor access circuitry, potentials may be checked at the limiter circuit 129 of FIG. 10 and the voltage pulser 134 and limiter circuit 128 of FIG. 14. More specifically, at the limiter circuit 129 of FIG. 10 of the X conductor access circuits the potential appearing at the base of the transistor 238 is applied across the resistor 249 to provide an indication of its level as compared to the level of the corresponding potential appearing at the same point of the limiter circuit 129' of the Y conductor access circuits. These potentials are carried from the respective limiter circuits 129 and 129' by a diagnostic cable 898 which is extended for the limiter circuit 129 through FIG. 14 to the maintenance circuits 160 of FIG. 18. For the limiter circuit 129' the diagnostic cable 898 is extended through FIGS. 16, 20, and 19 to the same maintenance circuits 160.

At the voltage pulser 134 the potential applied thereby to the diodes 276 of the access core switch array of FIG. 15 between interrogations may be checked by a connection to the voltage conductor 275 across a resistor 899 and compared with the potential applied at the same time to the diodes 276' by the corresponding voltage pulser 134' of the Y conductor access circuitry. These potentials should be the same between interrogations of the memory and this comparison may also be made at the maintenance circuits 160 of FIG. 18 to which the potentials are carried via the cable 898. Also at the voltage pulser circuits 134 and 134' the diodes 276 and 276', respectively, may be checked for shorts by detecting the presence of currents therethrough. This is accomplished by detecting across a resistor 901 the potential at the voltage conductor 275 at each of the pulser circuits 134 and 134'. These potentials are also carried by means of the diagnostic cable 898 to the maintenance circuits 160 of the store control circuits 140.

At the limiter circuits 128 and 128' of the X and Y conductor access circuitry, respectively, particular potentials may also be checked by the maintenance circuits 160. Thus, the potential at the base of the transistor 256 of the limiter circuit 128 may be compared with that of the corresponding transistor of the limiter circuit 128'. Since these potentials must be equal during the operation of the information store of this invention, the maintenance circuits 160 may check these conditions at particular times via the diagnostic cable 898. Finally, the presence of current in the All Seems Well output transformer may be checked at times other than during an interrogation by determining the presence of a potential across a resistor 902 connected between the collector of the transistor 256 and the primary winding of the All Seems Well transformer 256' of the limiter circuit 128', for example. This potential is measured across two resistors 263 and 264 connected to each end of the resistor 902 and carried to the diagnostic cable 898 via two conductors 903 and 904. Similar connections for the same purpose are made at the limiter circuit 128' of the Y conductor access circuits in FIG. 17. As previously generally described in connection with the All Seems Well circuits of the limiters of the access circuits, the presence of a potential across the transformer secondary windings in any of these circuits during an interrogation indicates a malfunctioning of the circuits which the limiter circuits are intended to protect. The presence of a current in the same transformer primary windings may thus be checked at times other than during an interrogation by the diagnostic checks briefly described in the foregoing. The tracking detector circuit 204' of FIG. 13 also supplies, as previously mentioned, a steady direct current, indicating that the tracking circuit is operating properly, to the conductor 205'. The latter conductor is extended to FIG. 14 where it connects to the diagnostic cable 898 for ultimate connection to the maintenance circuits 160 of FIG. 18.

In describing the information store of this invention as a whole and in the description of its various components and subcombinations, specific circuit details and organizations were assumed in order to present one illustrative embodiment of this invention. It is to be understood, however, that various modifications may be made in the circuit details and among the individual circuits themselves by one skilled in the art in order to achieve the functions ascribed. Similarly, particular reorganizations may also be devised by one skilled in the art among the various memory, access, control, and logic circuits, for example, to achieve an information store according to the principles of the invention as defined in the accompanying claims without departing therefrom in any essential or material manner.

What is claimed is:

1. An information storage system comprising memory means for magnetically storing binary information in rows and columns of information addresses, an access switch for accessing said information addresses comprising rows and columns of magnetic cores corresponding to said rows and columns of addresses and a first and a second plurality of access conductors threading said rows and columns of cores, respectively; a first and a second energizing circuit for said first and second pluralities of access conductors each comprising a pair of parallel branches, one of said branches including a selected access conductor, and a normally closed shunt switch included in the other of said parallel branches; a first and a second current source for applying a drive current to each of said energizing circuits, means for coincidently opening the shunt switches of each of said energizing circuits for initiating a drive current pulse on each of said selected access conductors, and readout means responsive to information signals generated in said memory means.

2. An information storage system as claimed in claim 1 also comprising a series switch included in the said one of said parallel branches of each of said energizing circuits, means for coincidently opening each of said series switches for terminating said drive current pulses, and means for subsequently restoring said normally closed shunt switches.

3. An information storage system as claimed in claim 2 also comprising an individual voltage limiting circuit means connected across each of said shunt switches and each of said series switches.

4. An information storage system claimed in claim 3 also comprising an individual voltage limiting circuit means connected across the said one of said parallel branches of each of said energizing circuits.

5. An information storage system as claimed in claim 4 in which each of said energizing circuits also comprises means for applying a precharging potential to each of the associated access conductors and means for controlling said last-mentioned means to remove said precharging potential for the duration of said drive current pulses.

6. An information storage system comprising memory means for magnetically storing binary information in rows and columns of information addresses, an access switch for accessing said information addresses comprising rows and columns of magnetic cores corresponding to said rows and columns of addresses and a first and a second plurality of access conductors threading said rows and columns of cores, respectively; a first and a second energizing circuit associated with said first and second plurality of access conductors, respectively, each of said energizing circuits comprising a pair of parallel branches, one of said branches including a selected one of said access conductors, a normally closed shunt switch included in the other of said parallel branches, a series switch included in the said one of said branches, and a constant current source connected to said pair of parallel branches; means for coincidently opening the shunt switches of each of said energizing circuits for initiating drive current pulses on each of said selected access conductors, means for subsequently coincidently opening the series switches of each of said energizing circuits for terminating said drive current pulses, and tracking means for determining variations in magnitudes of said drive current pulses.

7. An information storage system as claimed in claim 6 also comprising biasing means for applying a biasing current to each of said magnetic cores comprising a biasing conductor threading each of said cores and a bias current source; and control means for controlling said bias current source in accordance with said variations in magnitudes of said drive current pulses.

8. An information storage system as claimed in claim 7 in which said tracking means comprises a transformer means having a plurality of windings thereon including a first and a second winding connected respectively between said constant current source and said pair of parallel branches of each of said first and second energizing circuits, a third winding coupled in a sense opposite to that of said first and second windings connected between said bias current source and said biasing conductor, means including a fourth winding on said transformer means for applying an alternating current to said first, second, and third windings, and detection circuit means including a secondary winding on said transformer for generating an output current corresponding to the algebraic sum of currents present in said first, second, and third windings; and in which said control means comprises means for adjusting said bias current source responsive to said output current.

9. An information storage system as claimed in claim 8 in which each of said first and second energizing circuits also comprises means for connecting therein said selected access conductors responsive to coded address signals applied thereto.

10. An information storage system comprising a magnetic memory means for storing binary information in a plurality of planes, each of said planes having a plurality of drive solenoid means defining a row of information addresses thereon, an access switch comprising rows and columns of magnetic cores inductively coupled to the pluralities of drive solenoid means of said planes, respectively, a first and a second plurality of access conductors inductively coupled respectively to said rows and columns of magnetic cores; a first and a second energizing circuit each having a current source connected thereto, a plurality of address selection switches operated responsive to coded address signals for connecting a selected conductor of each of said first and second plurality of access conductors in said first and second energizing circuit, respectively, a first and a second shunt circuit including a normally closed shunt switch for bypassing said first and second energizing circuits, respectively, means for coincidently opening each of said shunt switches for initiating a drive current pulse in each of said selected access conductors, a first and a second series switch connected in said first and second energizing circuits, respectively, and means for subsequently coincidently opening each of said series switches for terminating said drive current pulses.

11. An information storage system as claimed in claim 10 in which said row of information addresses of each of said planes of said memory means comprises a plurality of segments of continuous magnetic memory wires inductively coupled to said drive solenoids and passing in alternating directions in successive planes of said memory means so that signals of opposite polarity are generated in said memory for the same binary information in adjacent planes.

12. An information storage system as claimed in claim 11 also comprising a plurality of sampler circuits associated with said row of information addresses, respectively, of each of said planes, each of said sampler circuits comprising a first and a second output section responsive to said signals of opposite polarity, said output sections selectively energized responsive to particular ones of said coded address signals for generating a readout signal of one polarity indicative of said same binary information.

13. An information storage system comprising a magnetic memory for storing information in a plurality of planes comprising a first and a second plurality of continuous magnetic memory wires passing in alternating directions in adjacent ones of said planes, a plurality of single drive solenoids in each of said planes coupled to both said first and second plurality of memory wires and defining first and second rows of information address segments thereon; an access switch for selectively applying interrogate current pulses to said drive solenoids to interrogate simultaneously a row of information address segments in both said first and second plurality of memory wires, said access switch comprising rows and columns of magnetic cores inductively coupled to the plurality of drive solenoids of each of said planes, respectively, a first and a second plurality of access conductors inductively coupled respectively to said rows and columns of magnetic cores; a first and a second energizing circuit each having a current source connected thereto, means responsive to coded address signals for connecting a selected access conductor of each of said first and second plurality of access conductors in said first and second energizing circuits, respectively, a first and a second shunt circuit each including a normally closed shunt switch for bypassing said first and second energizing circuits, means for coincidently opening each of said shunt switches for initiating a drive current pulse in each of said selected access conductors, a first and a second series switch connected in said first and second energizing circuits, respectively, and means for subsequently coincidently opening each of said series switches for terminating said drive current pulses.

14. An information storage system as claimed in claim 13 also comprising a plurality of readout selector circuits associated respectively with the corresponding address segments of said rows of information address segments, each of said readout selector circuits comprising a first and a second output section for said first and second rows of information address segments, respectively, and means responsive to coded address signals for selectively enabling said first and second output sections of each of said readout selector circuits.

15. An information storage system comprising magnetic memory means having a plurality of storage planes and comprising a first and a second information card at each of said planes, each of said cards having binary information stored thereon in the form of a pattern of permanent magnets arranged at particular crosspoints of a coordinate array, means for interrogating said information comprising a first and a second plurality of continuous magnetic memory wires magnetically coupled to the magnets of said first and said second information cards, respectively, of each of said planes and being in registration with first coordinates of said array, said first and second plurality of memory wires passing in alternating directions at adjacent planes of said memory means, a plurality of drive solenoids inductively coupled to both of said first and second plurality of magnetic memory wires at each of said planes and arranged in registration with second coordinates of said coordinate array, an access switch for selectively applying interrogating current pulses to said drive solenoids of said planes comprising rows and columns of magnetic cores inductively coupled to said drive solenoids of said planes, and a first and a second plurality of access conductors inductively coupled respectively to said rows and columns of cores; a first and a second energizing circuit each having a constant current source connected thereto for applying coincident switching currents to selected cores of said access switch to switch said selected cores from one magnetic state to another, a plurality of address selection switches operated responsive to coded address signals for connecting selected conductors of each of said first and second plurality of access conductors in said first and second energizing circuit, respectively, a shunt circuit including a normally closed shunt switch for bypassing each of said energizing circuits, means for coincidently opening each of said shunt switches for initiating a drive current pulse in each of said selected access conductors, a series switch connected in each of said energizing circuits, means for subsequently coincidently opening each of said series switches for terminating said drive current pulses; and means for controlling potentials in said energizing circuits at said initiating and terminating of said drive current pulses comprising a first voltage limiting circuit connected across said shunt switch of each of said shunt circuits and a second voltage limiting circuit connected across said series switch of each of said energizing circuits, an interrogating current pulse on a particular drive solenoid simultaneously generating in ones of both said first and second plurality of memory wires information output signals as determined by the presence of said permanent magnets on said first and second information card at the coordinate of said particular drive solenoid, said output signals being of opposite polarity for the same binary information in an adjacent plane of said memory means.

16. An information storage system as claimed in claim 15 also comprising readout circuit means comprising a plurality of selector circuits associated respectively with said first and second plurality of continuous magnetic memory wires, each of said selector circuits comprising a first and a second output section, said first plurality of memory wires being connected at one end to corresponding first output sections of said plurality of selector circuits and said second plurality of memory wires being connected at one end to corresponding second output sections of said plurality of selector circuits, and means responsive to coded address signals for selectively enabling said first and second output sections of said plurality of selector circuits for selecting between said output signals in said first and second plurality of memory wires.

17. An information storage system as claimed in claim 16, said readout circuit means also comprising a plurality of sampler circuit means connected respectively to said plurality of selector circuits, each of said sampler circuits having a first and a second detection section energized responsive to signals of one and the opposite polarity respectively for generating signals of one polarity indicative of said selected output signals, and means responsive to coded address signals for selectively enabling said first and said second detection sections.

18. A magnetic switching arrangement comprising an array of magnetic cores arranged in rows and columns each core being magnetized in one magnetic state and each having an output winding inductively coupled thereto, a first and a second plurality of energizing conductors inductively coupled to said rows and columns of magnetic cores, respectively, a first and a second energizing circuit associated with said first and second plurality of energizing conductors, respectively, each of said energizing circuits comprising a constant current source, circuit means including a first and a second parallel branch connected to said current source, said first branch including a selected one of said energizing conductors and a normally closed series switch, and a normally closed shunt switch connected in said second branch; means for coincidently opening said shunt switches of said first and second energizing circuits to initiate coincident current pulses on said selected energizing conductors for applying a switching magnetomotive drive to the core defined by said last-mentioned conductors for switching said last-mentioned core to another magnetic state, and means for subsequently coincidently opening said series switches of said first and second energizing circuits to terminate said coincident pulses.

19. A magnetic switching arrangement as claimed in claim 18 also comprising individual voltage limiting means connected across said shunt and series switches of each of said first and second energizing circuits.

20. A magnetic switching arrangement as claimed in claim 18 also comprising a biasing conductor inductively coupled to each of the cores of said array, a bias current source connected to said biasing conductor for applying a biasing magnetomotive drive to each of said cores in the direction of said one magnetic state, and means for comparing said switching and biasing magnetomotive drives comprising a transformer means having a plurality of windings thereon including a first and a second winding connected in each of said first and second energizing circuits between said constant current source and said circuit means, respectively, a third winding coupled in a sense opposite to that of said first and second primary windings connected between said bias current source and said biasing conductor; means including a fourth winding on said transformer for applying a predetermined alternating current to said first, second, and third windings, and detection circuit means including an output winding on said transformer means for generating output signals corresponding to the algebraic sums of said switching and biasing magnetomotive drives.

21. A magnetic switching arrangement as claimed in claim 19 also comprising means for controlling said bias current source responsive to said output signals.

22. A magnetic switching arrangement as claimed in claim 21 in which the energizing conductors of said first and second plurality of energizing conductors are connected together at each end in groups so that each group of conductors at one end includes only one conductor of a group at the other end, and also comprising a first and a second plurality of address selection switches associated with said first and second plurality of energizing conductors, respectively, selectively energized responsive to coded address signals for connecting particular groups of said conductors at each end in said first branch of each of said first and second energizing circuits.

23. An information storage system comprising a plurality of memory modules, each of said modules comprising a plurality of memory planes each comprising a first and a second plurality of parallelly arranged magnetic wire memory elements, said first and second plurality of wire memory elements of each plane being connected at alternate ends with the corresponding memory elements of the adjacent planes, a plurality of interrogate solenoids each inductively coupled to both said plurality of first and second magnetic wire memory elements, said plurality of interrogate solenoids defining a coordinate array of information bit addresses on said first and second plurality of wire memory elements, and when energized, causing flux switching at said defined information addresses, and a first and a second information card associated with said coordinate arrays of information bit addresses, said first and second information cards each having permanent magnet means thereon at particular crosspoints of said arrays for preventing the switching of flux in said first and second plurality of wire memory elements representative of stored information; an access switch for said memory modules comprising a coordinate array of magnetic cores, each inductively coupled to a particular one of said interrogate solenoids, and a first and a second plurality of access conductors coupled to said magnetic cores in first and second coordinates of said last-mentioned array, respectively; a first and a second energizing circuit for said first and second plurality of access conductors, respectively, each of said first and second energizing circuits comprising a constant current source, a first circuit branch connected to said current source, means for selectively connecting an access conductor in said first circuit branch, a normally closed series switch in said first circuit branch, a second circuit branch connected to said current source, and a normally closed shunt switch connected in said second circuit branch; means for coincidently opening said shunt switches in each of said second branches in said first and second energizing circuits to initiate coincident drive current pulses in said selected access conductors for causing a change of magnetic state in the particular magnetic core threaded by said selected access conductors thereby to energize the interrogate solenoid coupled to said last-mentioned core, and means for subsequently coincidently opening said series switches in each of said circuit branches in said first and second energizing circuits to terminate said drive current pulses.

24. An information storage system as claimed in claim 23 also comprising individual voltage limiting means connected across the shunt switches, series switches, and selected access conductors of each of said first and second energizing circuits.

25. An information storage system as claimed in claim 24 also comprising means connected to each of said shunt switches, series switches, and individual voltage limiting means for determining the magnitude of currents present in each of said last-mentioned elements.

26. An information storage system as claimed in claim 25 in which each of said first and second energizing circuits also comprises a voltage pulser means for precharging said selected access conductor to a predetermined potential and means for interrupting said voltage pulser means for the duration of said drive current pulses.

27. An information storage system as claimed in claim 26 in which the energization of the interrogate solenoid coupled to said particular core applies an interrogate magnetomotive drive to the information addresses defined thereby on said first and second plurality of wire memory elements to cause flux switching simultaneously in both of said last-mentioned pluralities of wire memory elements as determined by the presence or absence of permanent magnet means at said last-mentioned information addresses, said storage system also comprising readout means comprising means including said wire memory elements for generating output signals responsive to said flux switching in both of said first and second plurality of wire memory elements, a first and a second plurality of output selector circuit means responsive to output signals generated in individual wire memory elements of said first and second plurality of wire memory elements, respectively, and means for simultaneously enabling a selected plurality of said first and said second plurality of output selector circuit means and disabling the other plurality of said first and said second plurality of output selector circuit means.

28. An information storage system comprising a magnetic memory means divided into a plurality of modules each comprising a coordinate arrary of binary word addresses, accessing means associated with each of said addresses responsive to interrogate currents applied thereto for generating readout signals representative of binary word bits stored in the associated word addresses, means for applying an interrogate current to a selected one of said accessing means associated with a word address of a selected module comprising a plurality of magnetic cores arranged in rows and columns defining said coordinate arrays of word addresses of said plurality of modules, and a first and second plurality of access conductors threading said rows and columns of magnetic cores, respectively; a first and a second energizing circuit means associated with said first and second plurality of access conductors, respectively, each of said energizing circuit means comprising a constant current source, a first branch circuit including a selected access conductor threading a core partially defining said selected one of said accessing means and a normally closed series switch, and a second branch circuit bypassing said first branch circuit including a normally closed shunt switch; means for initiating energizing current pulses on said selected access conductors included in each of said first branch circuit means comprising means for simultaneously opening the shunt switches of each of said first and second energizing circuits, and means for terminating said energizing current pulses comprising means for subsequently and simultaneously opening said series switches of said first and second energizing circuits.

29. An information storage system as claimed in claim 28 also comprising a first and a second plurality of address selection circuits for connecting said selected access conductor of each of said first and second plurality of access conductors in said first branch circuit of said first and second energizing circuit means, respectively, said first and second plurality of address selection circuits being energized responsive to coded address signals applied thereto, and address means for applying particular coded address signals to selected ones of said first and second plurality of address selection circuits.

30. An information storage system as claimed in claim 29 also comprising a plurality of groups of readout selection circuits associated with said plurality of modules, respectively, the readout selection circuits of a group being collectively enabled responsive to coded address signals for detecting said readout signals from the associated modules, and means for applying said particular coded address signals to said plurality of groups for enabling only the readout selection circuits of the group associated with said selected module.

31. An information storage system as claimed in claim 30 also comprising a plurality of readout amplifier circuits associated respectively with the individual readout selection circuits of each of said groups of said plurality of groups of readout selection circuits and OR circuit means for connecting each of said groups of readout selection circuits to said plurality of readout amplifier circuits.

32. A memory organization comprising a plurality of memory modules arranged in first groups of rows and columns and also arranged in second groups, each of said rows and columns of modules having only one module in common with a different one of said second groups, an access switch having rows and columns of selection conductors associated respectively with said rows and columns of memory modules, and a plurality of common readout means associated respectively with each of the memory modules of said second groups.

33. A memory organization as claimed in claim 32 in which said second groups of modules are arranged in major and minor diagonals of the rows and columns of said first groups.

34. A memory organization comprising a plurality of memory modules, an access switch for said modules including rows and columns of selection conductors associated respectively with rows and columns of first groupings of said modules, said selection conductors defining at their crosspoints word addresses in said modules, and a plurality of common readout means associated with each of the memory modules of respective second groupings of said modules, each of said second groupings of modules including only a single module of any row and column of said first groupings of modules.

35. A memory organization as claimed in claim 34 also comprising a common output circuit means for said plurality of common readout means and a plurality of output selector means selectively controllable for connecting said plurality of readout means to said common output circuit means.

36. An information storage system comprising a plurality of memory modules, an access switch for said modules including rows and columns of selection conductors associated respectively with rows and columns of first groupings of said modules, said selection conductors defining at their crosspoints word addresses in said modules, a first and a second energizing circuit for said rows and columns of selection conductors, respectively, each of said energizing circuits comprising a pair of parallel branches, one of said branches being connectable to a selected selection conductor and including a series switch, and the other of said branches including a normally closed shunt switch, a first and a second current source for applying a drive current to said first and second energizing circuits, respectively, means for connecting a selected selection conductor of each of said rows and columns of selection conductors in said one of said branches of each of said energizing circuits, means for coincidently opening the shunt switches of each of said energizing circuits for initiating an interrogating pulse on each of said selected selection conductors, a plurality of common readout means associated with each of the memory modules of respective second groupings of said modules, each of said second groupings of modules including only a single module of any row and column of said first grouping of modules, a common output circuit means for said plurality of common readout means, a plurality of output selector means selectively controllable for connecting said plurality of readout means to said common output circuit means, means for coincidently opening each of said series switches for terminating said interrogating pulses, and means for subsequently restoring said normally closed shunt switches.

37. An information storage system as claimed in claim 36 in which said access switch also comprises a magnetic core at each of said crosspoints of said rows and columns of selection conductors and biasing means for applying a biasing current to each of said magnetic cores comprising a biasing conductor coupled to each of said cores and a bias current source.

38. An information storage system as claimed in claim 37 also comprising control means for controlling said bias current source in accordance with variations in said interrogating pulses comprising a first and a second transformer means each having a saturable core and a plurality of corresponding windings thereon, each of the windings of said first transformer means being serially connected to the corresponding winding of said second transformer means, said windings of each of said transformer means including a first and a second like poled winding connected respectively between said first and second current sources and said pair of parallel branches of each of said first and second energizing circuits, a third winding oppositely poled to said first and second windings connected between said bias current source and said biasing conductor means for offsetting the operating points on the hysteresis loops of the cores of said first and second transformer means comprising a fourth winding also included in said windings of each of said transformer means connected to a source of potential, said first, second, third and fourth windings of one transformer means being oppositely poled to the corresponding windings of the other transformer means, means including a fifth winding on each of said transformer means for applying an alternating current to all of the windings of each of said transformer means, detection circuit means including a sixth winding on each of said transformer means for generating an output current corresponding to the algebraic sum of currents present in said first, second, and third windings, and means for adjusting said bias current source responsive to said output current.

References Cited by the Examiner

UNITED STATES PATENTS 3,112,394 11/1963 Close ------------- 235—61.9

ROBERT C. BAILEY, *Primary Examiner.*

R. B. ZACHE, *Assistant Examiner.*